(12) United States Patent
Sakai et al.

(10) Patent No.: US 6,436,001 B1
(45) Date of Patent: Aug. 20, 2002

(54) SPEED CHANGE CONTROLLER FOR INFINITE SPEED RATIO TRANSMISSION

(75) Inventors: Hiromasa Sakai; Toshikazu Oshidarai, both of Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/621,615

(22) Filed: Jul. 21, 2000

(30) Foreign Application Priority Data

Jul. 27, 1999 (JP) .......................................... 11-211926
Mar. 30, 2000 (JP) ...................................... 2000-094707

(51) Int. Cl.⁷ .......................... R16H 37/02; B60K 41/12
(52) U.S. Cl. ........................................ 475/216; 477/50
(58) Field of Search ................... 477/41, 50; 475/208, 475/215, 216

(56) References Cited

U.S. PATENT DOCUMENTS

| | | | |
|---|---|---|---|
| 3,545,302 A | * 12/1970 | Schofield | 477/50 X |
| 5,074,830 A | * 12/1991 | Perry | 475/186 X |
| 5,980,420 A | * 11/1999 | Sakamoto et al. | 477/50 X |
| 6,030,311 A | * 2/2000 | Osumi | 476/42 |
| 6,063,002 A | * 5/2000 | Nobumoto et al. | 477/41 |
| 6,155,951 A | * 12/2000 | Kuhn et al. | 475/216 |
| 6,171,210 B1 | * 1/2001 | Miyata et al. | 475/216 |
| 6,192,306 B1 | * 2/2001 | Kidokoro et al. | 475/186 X |
| 6,217,473 B1 | * 4/2001 | Ueda et al. | 475/216 |
| 6,287,232 B1 | * 9/2001 | Sakai et al. | 475/216 |
| 6,317,672 B1 | * 11/2001 | Kuramoto et al. | 477/46 X |
| 6,351,700 B1 | * 2/2002 | Muramoto et al. | 477/39 X |

FOREIGN PATENT DOCUMENTS

| | | | |
|---|---|---|---|
| EP | 0149892 | * 7/1985 | 475/216 |
| JP | 63-130954 | 6/1988 | |
| JP | 9-42428 | 2/1997 | |
| JP | 9-89071 | 3/1997 | |
| JP | 10-325459 | 12/1998 | |
| JP | 11-247964 | 9/1999 | |
| WO | 92010697 | * 6/1992 | 475/216 |

\* cited by examiner

Primary Examiner—Rodney H. Bonck
Assistant Examiner—Roger Pang
(74) Attorney, Agent, or Firm—Foley & Lardner

(57) ABSTRACT

In an infinite speed ratio transmission, a rotation of an input shaft (1) is input both to a continuously variable transmission (2) and a fixed speed ratio transmission (3). A CVT output shaft (4) of the toroidal continuously variable transmission (2) is joined to a sun gear (5A) of a planetary gear set (5), an output shaft (3C) of the fixed speed ratio transmission (3) is joined to a planet carrier (5B) of the planetary gear set (5), and a vehicle is driven under the output of a ring gear (5C) of the planetary gear set (5). A controller of the infinite speed ratio transmission comprises an actuator (30) which varies an amount of torque transmitted between the input shaft (1) and the CVT output shaft (4). A microprocessor (80) controls the actuator (30) so that a torque in the opposite direction to the vehicle travel direction shown by a selection range of a selector lever (86) is not transmitted by the continuously variable transmission (2).

16 Claims, 35 Drawing Sheets

FIG. 14B

FIG. 22A
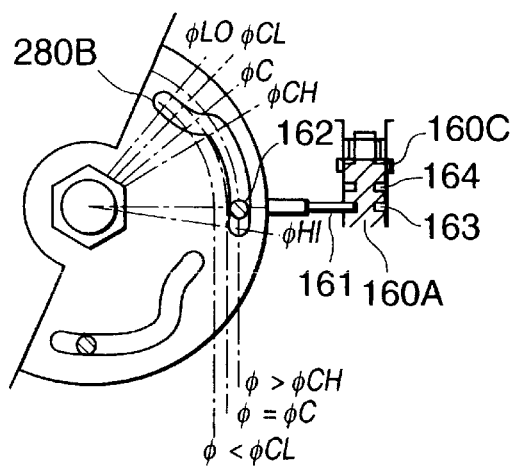
FIG. 22B
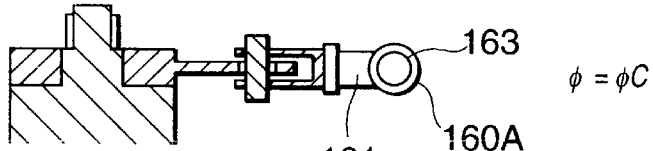
FIG. 22C
FIG. 22D
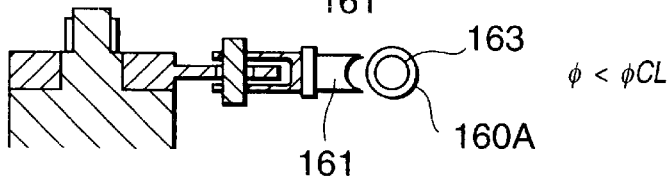

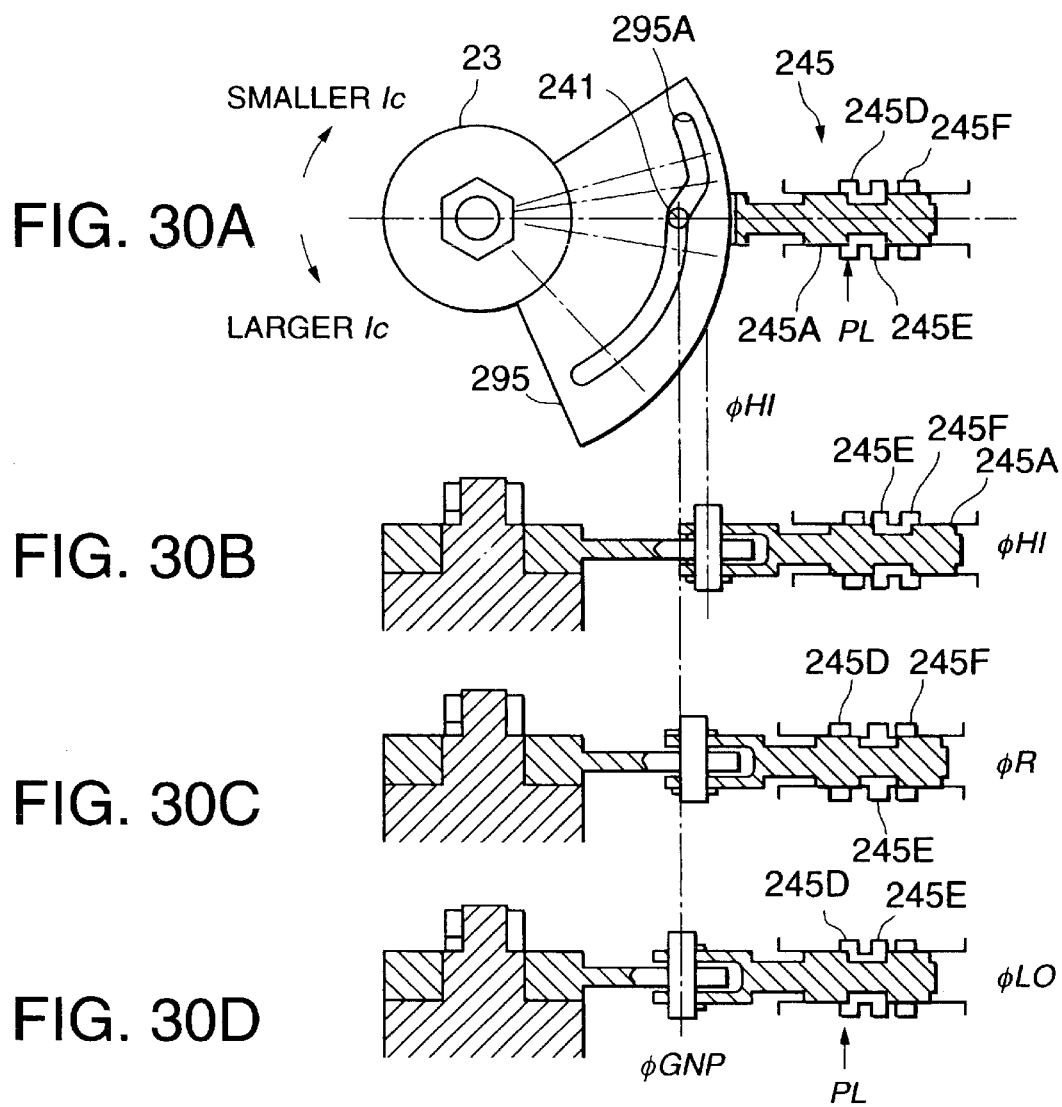

SPEED CHANGE CONTROLLER FOR INFINITE SPEED RATIO TRANSMISSION

FIELD OF THE INVENTION

This invention relates to control of an infinite speed for vehicles.

BACKGROUND OF THE INVENTION

Tokkai Hei 9-42428 published by the Japanese Patent Office in 1997 discloses an infinite speed ratio transmission (hereinafter referred to as IVT) wherein a reduction gear (fixed speed ratio transmission) and a planetary gear set are combined with a continuously variable transmission (CVT), in order to further enlarge the speed ratio range of a toroidal continuously variable transmission for vehicles.

In this IVT, the CVT and reduction gear are connected to the input shaft driven by an engine, the output shaft of the CVT is joined to a sun gear of the planetary gear set, and the output shaft of the reduction gear is joined to a planet carrier of the planetary gear set via a power recirculation clutch. A ring gear of the planetary gear set is joined to the final output shaft of the IVT which drives the drive wheels. The output shaft of the CVT is also joined to this final output shaft via a direct clutch.

In a direct mode wherein the direct clutch is engaged and the power recirculation clutch is disengaged, the rotation of the output shaft of the CVT is directly output to the final output shaft. In the power recirculation mode wherein the direct clutch is disengaged and the power recirculation clutch is engaged, the rotation direction and speed of the final output shaft vary according to the difference of the rotation speed of the output shaft of CVT, and the rotation speed of the output shaft of the reduction gear. Since the speed ratio of the reduction gear is constant, in the power recirculation mode, the vehicle is advanced and reversed only by varying the speed ratio of the CVT without changing the rotation direction of the input shaft. The change-over of the power recirculation mode and direct mode is performed at a rotation synchronization point RSP at which the output rotation speed of the IVT in both modes is equal.

In the power recirculation mode, the rotation of the final output shaft stops at the boundary between advance and reverse. As the rotation of the input shaft is continued even in this case, the speed ratio of the IVT becomes infinite. This boundary point is referred to as the geared neutral point GNP. If the speed ratio of the CVT is increased from the GNP, the vehicle is advanced, and if it reduced from the GNP the vehicle is reversed.

The speed ratio of CVT is varied by the gyration angle of power rollers which transmit rotational torque in the CVT. More specifically, trunnions which support the power rollers are driven by oil pressure actuators to vary the gyration angle. A reaction force to the transmitted rotational torque acts on the power rollers, and the oil pressure actuators support this reaction force. Therefore, the transmission torque of the power rollers can be controlled by controlling the pressure applied to the pistons of the oil pressure actuators. Control of the speed ratio of the CVT, control of the transmission torque, and the engaging and disengaging of the direct clutch and power recirculation clutch are performed by signals output from a control unit.

SUMMARY OF THE INVENTION

When the vehicle is advancing or reversing, the speed ratio of the IVT approaches the geared neutral point GNP as the vehicle speed decreases.

At that time, if an IVT speed ratio exceeding the GNP is commanded due to a failure or malfunction of the control unit, a torque in the reverse direction to the running direction of the vehicle will act on the final output shaft, and excessive braking will occur as a result.

Tokkai Hei 10-325459 published by the Japanese Patent Office in 1998 discloses separation of actuators and control valves which are used for the control of the speed ratio of the CVT depending on the direction of vehicle motion. In other words, the actuator and control valve to apply are changed according to whether the speed ratio of the CVT is larger or smaller than the GNP.

The control of the CVT speed ratio is performed not only in the power recirculation mode but also in the direct mode. In the direct mode, the final output shaft rotates in the forward direction regardless of the CVT speed ratio. In other words, in the direct mode, forward travel is performed also in the region where the CVT speed ratio is smaller than the GNP. However, in this IVT, when the CVT speed ratio is smaller than the GNP equivalent value, an advance actuator and control valve cannot be used. As a result, in the direct mode, a CVT speed ratio smaller than the GNP equivalent value cannot be used, and the usable range of the IVT speed ratio becomes narrow. Further, if separate actuators and separate control valves are provided for advancing and reversing, the construction and control process of the control unit are complicated and this increases the cost of the control device.

It is therefore an object of this invention to prevent the IVT from exerting a torque on the drive wheels in an opposite direction to the running direction of the vehicle without narrowing the usable range of the speed ratio.

In order to achieve the above object, this invention provides a speed change controller for such an infinite speed ratio transmission for a vehicle that comprises an input shaft, a continuously variable transmission which comprises a first output shaft and transmits a rotation of the input shaft at an arbitrary speed ratio to the first output shaft, a fixed speed ratio transmission which comprises a second output shaft and transmits the rotation of the input shaft at an arbitrary speed ratio to the second output shaft, a planetary gear set comprising a first rotation element joined to the first output shaft, a second rotation element joined to the second output shaft, and a third rotation element which varies a rotation direction and a rotation speed according to a difference between a rotation speed of the first rotation element and a rotation speed of the second rotation eliminating a selector lever which selects an operating range of the infinite speed ratio transmission.

The vehicle runs according to the rotation of the third rotation element and the operating range comprises a forward motion range and a reverse motion range.

The controller comprises an actuator which varies an amount of torque transmitted between the input shaft and the second output shaft, a sensor which detects the operating range selected by the selector lever, and a mechanism which controls the actuator according to the operating range so that a rotation torque in an opposite direction to a vehicle travel direction represented by the operating range is not transmitted between the input shaft and the first output shaft.

The details as well as other features and advantages of this invention are set forth in the remainder of the specification and are shown in the accompanying drawings.

BRIEF DESCRIPTION OF THE DRAWINGS

FIGS. 14A–14C are enlarged views of the oil pressure circuit diagram of FIG. 13.

FIGS. 22A–22D are diagrams describing a relation between a cam rotation position and an operating state of a lock mechanism of the mode fixing valve according to the fourth embodiment of this invention.

FIGS. 30A–30D are diagrams describing a relation between a cam rotation position and an operation position of a counter torque cutoff valve, according to the fifth embodiment of this invention.

DESCRIPTION OF THE PREFERRED EMBODIMENTS

Figure 1:
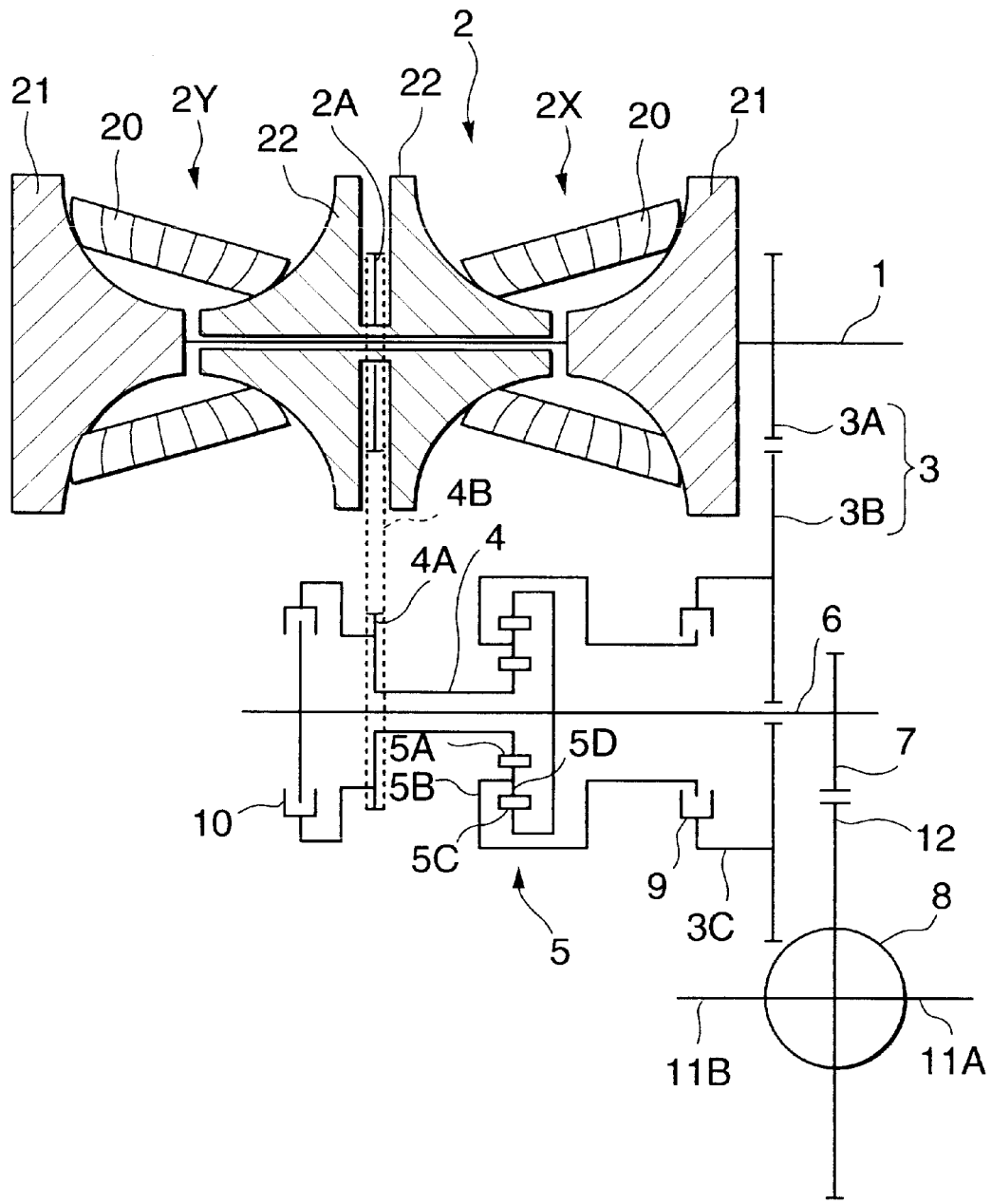
FIG. 1 is a schematic diagram of an IVT to which this invention is applied.

Referring to FIG. 1 of the drawings, an IVT for a vehicle comprises an input shaft 1, a toroidal continuously variable transmission (CVT) 2, a reduction gear 3, a planetary gear set 5 and a final output shaft 6.

The CVT 2 comprises two pairs of input disks 21 and output disks 22. In the following description, the pair of input disks 21 and output disks 22 on the right-hand side of FIG. 1 are referred to as a toroidal unit 2X, and the pair on the left-hand side are referred to as a toroidal unit 2Y.

In the toroidal units, a pair of power rollers 20 is gripped between the input disk 21 and output disk 22. The input disks 21 are joined to the input shaft 1. The input shaft 1 is joined to an output shaft of the engine, not shown. The rotation of the output disk 22 is transmitted to a CVT output shaft 4 via a sprocket 2A, chain 4B and sprocket 4A.

Figure 3:
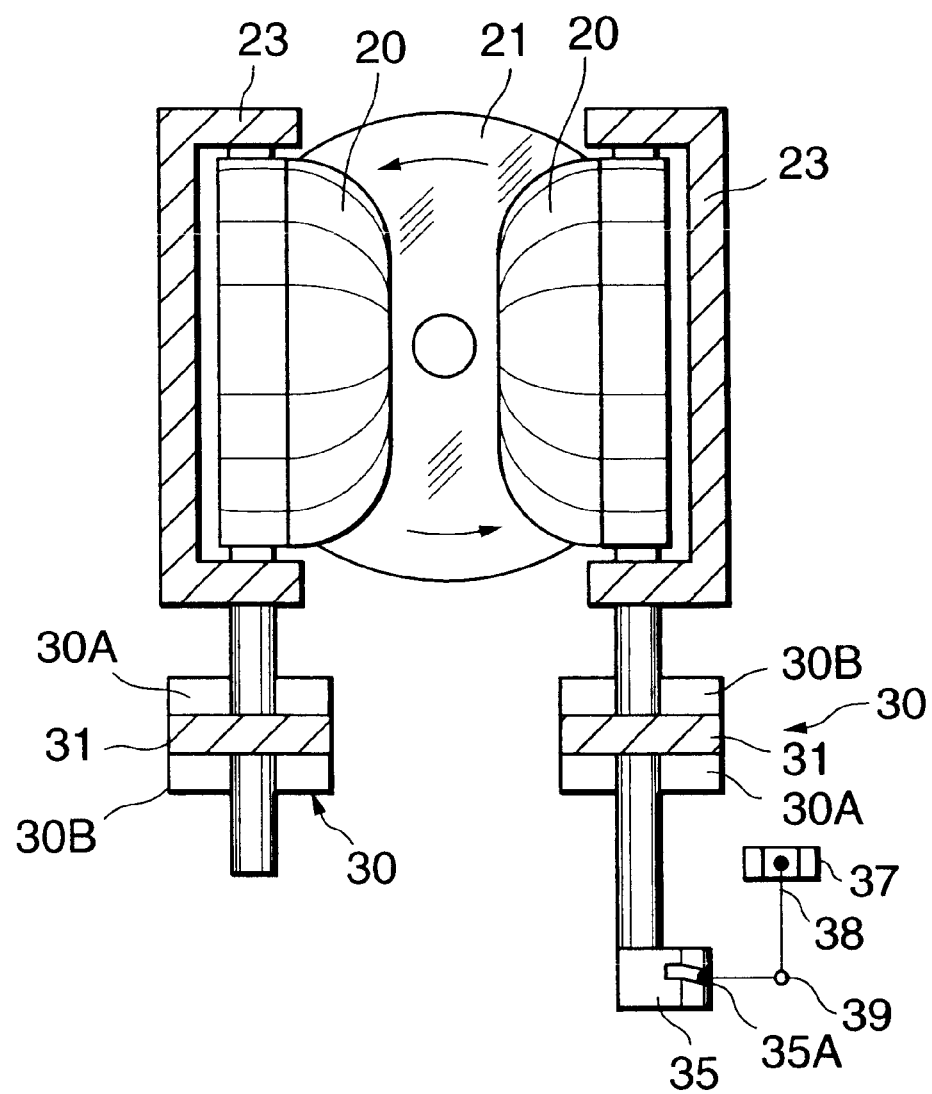
FIG. 3 is a cross-sectional view of a CVT which is applied to the IVT.

Referring to FIG. 3, the power roller 20 is supported free to pivot by a trunnion 23. The trunnion 23 is driven in the vertical direction of the figure by an oil pressure cylinder 30. The oil pressure cylinder 30 comprises a piston 31 fixed to the trunnion 23, and oil chambers 30A, 30B formed facing the piston 31. The trunnion 23 displaces in an axial direction according to a differential pressure of the oil chambers 30A, 30B, and thereby changes the contact position between the power roller 20, input disk 21 and output disk 22. As a result, the balance of forces around the trunnion 23 exerted by the disks 21, 22 on the power roller 20 changes, and the gyration angle of the power roller 20 changes. As the gyration angle of the power roller 20 changes, the trunnion 23 also undergoes a rotational displacement. Due to the variation of the gyration angle of the power roller 20, the ratio of the rotation transmitted between the input disk 21 and the output disk 22, i.e., the speed ratio, varies continuously.

Of the trunnions 23 facing each other in one toroidal unit, the oil chamber 30A of one of the trunnions 23 is situated above the piston 31, and the oil chamber 30A of the other trunnion 23 is situated below the piston 31. Likewise, the oil chamber 30B of one of the trunnions 23 is situated below the piston 31, and the oil chamber 30B of the other trunnion 23 is situated above the piston 31. An identical oil pressure is supplied to the two oil chambers 30A, and likewise an identical oil pressure is supplied to the two oil chambers 30B. Due to this arrangement of the oil chambers 30A, 30B, the two trunnions 23 are driven in mutually opposite directions.

The CVT 2 comprises a total of four of the trunnions 23, one of the trunnions 23 in the toroidal unit 2X being attached to a precess cam 35. An oil pressure is selectively supplied from a shift control valve 46 shown in FIG. 4 to the oil chambers 30A, 30B. The precess cam 35 feeds back a rotation angle of the trunnion 23, i.e., a gyration angle φ of the power roller 20, and the axial displacement of the trunnion 23, to the control valve 46. A slanting cam groove 35A is formed on the outer circumference of the precess cam 35, and one end of an L-shaped feedback link 38 fits in the cam groove 35A.

The feedback link 38 is supported free to pivot around a pivot shaft 39, one end being engaged with the cam groove 35A and the other end being connected to one end of a speed change link 37.

Figure 4:
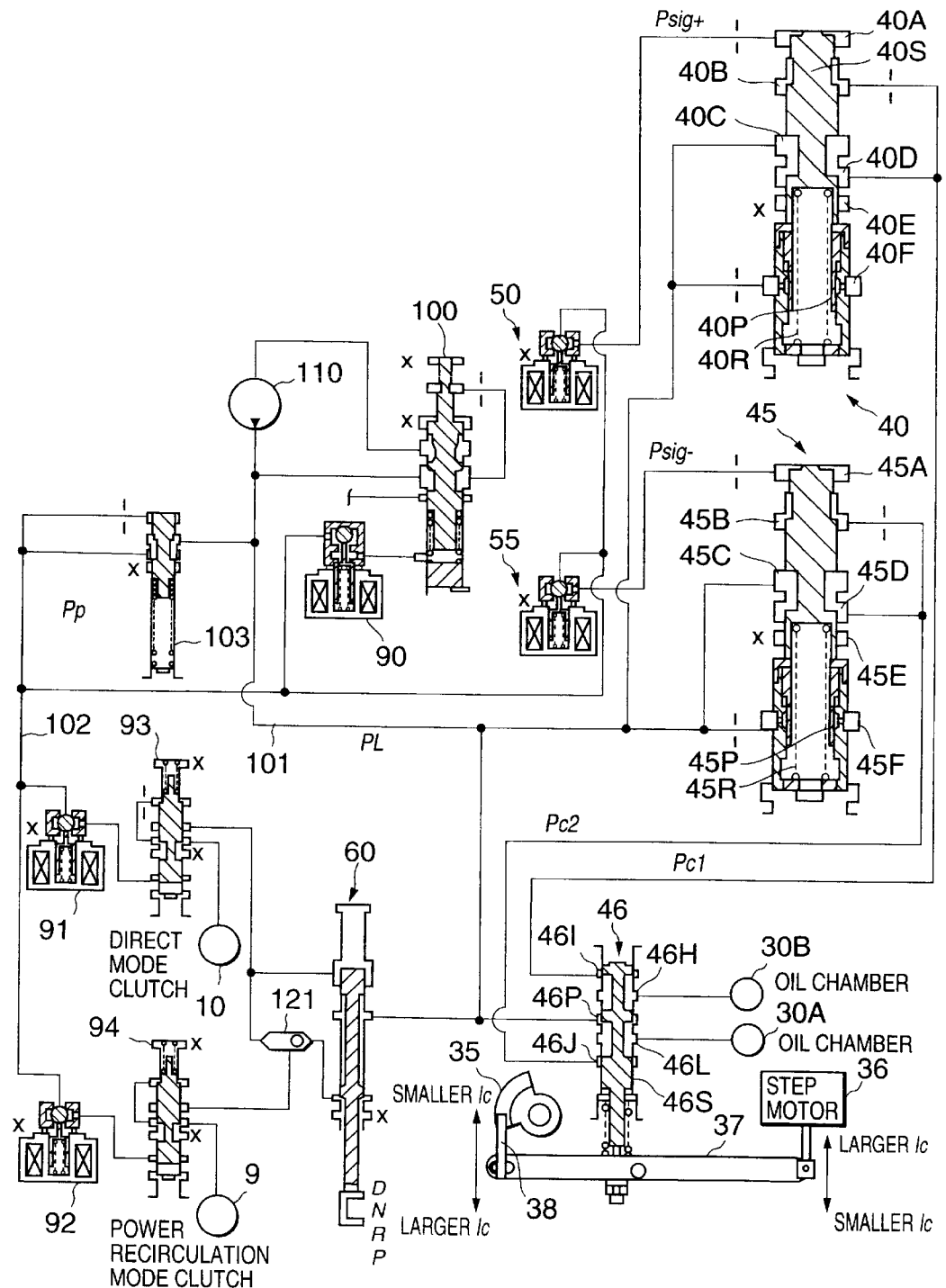
FIG. 4 is an oil pressure circuit diagram of the speed ratio control device according to this invention.

Referring to FIG. 4, the speed change link 37 is connected in its middle part to one end of a spool 46S of the shift control valve 46, and the end on the opposite side to the connection with the feedback link 38 is connected to a step motor 36. Due to this arrangement, in the speed change link 37 displaces the spool 46S in an axial direction under the drive of the step motor 36. Also, the spool 46S is displaced in an axial direction according to the rotational displacement and axial displacement of the precess cam 35. As a result, the spool 46S is maintained at a position where the displacements of the step motor 36 and precess cam 35 are balanced.

Referring again to FIG. 1, the CVT output shaft 4 is joined to a sun gear 5A of the planetary gear set 5, and to the final output shaft 6 via a direct clutch 10.

The reduction gear 3 comprises gears 3A, 3B, 3C which rotate together with the input shaft 1. The gear 3A is meshed with the gear 3B, and the gear 3B is joined to the output shaft 3C. The output shaft 3C is joined to a planet carrier 5B holding plural planet gears 5D of the planetary gear set 5 via a power recirculation clutch 9. A ring gear 5C of the planetary gear set 5 is joined to the final output shaft 6. The planet gears 5B are disposed between the sun gear 5A and ring gear 5C, and meshed with both gears.

The rotation of the final output shaft 6 is transmitted to drive wheels 11A, 11B of the vehicle via a transmission output gear 7, final gear 12 and differential gear 8.

In this IVT, the drive wheels 11A, 11B are driven in either one of two modes, i.e., a power recirculation mode wherein the power recirculation clutch 9 is engaged and the direct clutch 10 is disengaged, and a direct mode wherein the power recirculation clutch 9 is disengaged and direct clutch 10 is engaged.

In the power recirculation mode, the rotation speed of the planet carrier 5B is equal to a value obtained by dividing the engine rotation speed by the speed ratio of the reduction gear 3. The speed ratio of the reduction gear 3 is constant. On the other rotation speed of the sun gear 5A is equal to a value obtained by dividing the engine rotation speed by the speed ratio lc of the CVT 2. The rotation directions of the sun gear 5A and planet carrier 5B are always the same. Under the above conditions, the rotation direction of the ring gear 5C joined to the final output shaft 6 varies according to the ratio of the rotation speed of the planet carrier 5B and the rotation speed of the sun gear 5C. In other words, it varies according to the ratio of an engine rotation speed Ne and rotation speed No of the CVT output shaft 4, i.e., according to the speed ratio lc of the CVT 2. The change-over point of the rotation direction of the ring gear 5C is referred to as a geared neutral point GNP shown in FIG. 32.

At the geared neutral point GNP, the ring gear 5C, i.e., the final output shaft 6, does not rotate and the vehicle is at rest. When the CVT speed ratio lc increases beyond the neutral point GNP, the ring gear 5C rotates in the forward direction, and when the CVT speed ratio lc decreases to less than the GNP, the ring gear 5C rotates in the reverse direction. In other words, in the power recirculation mode, the vehicle can be changed over between forward and reverse by controlling the CVT speed ratio lc.

When the vehicle moves forward in the power recirculation mode, as the CVT speed ratio lc is increased from the GNP, an IVT speed ratio li decreases. In other words, the IVT speed ratio factor E=1/li of the IVT speed ratio li increases. When the IVT speed ratio factor E reaches a rotation synchronous point RSP at which the output rotation speed of the IVT in both modes is equal, the operating mode of the IVT shifts from the power recirculation mode to the direct mode. In the direct mode, the rotation of the CVT output shaft 4 is directly output to the final output shaft 6, so the IVT speed ratio factor E increases as the CVT speed ratio lc decreases. When the vehicle is decelerating, the CVT speed ratio lc varies in the reverse direction to that of acceleration. This characteristic of the IVT is disclosed in Tokkai Hei 9-89071 published by the Japanese Patent Office in 1997.

Figure 2:
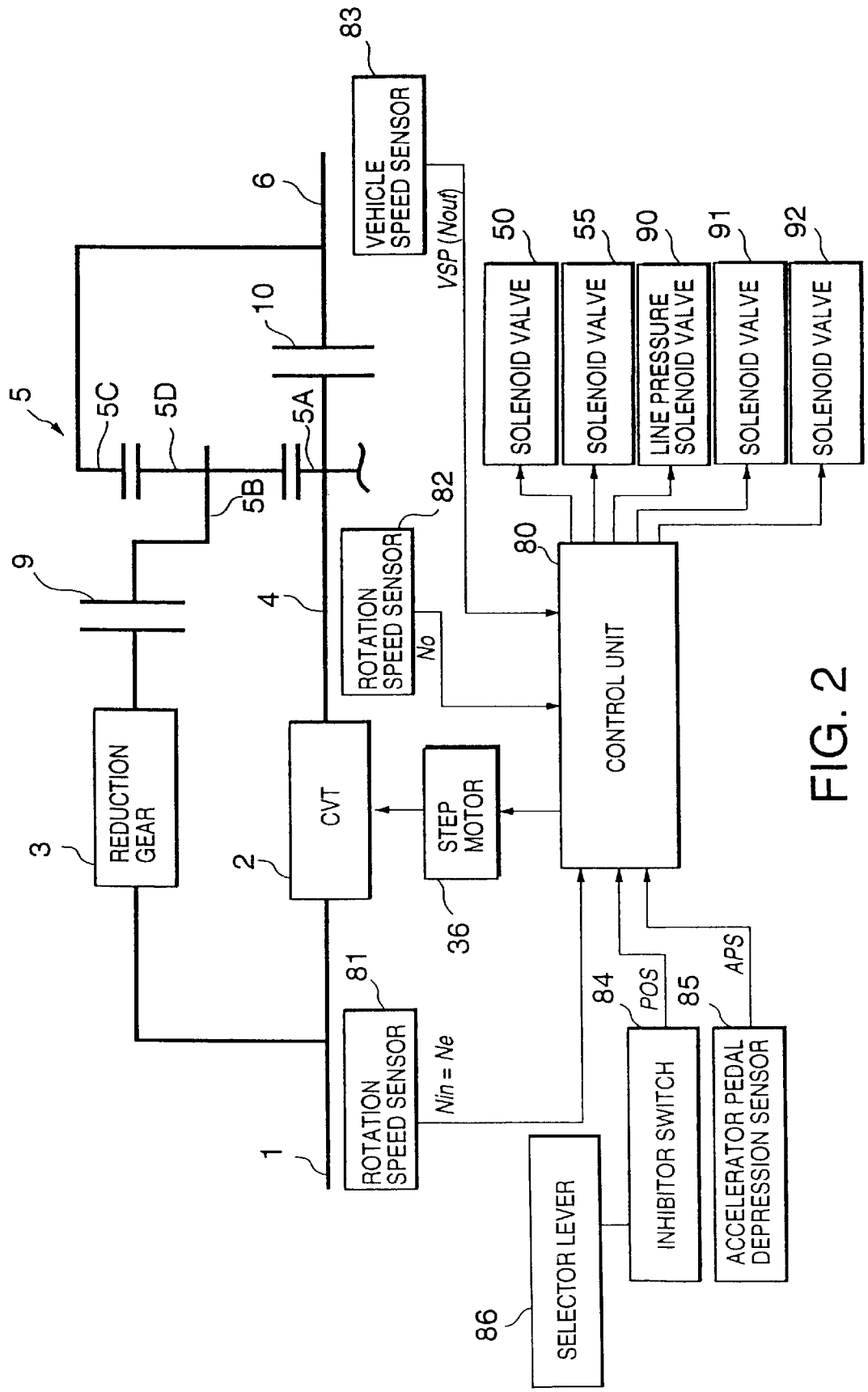
FIG. 2 is a schematic diagram of a speed ratio control device according to this invention.

The IVT is provided with a selector lever 86 shown in FIG. 2 with which the driver of the vehicle designates the operation mode of the vehicle. The selector lever selects any of a drive range (D range), reverse range (R range), neutral range (N range) and parking range (P range).

When the vehicle is moving forward, it corresponds to the case when the selector lever 86 has selected the D range. When the vehicle is reversing, it corresponds to the case when the selector lever 86 has selected the R range. When the vehicle is reversing, the power recirculation mode is selected and the CVT speed ratio lc is maintained at a value smaller than the geared neutral point GNP. In reverse, the IVT speed ratio factor E also becomes more negative the smaller the value of the CVT speed ratio lc.

In the direct mode, the torque transmission direction between the input disk 21 and output disk 22 of the CVT 2 is different for acceleration and deceleration. During acceleration, the engine torque is transmitted from the input disk 21 to the output disk 22 via the power rollers 20, but during deceleration, the torque of the drive wheels is transmitted from the output disk 22 to the input disk 21 via the power rollers 20. In the following description, torque transmission by the power rollers 20 from the input disk 21 to the output disk 22 will be referred to as a positive torque transmission, and torque transmission by the power rollers 20 from the output disk 22 to the input disk 21 will be referred to as a negative torque transmission.

In the power recirculation mode, the torque transmission direction due to the power rollers 20 is different for forward and reverse, and also different for acceleration and deceleration. When the vehicle is accelerating in a forward direction, the engine torque is input to the IVT, and the power rollers 20 transmit torque in the negative direction. When the vehicle is decelerating in the forward direction, the torque of the drive wheels 11A, 11B is input to the IVT, and the power rollers 20 transmits torque in the positive direction.

When the vehicle is accelerating in reverse, the engine torque is input to the IVT, and the power rollers 20 transmit torque in the positive direction. When the vehicle is decelerating in reverse, the torque of the drive wheels is input to the IVT, and the power rollers 20 transmit torque in the negative direction.

Figure 32:
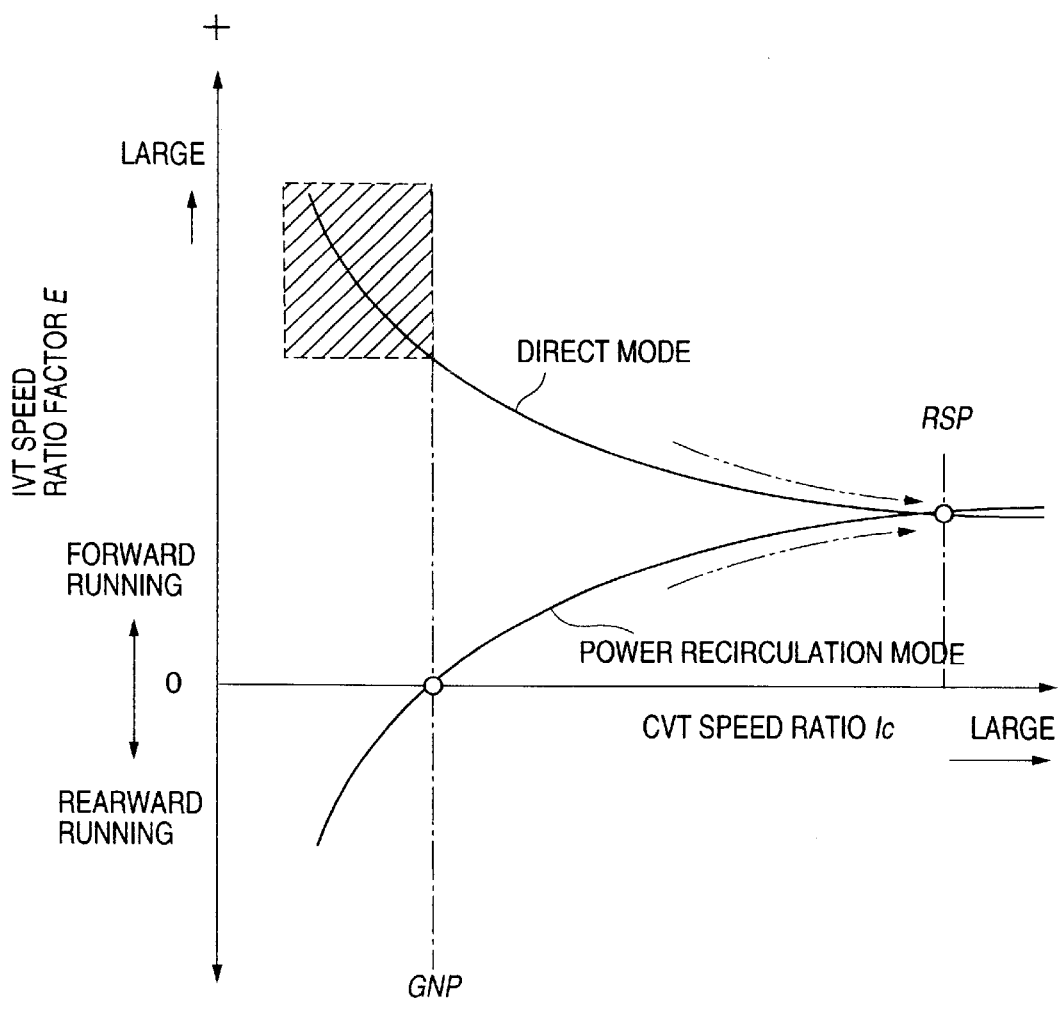
FIG. 32 is a diagram showing a relation between the CVT speed ratio lc and the IVT speed ratio factor E.

In other words, in the power recirculation mode shown in FIG. 32, when the CVT speed ratio lc is increasing, a negative torque transmission occurs, and when the CVT speed ratio lc is decreasing, a positive torque transmission occurs.

The control of the IVT is performed via an oil pressure circuit shown in FIG. 4 based on output signals of a control unit 80.

Next, the oil pressure circuit will be described referring to FIG. 4.

This oil pressure circuit comprises an oil pump 110, a pilot valve 103, a line pressure solenoid valve 90, a pressure regulator valve 100, the shift control valve 46, a manual valve 60, clutch control valves 93, 94, solenoid valves 91, 92, a positive torque control valve 40, a negative torque control valve 45, and solenoid valves 50, 55. The solenoid valves 50, 55, 90, 91, 92 are all controlled by duty signals output from the control unit 80 shown in FIG. 2.

A discharge pressure of the oil pressure pump 110 is adjusted to a predetermined line pressure PL by the pressure regulator valve 100 in response to a signal pressure output by the line pressure solenoid valve 90, and is supplied to the line pressure circuit 101. The line pressure solenoid valve 90 generates a signal pressure from a pilot pressure Pp of a pilot pressure circuit 102 based on an input signal from the control unit 80, and outputs this to the pressure regulator valve 100. The pilot pressure Pp is generated by the pilot valve 103 in direct proportion to the line pressure PL.

The solenoid valve 91 which engages and disengages the power recirculation clutch 9, and a solenoid valve 92 which engages and disengages the direct clutch 10, are connected to the pilot pressure circuit 102.

The solenoid valve 91 increases or decreases the pilot pressure Pp of the pilot pressure circuit 102 according to an input signal from the control unit 80 to generate a signal pressure, and supplies this to the clutch control valve 93. The clutch control valve 93 supplies the line pressure PL supplied via the manual valve 60 to the power recirculation clutch 9 according to an increase of the signal pressure from the solenoid valve 91, and thereby engages the power recirculation clutch 9. On the other hand, when the signal pressure from the solenoid valve 91 decreases, the clutch control valve 93 releases the power recirculation clutch 9 to a drain, and thereby disengages the power recirculation clutch 9.

Likewise, the solenoid valve 92 increases or decreases the pilot pressure Pp of the pilot pressure circuit 102 according to a signal from the control unit 80 to generate a signal pressure, and supplies this to the clutch control valve 94. The clutch control valve 94 supplies the line pressure PL supplied via the manual control valve 60 and a shuttle valve 121 to the direct clutch 10 according to an increase of the signal pressure from the solenoid valve 92, and thereby engages the direct clutch 10. On the other hand, when the signal pressure from the solenoid valve 92 decreases, the clutch control valve 94 releases the direct clutch 10 to the drain, and thereby disengages the direct clutch 10.

When the control unit 80 outputs an engaging signal to one of the solenoid valves 91, 92, it always outputs a disengaging signal to the other valve. Due to this signal operation, when one of the power recirculation clutch 9 and direct clutch 10 is engaged,the other clutch is disengaged. In other words, a change-over is performed between the power recirculation mode and direct mode. This mode change-over takes place only when the D range has been selected and the CVT speed ratio lc reaches the rotation synchronous point RSP, as shown in FIG. 32.

The positive torque control valve 40, negative torque control valve 45, shift control valve 46 and manual valve 60 are connected to the line pressure circuit 101.

A pressure port 46P connected to the line pressure circuit 101, a first port 46H connected to the oil chamber 30B of the oil pressure cylinders 30, a second port 46L connected to the oil chamber 30A of the oil pressure cylinders 30, a drain port 46I connected to the positive torque control valve 40, and a drain port 46J connected to the negative torque control valve 45, are formed in the shift control valve 46. The spool 46S connects the oil chamber 30A to one of the drain port 46J and pressure port 46P. When the spool 46S connects the oil chamber 30A to the drain port 46J, it connects the oil chamber 30B to the pressure port 46P. Likewise, when the spool 46S connects the oil chamber 30A to the pressure port 46P, it connects the oil chamber 30B to the drain port 46I.

The positive torque control valve 40 generates a control pressure Pc1 from the pilot pressure Pp of the pilot pressure circuit 102 according to a signal pressure Psig+ of the solenoid valve 50 controlled by the control unit 80, and supplies this to the drain port 46I. The negative torque control valve 40 generates a control pressure Pc2 from the pilot pressure Pp according to a signal pressure Psig− of the solenoid valve 55 controlled by the control unit 80, and supplies this to the drain port 46J. The solenoid valves 50, 55 are permanently closed, and in the non-energized state, the signal pressures Psig+, Psig− are both zero.

The positive torque control valve 40 comprises a spool 40S, a signal pressure port 40A facing the spool 40S, an output port 40D which outputs the control pressure Pc1, a feedback port 40B connected to the output port 40D, a pressure port 40C and a drain port 40E. The signal pressure Psig+ of the solenoid valve 50 is input to the signal pressure port 40A. The lower end of the spool 40S is elastically supported facing upwards in FIG. 4 by a spring 40R. The positive torque control valve 40 further comprises a sleeve 40P in contact with the lower end of the spool 40S, and a port 40F formed facing the sleeve 40P. The line pressure PL is led to the port 40F. The spool 40S is held in a position where the downward force in FIG. 4 due to the signal pressure Psig+ of the signal pressure port 40A and the control pressure Pc1 led to the feedback port 40B, balances the upward force due to the spring 40R and line pressure PL of the port 40F. When the signal pressure Psig+ is equal to or less than a predetermined value, the output port 40C communicates with the drain port 46I of the shift control valve 46 via the output port 40D. When the signal pressure Psig+ increases, the spool 40S displaces downwards against the spring 40R, and the output port 40D communicates with the drain port 40E.

The pressure-receiving surface area of the control pressure Pc1 acting on the spool 40S via the feedback port 40B is set to a value As equal to the pressure-receiving area of the line pressure PL acting on the sleeve 40P via the port 40F. The spool 40S is pushed upwards due to the pressure difference of the line pressure PL and control pressure Pc1. Here, if the pressure-receiving surface area of the signal pressure Psig+ of the port 40A of the spool 40S is Ass, and the pushing force of the spring 40R is Fs, the equilibrium of forces acting on the spool 40S may be represented by the following equation (1).

$$Psig+ * Aso1 = (PL-Pc1)*As + Fs \quad (1)$$

Herein, if M=Aso1/As=constant, and N=Fs/As=constant, equation (1) may be rewritten as follows.

$$PL-Pc1 = M*Psig+ - N \quad (2)$$

Equation (2) shows that a pressure difference ΔP=PL−Pc1 can be controlled by the signal pressure Psig+. When the signal pressure Psig+ is 0, ΔP=PL−Pc1<0, the control pressure Pc1 is obtained by decreasing the line pressure PL, and it does not exceed the line pressure PL. Therefore, the spool 40S is pushed upwards by the pushing force Fs of the spring 40R, the output port 40C and the output port 40D are connected, and Pc1=PL.

Figure 5:
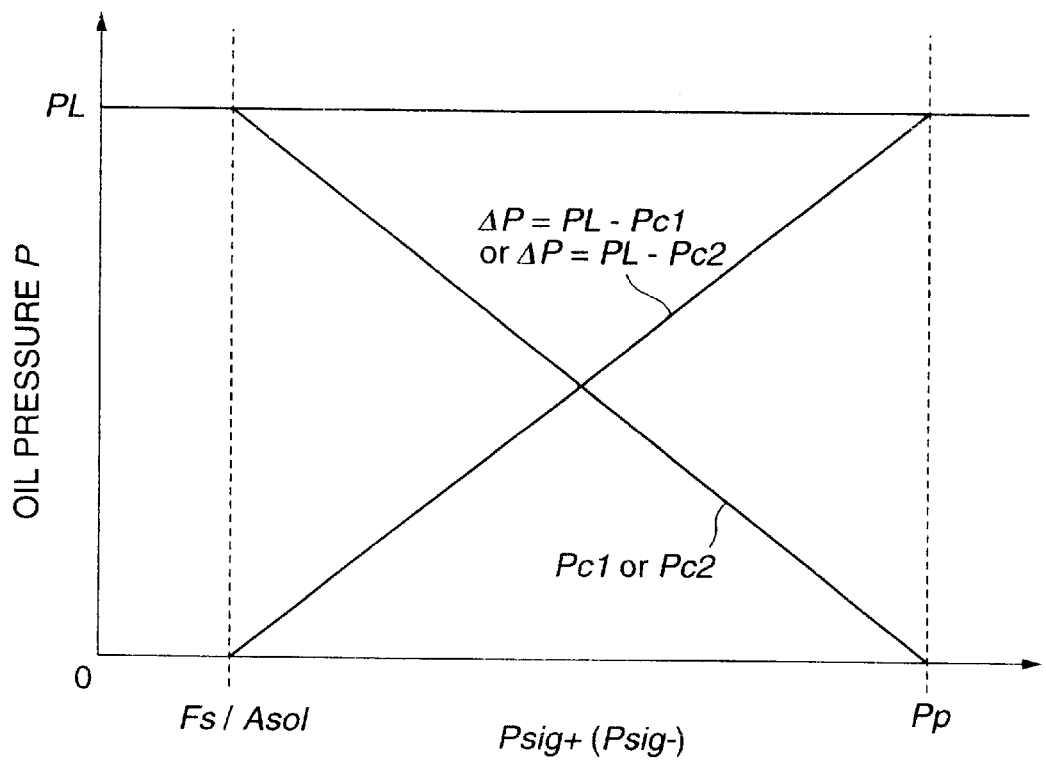
FIG. 5 is a diagram describing a relation of a signal pressure Psig+ (Psig−) of a solenoid valve, a control pressure Pc1 generated by a positive torque control valve, and a control pressure Pc2 generated by a negative torque control valve, according to this invention.

Due to the pushing force Fs of this spring 40R, the control pressure Pc1 does not vary within the interval from when the signal pressure Psig+=0 to when Psig+=N/M=Fs/Aso1 regardless of the signal pressure Psig+ as shown in FIG. 5. This range is the insensitive range of the positive torque control valve 40.

When the signal pressure Psig+ is greater than this range, the pressure difference ΔP increases according to the signal pressure Psig+. Further, when the signal pressure Psig+ reaches the pilot pressure Pp which is the maximum value, the pressure port 40C is shut by the spool 40S and the output port 40D communicates with the drain port 40E, so the control pressure Pc1 is 0, and the pressure difference ΔP is equal to the line pressure PL. When the line pressure PL varies, the control pressure Pc1 also varies, and this characteristic therefore holds also when the line pressure PL varies. However, as there is the limitation 0<Pc1<PL, the range of the pressure difference ΔP becomes smaller the smaller the line pressure PL.

Hence, the positive torque control valve 40 controls the pressure difference ΔP according to the signal pressure Psig+, and when the solenoid valve 50 is not energized, it makes the control pressure Pc1 equal to the line pressure PL so that the pressure difference ΔP=0.

Similarly, the negative torque control valve 45 comprises a signal pressure port 45A, a feedback port 45B, a pressure port 45C, an output port 45D which outputs a control pressure Pc2, a drain port 40E, a port 45F, a spool 45S and a spring 45R. The relation between the control pressure Pc2 and line pressure PL is identical to the relation between the control pressure Pc1 and line pressure PL as shown in FIG. 5.

Therefore, when the line pressure PL is supplied to the oil chamber 30A corresponding to the displacement of the spool 46S, the shift control valve 46 simultaneously supplies the control pressure Pc1 to the oil chamber 30B, and when the line pressure PL is supplied to the oil chamber 30B, the control pressure Pc2 is simultaneously supplied to the oil chamber 30A. For this reason, the pressure difference ΔP=PL−Pc1 or a pressure difference ΔP=PL−Pc2 always acts on the piston 31.

Here, the pressure difference ΔP is equal to the transmission torque of the power roller 20. Therefore, if the control pressure Pc1 is made equal to the line pressure PL, the transmission torque is zero. Also when the control pressure Pc2 is made equal to the line pressure PL, the transmission torque is zero. In this IVT, the pressure difference ΔP is arranged to be zero by applying the line pressure PL to the both sides of the piston 31.

Next, referring to FIG. 2, the control unit 80 controls the IVT speed ratio li and transmission torque of the power rollers 20 by signal outputs to the solenoid valves 50, 55, 90, 91, 92 and the step motor 36.

The control unit 80 is a microcomputer comprising a central processing unit (CPU), read-only memory (ROM), random access memory (RAM) and an input/output interface (I/O interface).

Signals are input to the control unit 80 respectively from a rotation speed sensor 81 which detects a rotation speed Nin of the input shaft 1, a rotation speed sensor 82 which detects the rotation speed No of the CVT output shaft 4, and a vehicle speed sensor 83 which detects a vehicle speed VSP from the rotation speed of the final output shaft 6. The rotation speed Nin of the input shaft 1 is equal to the engine rotation speed Ne. A selector lever position signal POS from an inhibitor switch 84 which detects a position of the selector lever 86, and a depression amount signal APS from an accelerator pedal depression sensor 85 which detects a depression amount of an accelerator pedal, not shown, which the vehicle is provided, are also respectively input to the control unit 80.

Based on these input signals, the control unit 80 output signals to the solenoid valves 91, 92, and thereby changes over between the power recirculation mode and the direct mode. The IVT speed ratio li is also controlled to a value depending on the vehicle running state by a signal output to the step motor 36. Further, in the power recirculation mode, the solenoid valve 50 or the solenoid valve 55 is selectively driven to control the transmission torque due to the power rollers 20 of the CVT 2. The control of the CVT transmission torque is disclosed in Tokkai Hei 11-247964 published by the Japanese Patent Office in 1999.

In the power recirculation mode, the control unit 80 changes over the shift control valve 46 according to the torque direction supported by the oil pressure cylinder 30. For example, consider the case where the input disk 21 is rotating in the direction shown by the arrow in FIG. 3. When the line pressure PL is supplied to the oil chamber 30B, the control unit 80 controls the transmission torque of the CVT 2 in the positive direction by a pressure difference ΔP2=PL−Pc2 between the line pressure PL of the oil chamber 30B and control pressure Pc2 of the oil chamber 30A. When the line pressure PL is supplied to the oil chamber 30A, the transmission torque of the CVT 2 in the negative direction is controlled by a pressure difference ΔP1=PL−Pc1 between the line pressure PL of the oil chamber 30A and the control pressure Pc1 of the oil chamber 30B.

In the direct mode, as the output torque of the CVT 2 is transmitted directly to the final output shaft 6, the vehicle is driven by the transmission torque of the CVT 2 in the positive direction, and the engine brake acts due to the transmission torque in the negative direction.

However, in the power recirculation mode, the travel direction of the vehicle is determined by the difference between the rotation speed of the planet carrier 5B driven by the reduction gear 3 and the rotation speed of the sun gear 5A which depends on the speed ratio lc of the CVT 2, and the direction of the torque transmitted by the CVT 2 is different for forward motion and reverse motion of the vehicle.

Forward travel occurs when the rotation speed of the planet carrier 5B is larger than the rotation speed of the sun gear 5A, i.e., when the speed ratio lc of the CVT 2 is larger than the geared neutral point GNP shown in FIG. 32. In this state, the rotation torque of the planet carrier 5B is transmitted to the ring gear 5C and sun gear 5A. In the CVT 2, torque is transmitted in the negative direction wherein the rotation of the sun gear 5A is transmitted to the input disk via the chain 4B and output disk 22. This torque is input from the input shaft 1 to the reduction gear 3, thus the drive force is recirculated in the IVT.

During reverse, the rotation speed of the sun gear 5A is larger than the rotation speed of the planet carrier 5B, corresponding to the case where the speed ratio lc of the CVT 2 is smaller than the geared neutral point GNP of FIG. 32. In this case, the torque of the sun gear 5A is transmitted to the planet carrier 5B and ring gear 5C, so in the CVT 2, torque is transmitted in the positive direction wherein the torque is transmitted from the input disk 21 to the output disk 22. The torque transmitted from the sun gear 5A to the planet carrier 5B is again input to the input disk 21 via the reduction gear 3, thus the drive force is recirculated in the opposite direction to that of forward motion in the IVT.

In the power recirculation mode, the control unit 80 controls the transmission torque of the CVT 2 so that the torque in an opposite direction to that of the accelerating forward motion, i.e., the torque resulting in engine braking, does not become excessive.

This control routine will be described referring to the flowchart of FIG. 6. This routine is performed only in the power recirculation mode. The routine is performed at an interval of ten milliseconds.

First, in a step S1, the selection position POS detected by the inhibitor switch 84, the accelerator pedal depression amount APS detected by the accelerator pedal depression sensor 85 and the vehicle speed VSP are read. Further, the CVT speed ratio lc is calculated from the input shaft rotation speed Nin detected by the input shaft rotation speed sensor 81 and the rotation speed No of the CVT output shaft 4 detected by the output shaft rotation speed sensor 82, and the corresponding gyration angle $\phi$ of the power rollers 20 is calculated. The calculation of the gyration angle $\phi$ is performed by looking up a prestored map. The selector lever position POS shows any of the D range, R range, N range and P range. In a step S2, it is determined whether or not the selector lever position signal POS is showing the D range. When the selector lever position signal POS is showing the D range, the routine proceeds to a step S3. When the selector lever position signal POS is showing another range, the routine proceeds to a step S5.

In the step S3, it is determined whether or not the vehicle speed VSP is greater than a predetermined low vehicle speed V1. In the low speed region where the vehicle speed VSP does not exceed the predetermined low vehicle speed V1, the routine proceeds to a step S4. The predetermined low vehicle speed V1 is set to 2–20 Km/hr. When the vehicle speed VSP exceeds the predetermined low vehicle speed V1, the routine proceeds to a step S6, and normal transmission torque control is performed. This processing will be described in detail later.

In the step S4, a pressure difference $\Delta P1$ between the line pressure PL and control pressure Pc1 is controlled.

First, the pressure difference $\Delta P1$ is calculated by the equation $\Delta P1=\phi(APS, \phi)$, and the control pressure Pc1 is controlled so that the transmission torque in the negative direction represented by the pressure difference $\Delta P1$ matches the running state. As described above, when the engine is accelerating the drive wheels in the forward direction in the power recirculation mode, torque transmission takes place in the negative direction in the CVT 2.

$\phi(APS, \phi)$ signifies that the pressure difference $\Delta P1$ is determined according to the accelerator pedal depression amount APS and gyration angle $\phi$ of the power rollers 20 using a preset map or function. In other words, the pressure difference $\Delta P1$ is determined according to the input torque to the input shaft 1 and the CVT speed ratio lc.

Also in the step S4, the pressure difference $\Delta P2$ between the line pressure PL and control pressure Pc2 is set to zero When the vehicle is decelerating in the forward motion state, a positive torque corresponding to the pressure difference $\Delta P2$ is transmitted by the CVT 2. The reason why the pressure difference $\Delta P2$ is set to zero is to prohibit this positive torque transmission. By prohibiting positive torque transmission, the engine brake is prevented from acting while the vehicle is moving forward. After the processing of the step S4, the routine is terminated.

In the step S2, when the selector lever position POS shows a range other than the D range, it is further determined in a step S5 whether or not the selector lever position POS shows the N range or the P range (hereinafter referred to as N/P range).

When the determining result of the step S5 is affirmative, the routine proceeds to a step S6, and when the determining result of the step S5 is negative, the selector lever position signal POS shows the R range. In this case, the routine proceeds to a step S7. In the step S7, it is determined whether or not the vehicle speed VSP exceeds the predetermined low vehicle speed V1. When the vehicle speed VSP exceeds the predetermined low vehicle speed V1, the routine proceeds to the step S6. When the vehicle speed VSP does not exceed the predetermined low vehicle speed V1, the routine proceeds to a step S8.

In the step S8, the pressure difference $\Delta P2$ of the line pressure PL and control pressure Pc2 is controlled.

First, the pressure difference $\Delta P2$ is calculated by the equation $\Delta P2=\phi(APS, \phi)$, and the control pressure Pc2 is controlled so that the transmission torque in the positive direction represented by the pressure difference $\Delta P2$ matches the running state. As described above, when the engine is accelerating the drive wheels in the reverse direction in the power recirculation mode, torque transmission takes place in the positive direction in the CVT 2.

$\phi(APS, \phi)$ signifies that the pressure difference $\Delta P2$ is determined according to the accelerator pedal depression amount APS and gyration angle $\phi$ of the power rollers 20 using a preset map or function.

Also in the step S8, the pressure difference $\Delta P1$ between the control pressure Pc1 and line pressure PL is set to 0. When the vehicle is decelerating in the reverse motion state, a negative torque corresponding to the pressure difference $\Delta P1$ is transmitted by the CVT 2. The reason why the pressure difference $\Delta P1$ is set to zero is to prohibit this negative torque transmission. By prohibiting negative torque transmission, the engine brake is prevented from acting while the vehicle is moving backward. After the processing of the step S8, the routine is terminated.

Next, the ordinary transmission torque control performed in the step S6 will be described. The routine proceeds to the step S6 when the vehicle speed VSP exceeds the predetermined low vehicle speed V1, or the selector lever position signal POS corresponds to the N/P range.

When the vehicle is moving forwards, the negative transmission torque is controlled based on the pressure difference $\Delta P1=\phi(APS, \phi)$. As far as concerns the engine brake, the positive transmission torque is controlled based on the pressure difference $\Delta P2=\phi(APS, \phi)$. When the vehicle is reversing, the positive transmission torque is controlled based on the pressure difference $\Delta P2=\phi(APS, \phi)$. As far as concerns the engine brake, the positive transmission torque is controlled based on the pressure difference $\Delta P1=\phi(APS, \phi)$. When the selector lever position signal POS corresponds to the N/P range, both of the power recirculation clutch 9 and direct clutch 10 are disengaged, so the IVT does not perform torque transmission.

Since the characteristic features of this invention are represented by the steps S4 and S8, and as the above three cases have no bearing on these features, they are grouped together as one step S6 as normal torque transmission control.

Due to the above routine, when the vehicle is traveling in the D range or R range, and the vehicle speed VSP is equal to or less than the predetermined low vehicle speed V1, transmission of torque in a direction which would cause engine braking is prohibited. For example, even when the engine brake is applied when the vehicle is moving forwards to stop the vehicle, the application of the engine brake is stopped at a low vehicle speed immediately prior to stopping. As a result, the vehicle stops smoothly.

When the vehicle speed VSP is equal to or less than the predetermined low vehicle speed V1, and a fault arises in the step motor 36 which varies the speed ratio Ic of the CVT 2, it may occur that the speed ratio of the CVT 2 is set to an incorrect value. Even in such a case, according to this speed ratio control device, transmission of torque in the opposite direction to that of the selection range is prohibited, so there is absolutely no possibility that the vehicle will begin traveling in the reverse direction, and the IVT can be provided with a suitable fail-safe function.

Figure 7:
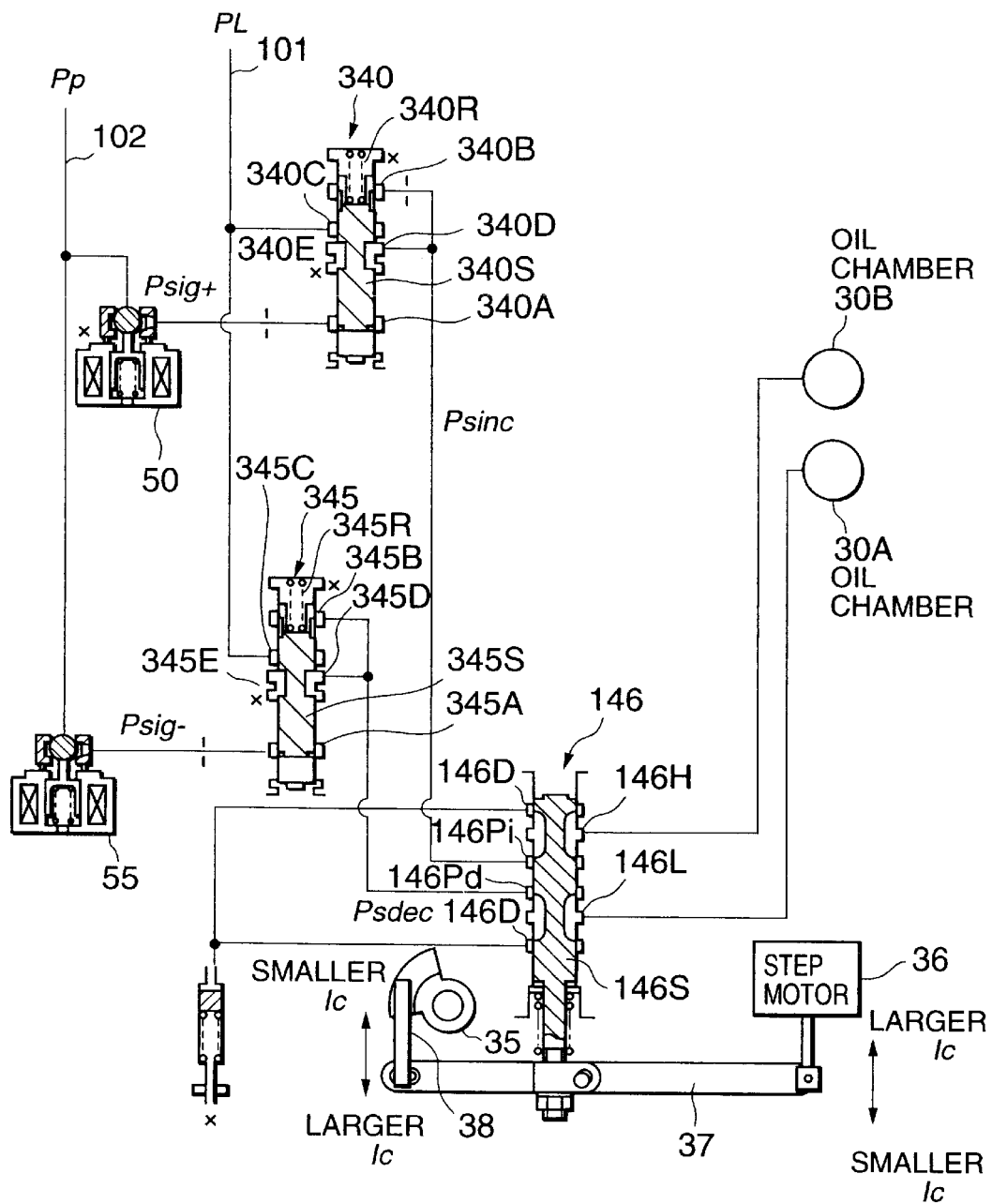
FIG. 7 is an oil pressure circuit diagram of a speed ratio control device according to a second embodiment of this invention.

Next, a second embodiment of this invention will be described referring to FIGS. 7–9.

In this embodiment, a positive torque control valve 340, negative torque control valve 345 and shift control valve 146 are used instead of the positive torque control valve 40, negative torque control valve 45 and shift control valve 46 of the first embodiment.

The positive torque control valve 340 and negative torque control valve 345 are permanently closed. When the solenoid valve 50 is not energized, the positive torque control valve 340 holds a spool 340S at the lowest position of the figure by a spring 340R, and connects an output port 340D with a drain port 340E. When the solenoid valve 50 is energized, the spool 340S is displaced upwards against the spring 340R due to the signal pressure Psig+ supplied from the solenoid valve 50 to a port 340A, and connects the output port 340D with a line pressure port 340C. A control pressure Psinc of the output port 340D thus varies from the drain pressure to the line pressure PL according to the displacement of the spool 340S. When the solenoid valve 55 is in the non-energized state, the positive torque control valve 340 holds a spool 345S at the lowest position of the figure due to a spring 345R, and connects an output port 345D with a drain port 345E. When the solenoid valve 55 is energized, the spool 345S is displaced upwards against the spring 345R due to the signal pressure Psig– supplied from the solenoid valve 55 to a port 345A, and connects the output port 345D with a line pressure port 345C. A control pressure Psdec of the output port 345D thus varies from the drain pressure to the line pressure PL according to the displacement of the spool 345S.

The shift control valve 146 comprises a spool 146S which is elastically supported by a spring, supply ports 146Pi and 146Pd, a first port 146H, a second port 146L and two drain ports 146D. The first port 146H communicates with the oil chambers 30B of the oil pressure cylinders 30, and the second port 146L communicates with the oil chambers 30A of the oil pressure cylinders 30. The supply port 146Pi communicates with the output port 340D of the positive torque control valve 340, and the supply port 146Pd communicates with the output port 345D of the negative torque control valve 345. The spool 146S selectively connects the second port 146L to the supply port 146Pd and drain port 146D according to its displacement position. Simultaneously, the first port 146H is selectively connected to the supply port 146Pi and drain port 146D.

Figure 8:
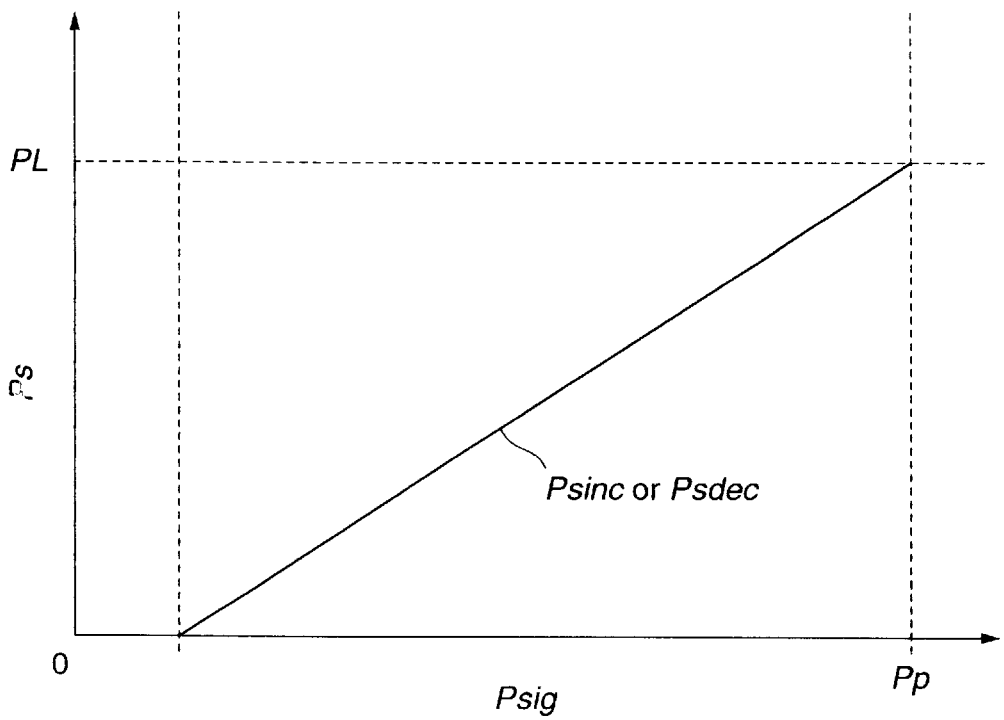
FIG. 8 is a diagram which describes a relation of a signal pressure Psig of a solenoid valve and a control pressure Psinc (Psdec) generated by a torque control valve, according to the second embodiment of this invention.
Figure 9:
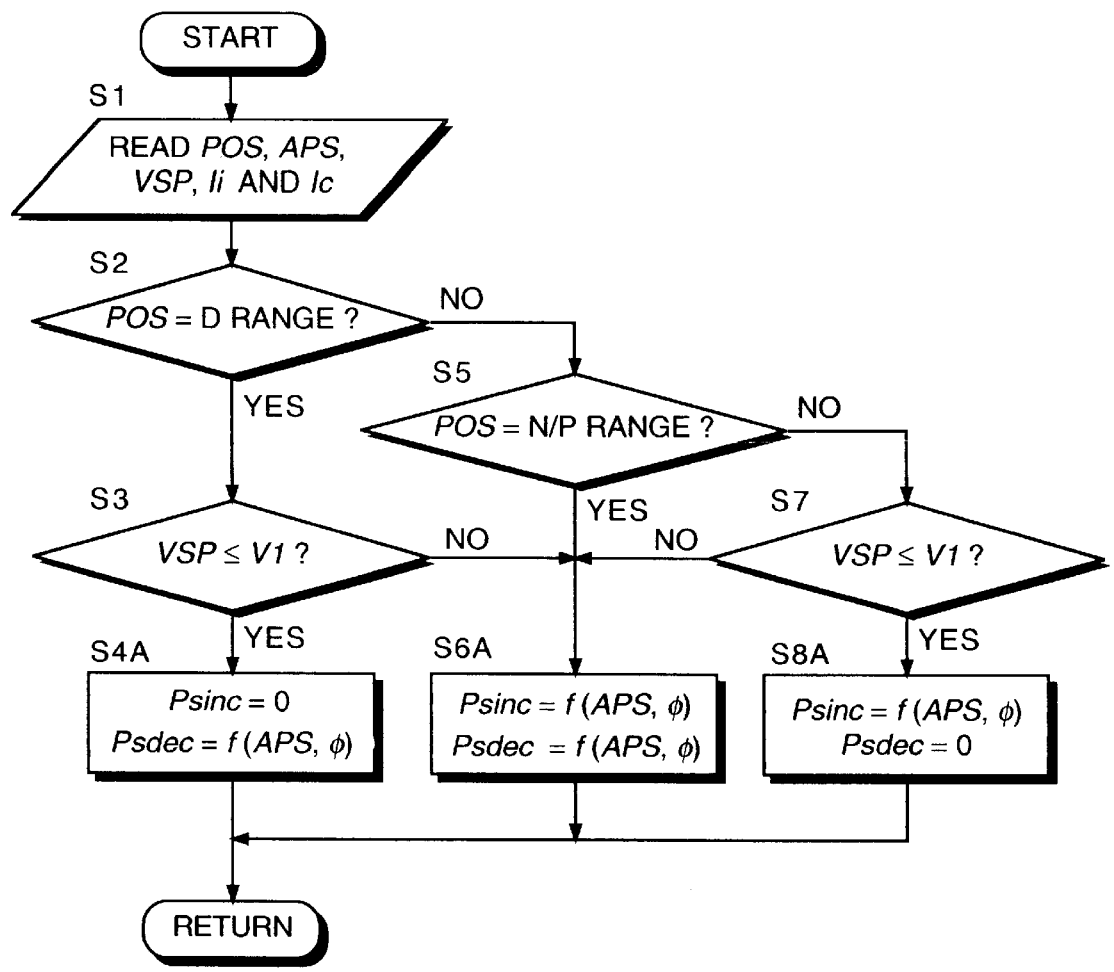
FIG. 9 is a flowchart describing a cylinder differential pressure control routine performed by a control unit according to the second embodiment of this invention.

The positive torque control valve 340 increases the control pressure Psinc of the output port 340D from zero to the line pressure PL as the signal pressure Psig+ from the solenoid valve 50 increases from zero to Pp, as shown in FIG. 8. Likewise, the control pressure Psdec of the output port 345D is increased from zero to the line pressure PL according to the signal pressure Psig– from the negative torque control valve 55.

When the step motor 36 operates in the increasing direction of the CVT speed ratio Ic, the shift control valve 146 connects the second port 146L to the supply port 146Pd, and connects the first port 146H to the drain port 146D. Conversely, when the step motor 36 operates in the decreasing direction of the CVT speed ratio Ic, it connects the second port 146L to the drain port 146D and the first port 146H to the supply port 46Pi.

When the speed ratio Ic is controlled, the control pressure Psinc of the positive torque control valve 340 and the control pressure Psdec of the negative torque control valve 345 are respectively maintained constant, and the spool 146S of the shift control valve 146 is driven by driving the step motor 36. As a result, the shift control valve 146 controls the flow direction and flowrate of oil.

When the transmission torque is controlled by the CVT 2, the second port 146L is connected to the supply port 146D, the first port 146H is connected to the drain port 146D, and the control pressure Psdec is varied. Alternatively, the first port 146H is connected to the supply port 146Pi, the second port 146L is connected to the drain port, and the control pressure Psinc is varied. As a result, the pressure difference $\Delta P$ of the oil pressures acting on the upper and lower sides of the pistons 31 of the oil pressure cylinders 30 becomes equal to the control pressure Psinc or Psdec. In other words, the transmission torque of the CVT 2 is controlled by controlling the oil pressure supplied to one of the oil chambers 30A, 30B.

In the power recirculation mode, the control unit 80 controls the transmission torque of the CVT 2 so that a torque in the opposite direction to the vehicle running direction, or in other words, the torque corresponding to the engine brake, does not become excessive.

This control routine will be described referring to the flowchart of FIG. 9. This routine corresponds to the routine of FIG. 6 of the first embodiment, and is performed only in the power recirculation mode. The routine is executed at an interval of 10 milliseconds.

Figure 6:
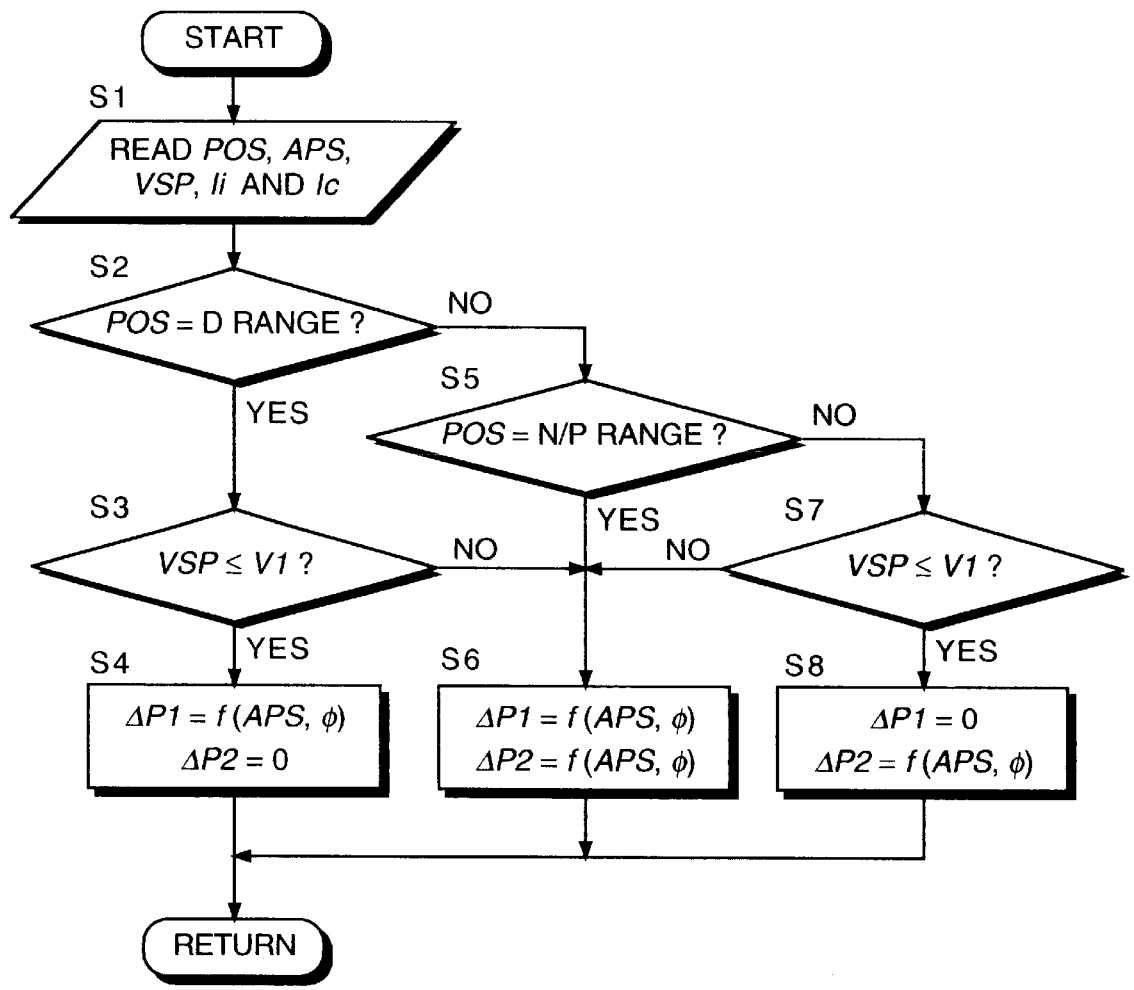
FIG. 6 is a flowchart describing a differential pressure control routine of oil pressure cylinders performed by a control unit according to this invention.

The difference between this routine and the routine of FIG. 6 is that steps S4A, S6A, S8A which control the control pressures Psinc, Psdec, are provided instead of the steps S4, S6, S8 which control the pressure differences $\Delta P1, \Delta P2$. The remaining steps are identical to FIG. 6.

When the vehicle is traveling in the D range, and the vehicle speed VSP becomes equal to or less than the predetermined low vehicle speed V1, the routine proceeds to the step S4A. Here, the control pressure Psinc corresponding to torque transmission in the positive direction is set to zero and engine braking is prohibited. On the other hand, the control pressure Psdec corresponding to torque transmission in the negative direction is controlled depending on the accelerator pedal depression amount APS and gyration angle φ of the power rollers 20.

When the vehicle is reversing in the R range, and the vehicle speed VSP becomes equal to or less than the predetermined low vehicle speed V1, the routine proceeds to a step S8B. Here, the control pressure Psdec corresponding to torque transmission in the negative direction is set to zero, and engine braking is prohibited. On the other hand, the control pressure Psinc corresponding to torque transmission in the positive direction is controlled depending on the accelerator pedal depression amount APS and gyration angle φ of the power roller 20.

In other cases, normal transmission torque control is performed in the step S6A via the control pressures Psinc and Psdec.

According also to this embodiment, in the D range or R range, when the vehicle speed VSP is equal to or less than the predetermined low vehicle speed V1, torque transmission of the CVT 2 corresponding to engine braking is prohibited.

Next, a third embodiment of this invention will be described referring to FIGS. 10–12.

In this embodiment, the shift control valve 46 of the first embodiment is combined with the positive torque control valve 340 and negative torque controller 345 of the second embodiment. Also, a duty solenoid valve which is permanently open is used for a solenoid valve 250 which supplies the signal pressure Psig+ to the positive torque control valve 340, and for a solenoid valve 255 which supplies the signal pressure Psig− to the negative torque control valve 345. The remaining features of the hardware construction are identical to those of the second embodiment.

The positive torque control valve 340 and negative control valve 345 are permanently closed, but as the solenoid valves 250, 255 are permanently open, when the solenoid valves 250, 255 are not energized, the signal pressures Psig+, Psig− are respectively equal to the pilot pressure Pp.

Figure 10:
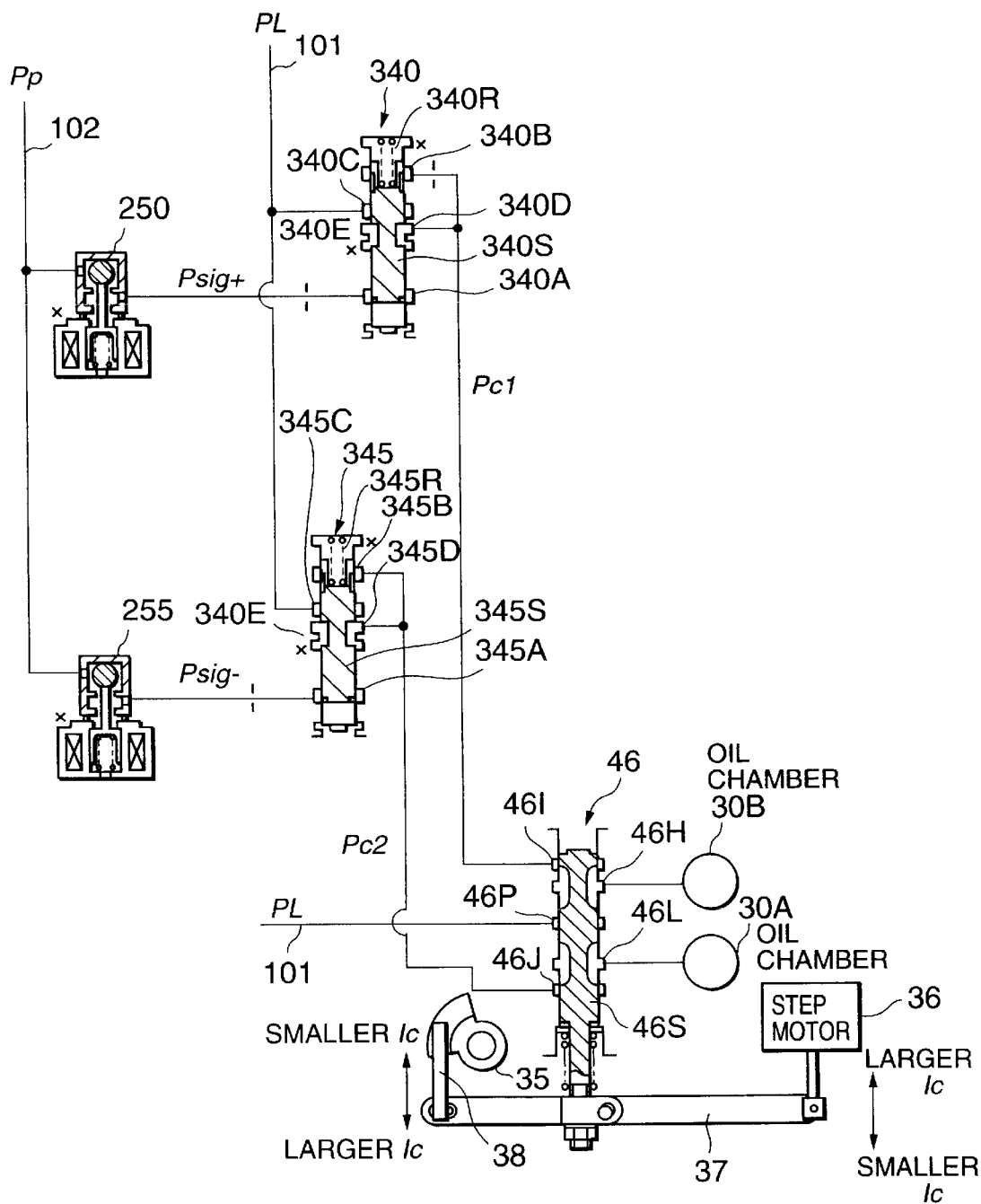
FIG. 10 is an oil pressure circuit diagram of a speed ratio control device according to a third embodiment of this invention.

As a result, when the solenoid valves 250,255 are not energized, the spools 340S, 345S of the positive torque control valve 340 and negative torque control valve 345 are respectively displaced to the upper part of FIG. 10, and the output ports 340D, 345D are connected with the line pressure circuit 101.

As a result, the control pressure Pc1 output from the output port 340D and the control pressure Pc2 output from the output port 345D are equal to the line pressure PL. As the pressure port 46P of the shift control valve 46 communicates with the line pressure circuit 101, its pressure is equal to the line pressure PL. Therefore, the pressure of the oil chambers 30A, 30B are the same regardless of the displacement of the spool 46S of the shift control valve 46, and the transmission torque of the CVT 2 is zero. For example, if the cable supplying energizing current to the solenoid valves 250, 255 is cut, the CVT 2 does not transmit torque. This circuit layout provides a fail-safe mechanism wherein torque is prevented from being transmitted in a direction unintended by the driver when a cable breaks while the vehicle is running.

Figure 11:
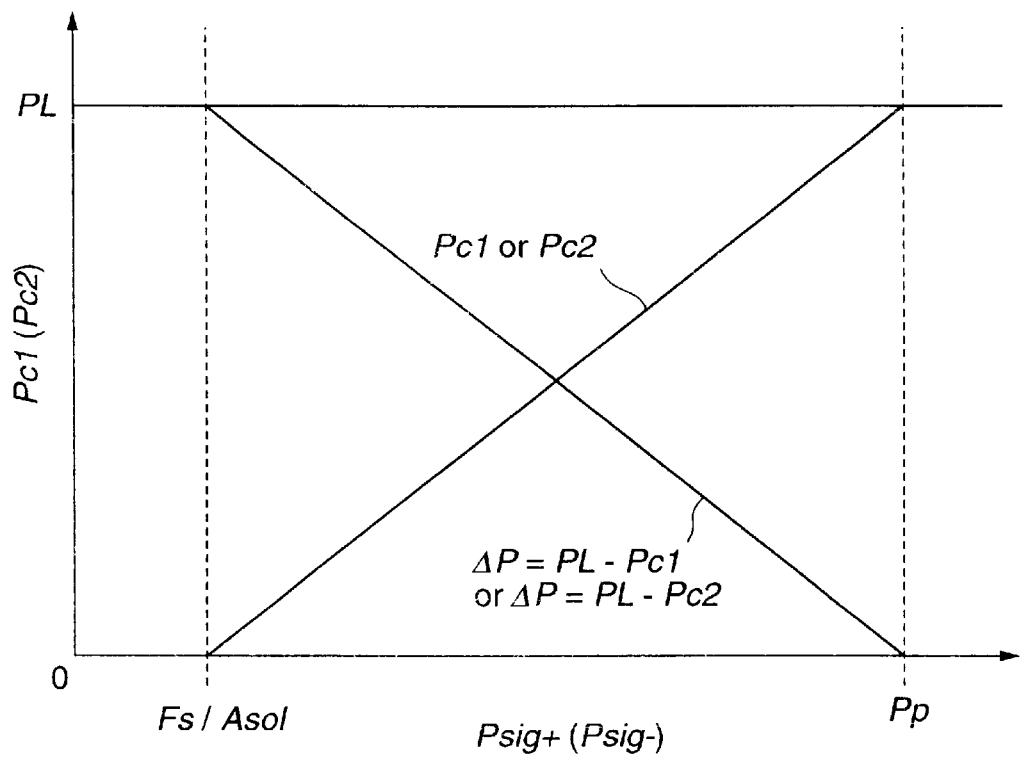
FIG. 11 is a diagram describing a relation of a signal pressure Psig+ (Psig−) of a solenoid valve, a control pressure Pc1 generated by a positive torque control valve, and a control pressure Pc2 generated by a negative torque control valve according to the third embodiment of this invention.
Figure 12:
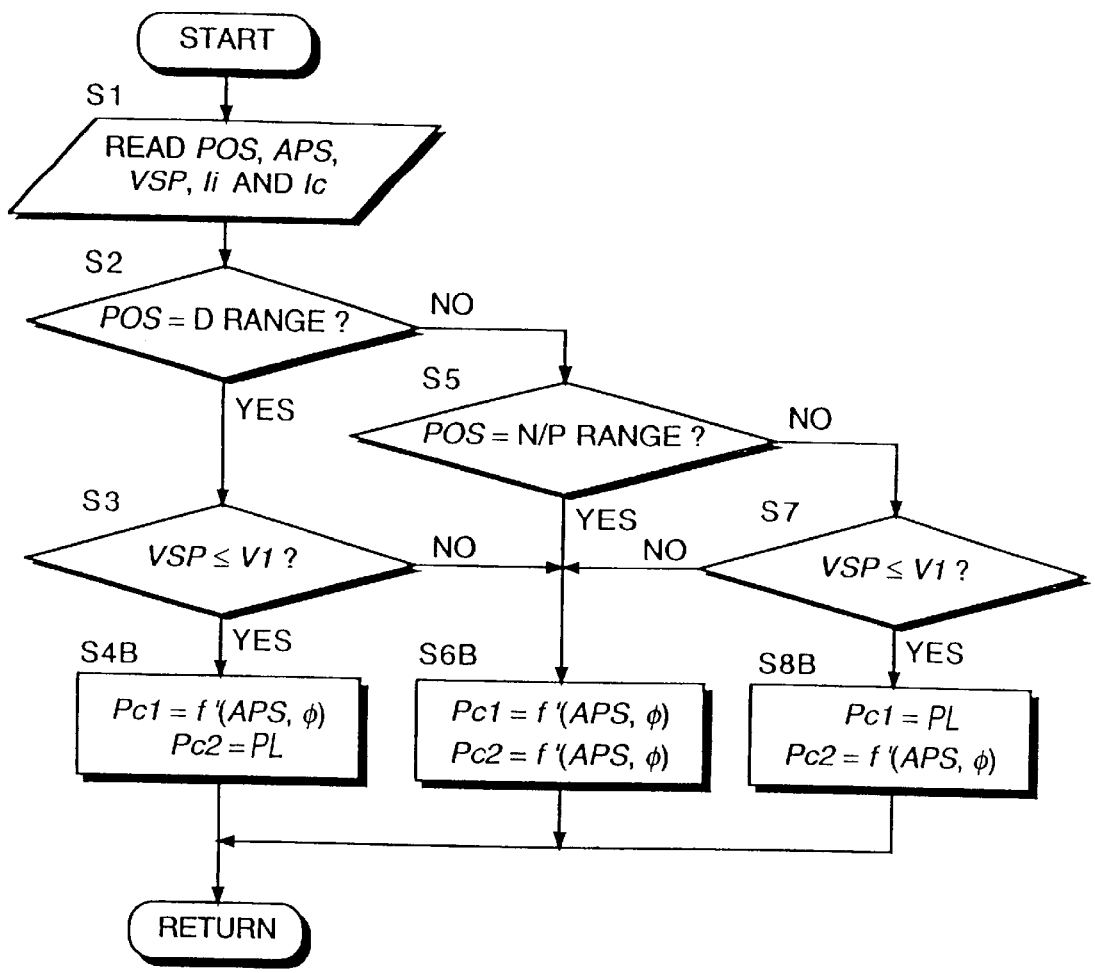
FIG. 12 is a flowchart describing a cylinder differential pressure control routine performed by a control unit according to the third embodiment of this invention.

On the other hand, when the solenoid valves 250, 255 are energized, the control pressure Pc1 decreases according to decrease of the signal pressure Psig+ as shown in FIG. 11. Likewise, the control pressure Pc2 decreases according to decrease of the signal pressure Psig−. The control unit 80 controls the pressure differences ΔP1, ΔP2 of the oil chambers 30A, 30B by varying the control pressures Pc1, Pc2 via control of the signal pressures Psig+, Psig−.

In this embodiment, the relation between the energizing current of the solenoid valves 250, 255, the signal pressure Psig+ and the signal pressure Psig− is the reverse of the relation between the energizing current of the solenoid valves 50, 55 of the first embodiment, the signal pressure Psig+ and the signal pressure Psig−. However, in this embodiment also, control of the transmission torque of the CVT 2 is performed so that a torque in the opposite direction to the vehicle running direction, i.e., the torque corresponding to the engine brake, does not become excessive.

Next, the transmission torque control routine performed by the control unit 80 will be described referring to the flowchart of FIG. 12. This routine also is performed only in the power recirculation mode. The routine is executed at an interval of ten milliseconds.

The difference between this routine and the routine of FIG. 6 is that steps S4B, S6B, S8B which control the control pressures Psinc, Psdec, are provided instead of the steps S4, S6, S8 which control the pressure differences ΔP1, ΔP2. The remaining steps are identical to FIG. 6.

When the vehicle is traveling in the D range, and the vehicle speed VSP becomes equal to or less than the predetermined low vehicle speed V1, the routine proceeds to the step S4B. Here, by setting the control pressure Pc2 equal to the line pressure PL, the pressure difference ΔP2 corresponding to torque transmission in the positive direction is set to zero so as to prohibit engine braking. On the other hand, the control pressure Pc1 which controls torque transmission in the negative direction, is controlled depending on the accelerator pedal depression amount APS and gyration angle φ of the power roller 20 by f'(APS, φ).

When the vehicle is reversing in the R range, and the vehicle speed VSP becomes equal to or less than the predetermined low vehicle speed V1, the routine proceeds to the step S8B. Here, by setting the control pressure Pc1 equal to the line pressure PL, the pressure difference ΔP1 corresponding to torque transmission in the negative direction is set to zero so as to prohibit engine braking. On the other hand, the control pressure Pc2 which controls torque transmission in the positive direction, is controlled depending on the accelerator pedal depression amount APS and gyration angle φ of the power roller 20 by f'(APS, 100 ).

According also to this embodiment, in the D range or R range, when the vehicle speed VSP is equal to or less than the predetermined low vehicle speed V1, torque transmission of the CVT 2 corresponding to engine braking is prohibited.

In other cases, normal transmission torque control is performed in the step S6B via the control pressures Psinc and Psdec.

In the aforesaid first-third embodiments, the speed change link 37 is used as mechanical feedback means to feed back the CVT speed ratio to the shift control valves 46, 146. However, as disclosed in Tokkai Sho 63-130954 published by the Japanese Patent Office in 1988, a sleeve capable of displacing relative to the spool of the shift control valve may also be provided, and this sleeve is connected to the precess cam to function as feedback means.

Next, a fourth embodiment of this invention will be described referring to FIGS. 13–26.

In this embodiment, the control unit 80 controls the IVT via an oil pressure circuit of a different configuration from that of the first–third embodiment. The oil pressure circuit according to this embodiment will first be explained referring to FIG. 13 and FIGS. 14A–14C.

1-1. Line Pressure and Lubricating Pressure System

Figure 13:
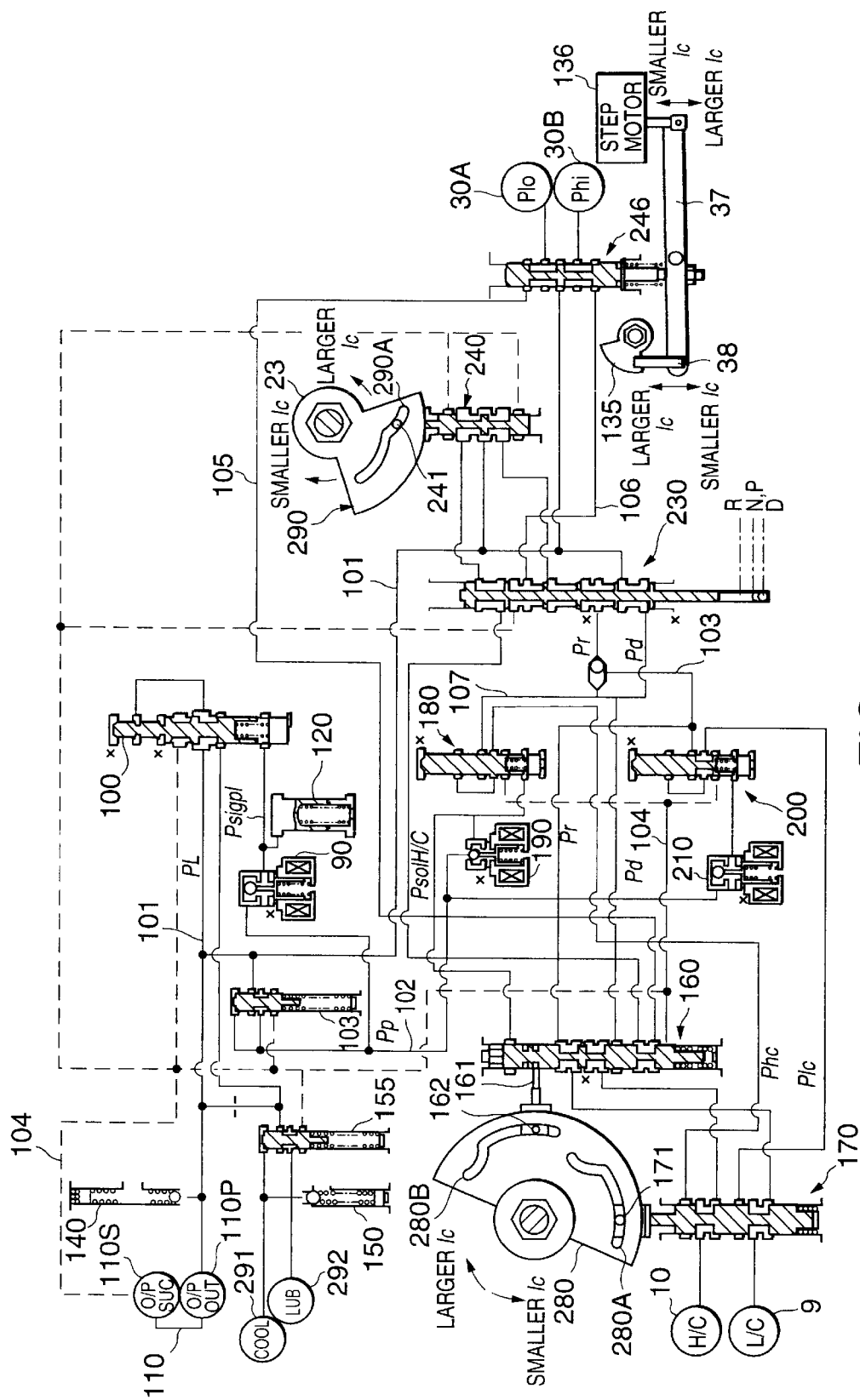
FIG. 13 is an oil pressure circuit diagram of a speed ratio control device according to a fourth embodiment of this invention.
Figure 14A:
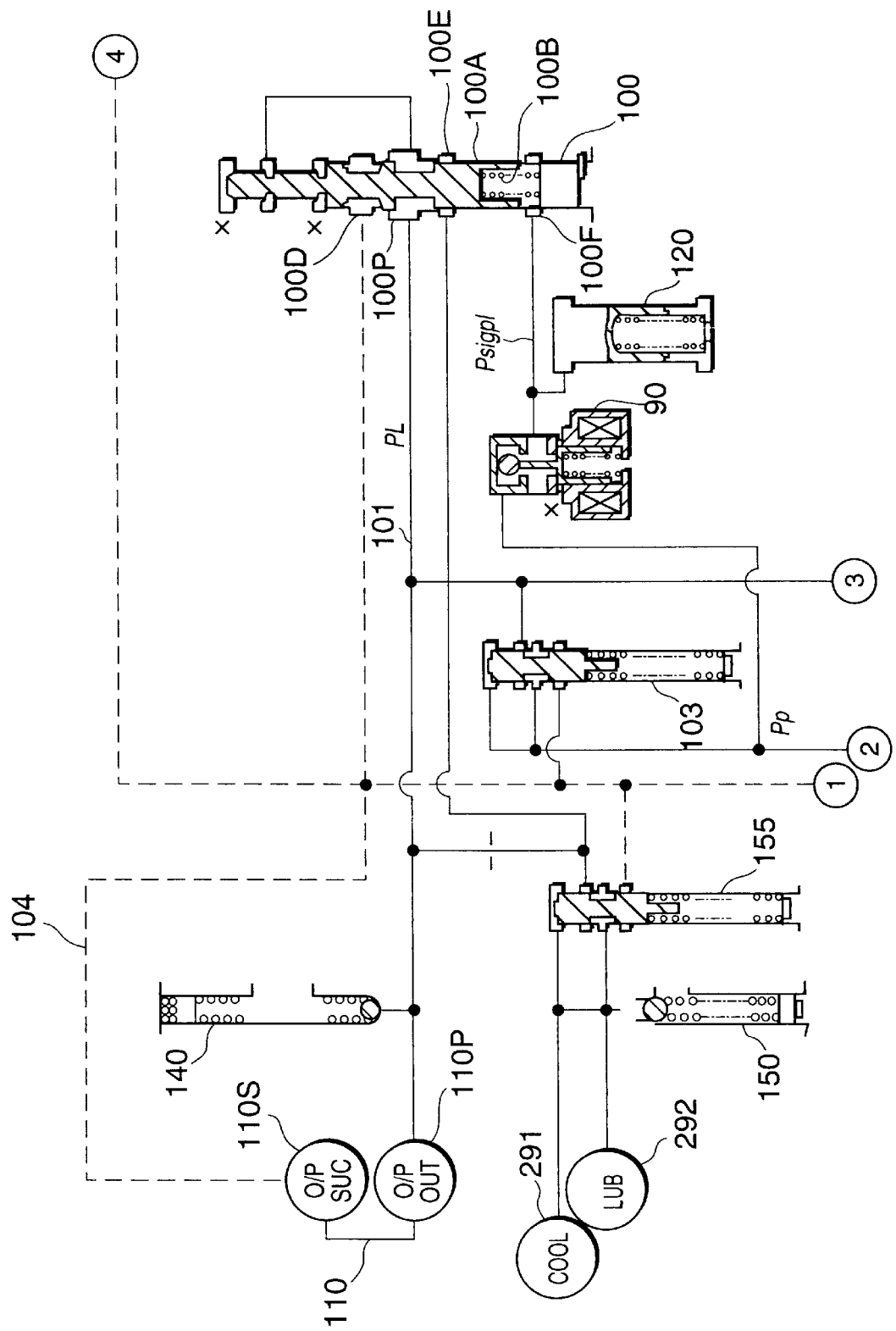

Referring to FIGS. 13 and 14A, a line pressure PL used for control of the IVT, and oil for lubrication and cooling of the IVT, are supplied by an oil pump 110 and pressure regulator valve 100.

The pressure regulator valve 100 comprises ports 100D, 100E, 100F and a pressure port 100P, and a spool 100A elastically supported by a spring 100B.

A discharge port 110P of the oil pump 110 is led to the pressure port 100P of the pressure regulator valve 100 via a line pressure circuit 101. On the other hand, a signal pressure Psigpl from a solenoid valve 90 is led to the port 100F of the pressure regulator valve 100.

The spool 100A of the pressure regulator valve 100 displaces to a position where this signal pressure Psigpl, the elastic supporting force of the spring 100B and the oil pressure from the discharge port 110P, are balanced. Consequently, the line pressure PL of the line pressure circuit 101 connected to the pressure port 100P is controlled to have a fixed relation with the signal pressure Psigpl.

Figure 16:
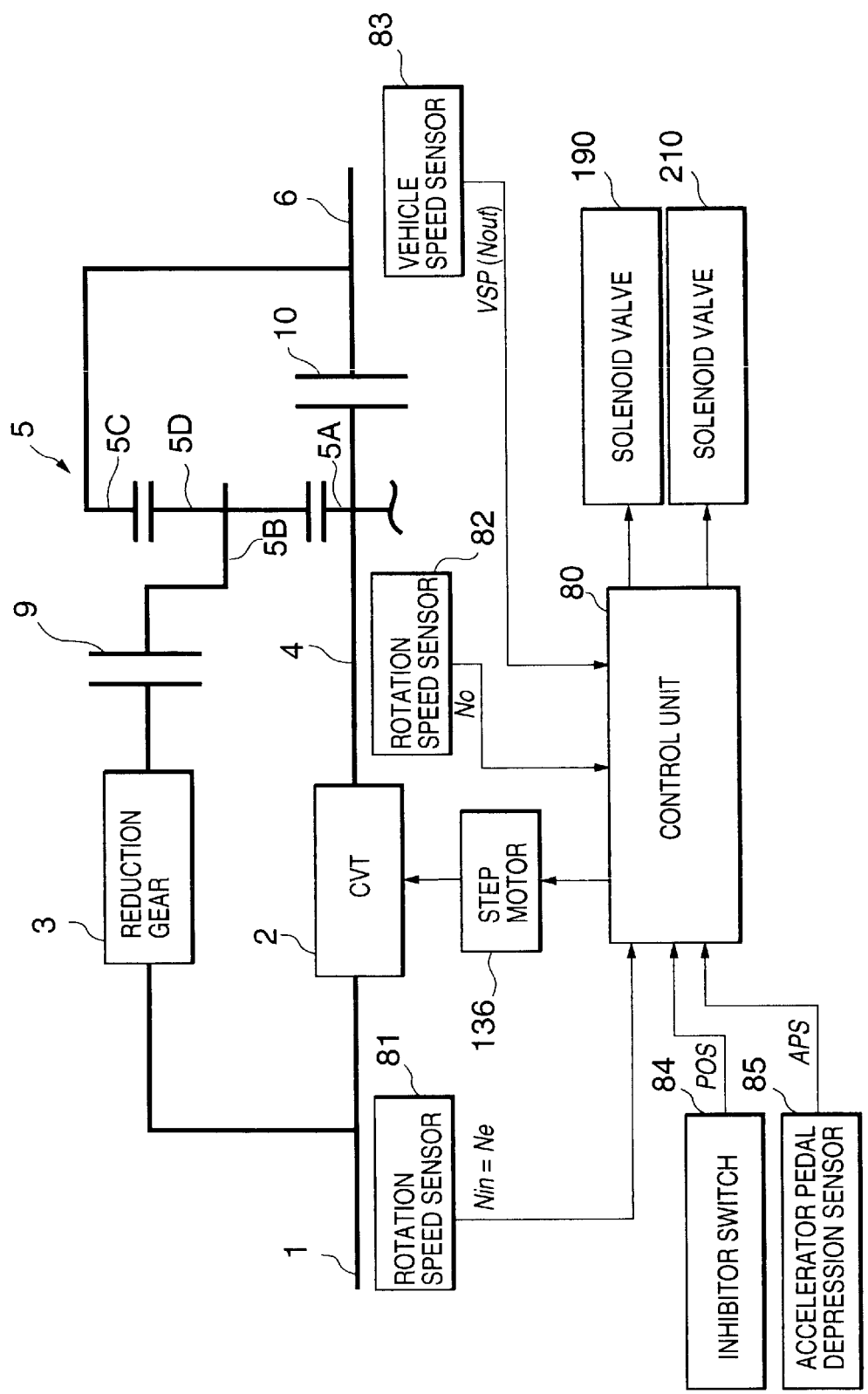
FIG. 16 is a schematic diagram of a speed ratio control device according to the fourth embodiment of this invention.

The solenoid valve 90 is controlled by the control unit 80 shown in FIG. 16, and generates the signal pressure Psigpl according to the output signal from the control unit 80 using a pilot pressure Pp from a pilot pressure circuit 102 as an original pressure. The pilot pressure Pp is generated by a pilot valve 103 in proportion to the line pressure PL from the pressure regulator valve 100. An accumulator 120 is interposed between the solenoid valve 90 and the port 100F of the pressure regulator valve 100.

An intake port 110S of the oil pump 110 connects with a pump suction passage 104. If the line pressure PL rises, the drain port 100D of the pressure regulator valve 100 and the pressure port 100P are connected, and the line pressure PL is reduced. Further, when the line pressure PL exceeds a predetermined value, a relief valve 140 operates and the pressure of the line pressure circuit 101 is reduced.

A cooling port 100E of the pressure regulator valve 100 is connected to a cooler 291 of the transmission via a pressure reduction valve 155. The pressure reduction valve 155 prevents the supply pressure to the cooler 291 from exceeding a fixed pressure to protect the pipe system of the cooler 291. Further, a fast action relief valve 150 is provided so that the pressure of the cooler 291 does not rise abnormally even if the pressure reduction valve 155 sticks.

The pressure which is suitably controlled by the pressure reduction valve 155 is also connected to a lubricating mechanism 292 via an orifice.

Thus, each part of the IVT is cooled and lubricated by oil supplied from the cooling port 100E.

The line pressure PL which is regulated by the pressure regulation valve 100 is supplied via the line pressure circuit 101 to the manual valve 230 which responds to the selector lever, the counter torque cutoff valve 240 which responds to the gyration angle φ of the trunnion 23 and the shift control valve 246 which responds to the step motor 136 and precess cam 135 via the speed change link 37.

1-2. Shift Control Valve

Figure 14B:
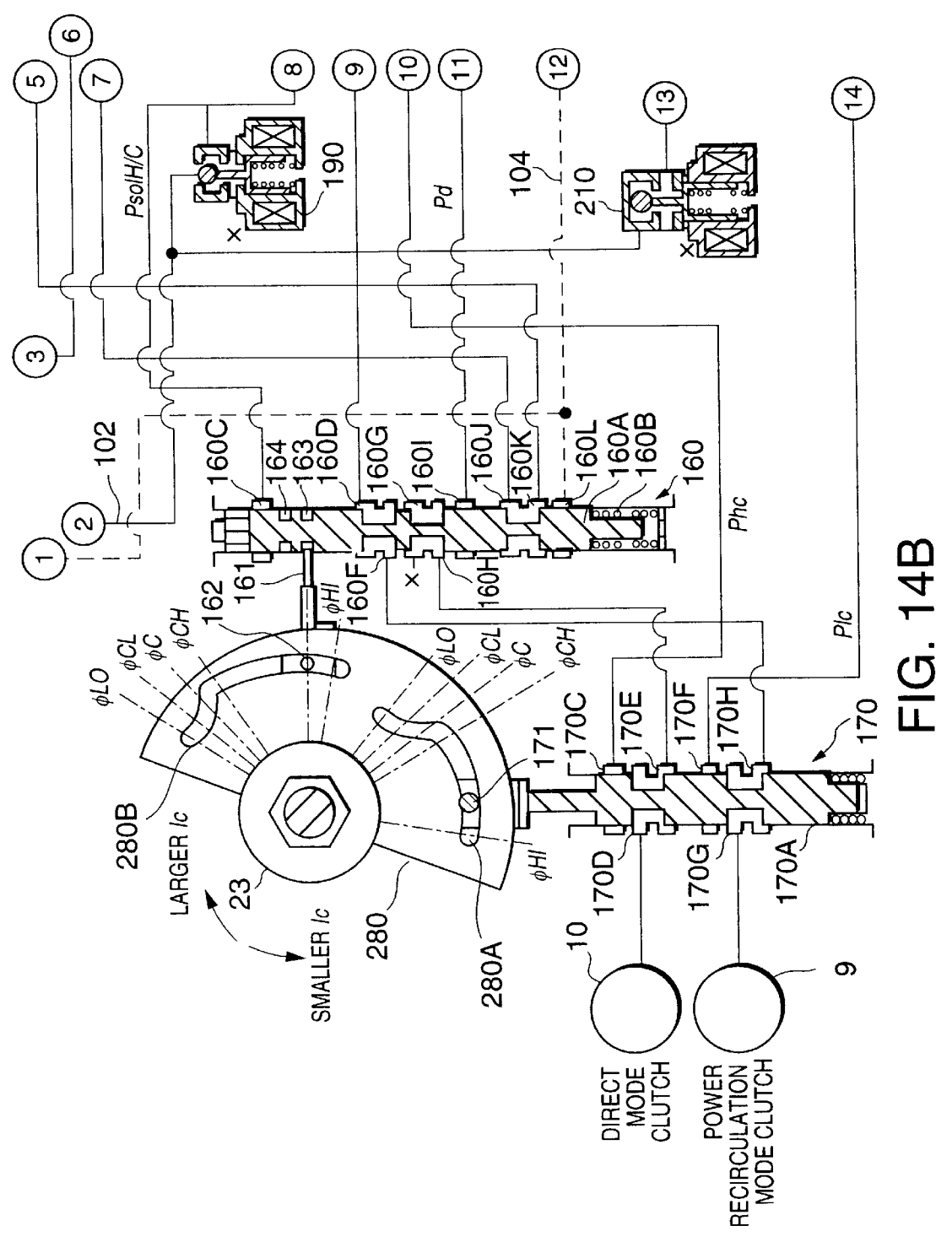
Figure 14C:
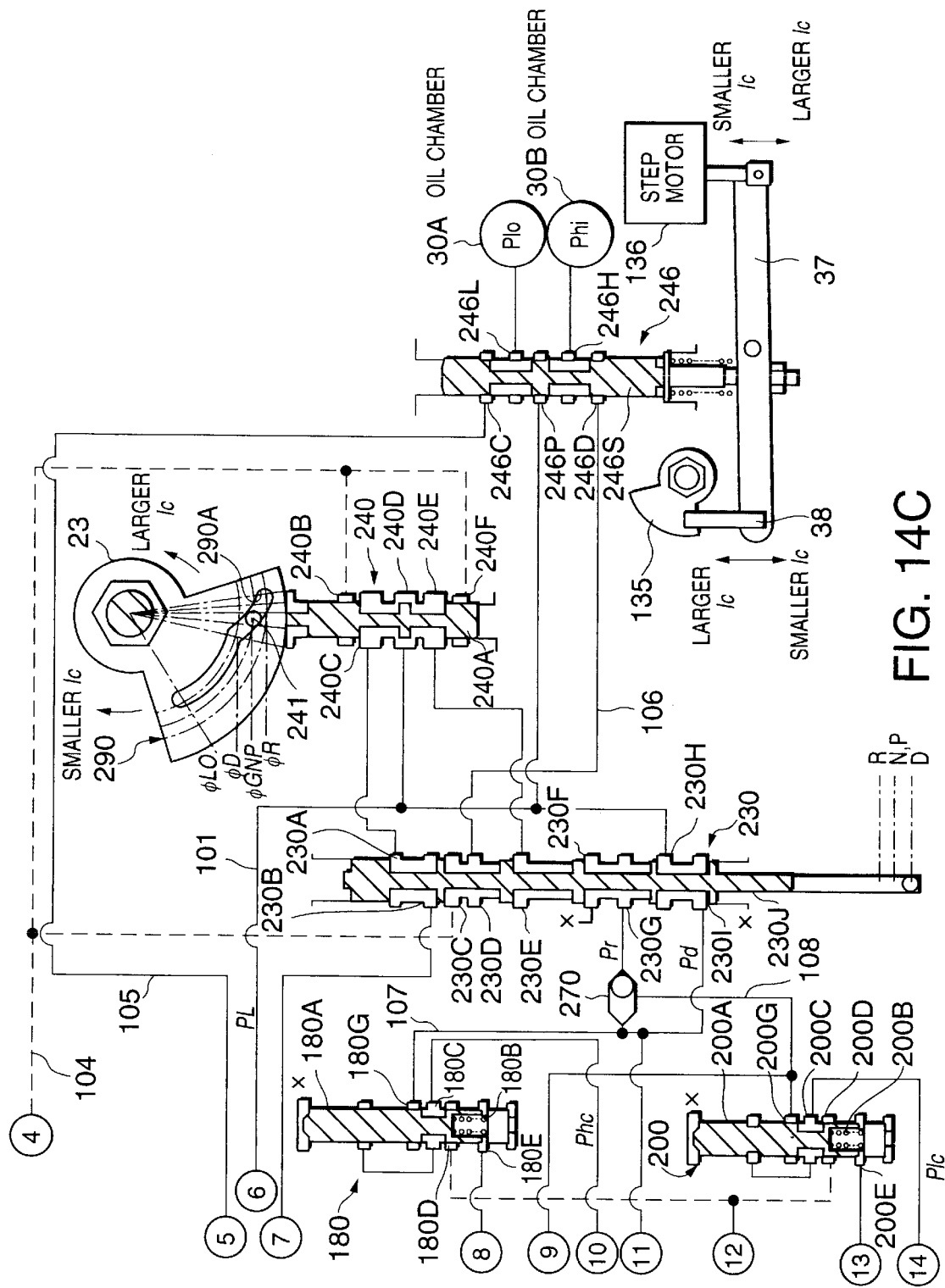

Referring to FIGS. 13 and 14C, the shift control valve 246 comprises a supply port 246P communicating with the line pressure circuit 101, a first port 246H communicating with the oil chamber 30B of the oil pressure cylinder 30, and a second port 246L communicating with the oil chamber 30A of the oil pressure cylinder 30. The shift control valve 246 supplies the line pressure PL to either one of the first port 246H and the second port 246L according to the displacement of the spool 246S connected to the speed change link 37, while connecting the other port to drain ports 246C or 246D.

The drain port 246C communicating with a port 160K of a mode fixing valve 160 via an oil passage 105 is connected to the second port 246L according to the displacement of the spool 246S.

The port 246D communicating with a port 230D of the manual valve 230 via an oil passage 106 is connected to the first port 246H according to the displacement of the spool 246S.

It should be noted that the relation between the moving direction of the speed change link 37 and speed change direction of the CVT 2 is reversed from the relation of those of the first embodiment due to the reason that the location of the first port 246H and second port 246L is reversed from that of the first embodiment.

Figure 15:
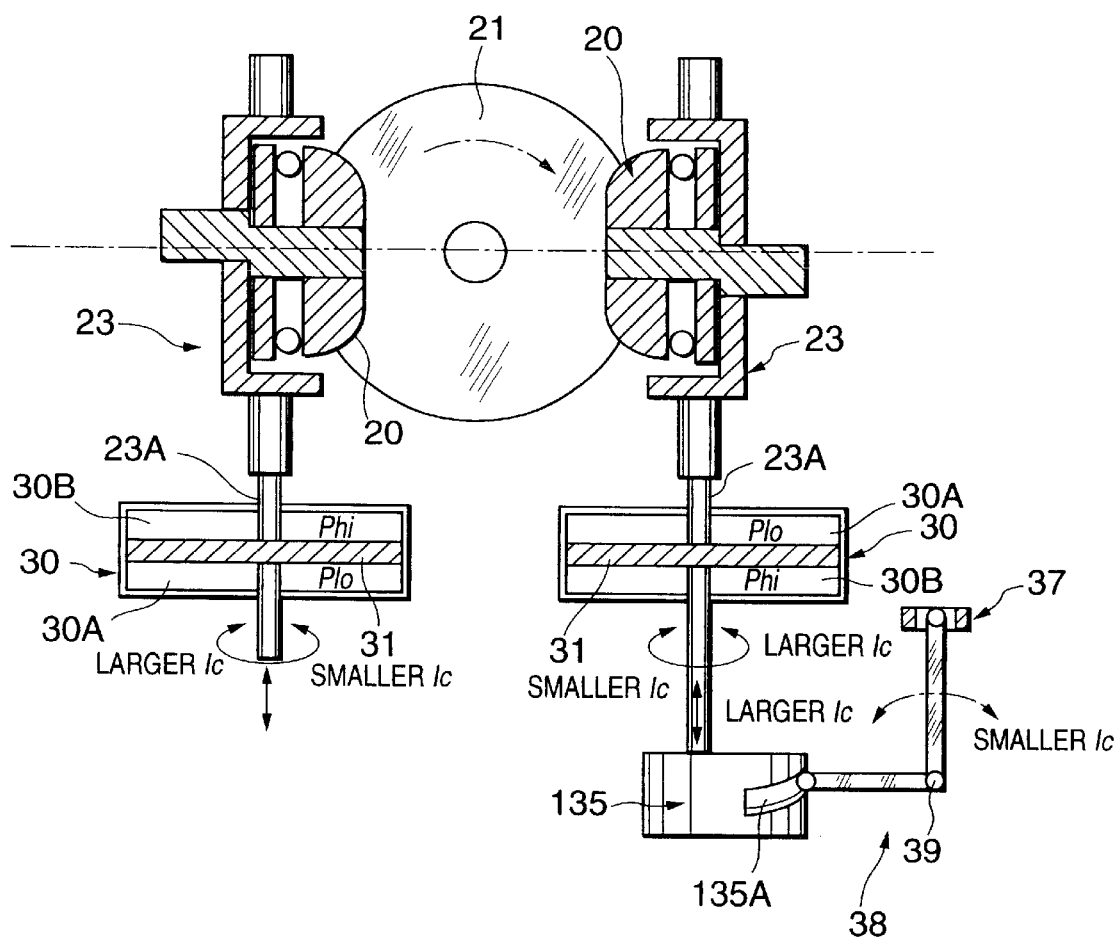
FIG. 15 is a cross-sectional view of essential parts of a CVT to which a fourth embodiment of this invention is applied.

The precess cam 135 shown in FIG. 15 is fitted to one of the trunnions 23 of the toroidal unit 2Y. The input disk 21 of the toroidal unit 2X and that of the toroidal unit 2Y rotates in the same direction, but since these disks 21 are disposed to face each other, the rotation direction of the input disk 21 in FIG. 3 differs from the rotation direction of the input disk 21 in FIG. 15.

1-3. Manual Valve

Referring to FIGS. 13, 14C and 17A–17C, the manual valve 230 is provided with a spool 230J, and a port 230A, a port 230B, a port 230C, the port 230D, a port 230E, a drain port 230F, an R range pressure port 230G, a line pressure port 230H, and a D range pressure port 230I facing the spool 230J.

The spool 230J is located in one of three positions, i.e., reverse (R), neutral/parking (N/P) and drive (D), by the operation of the selector lever 86.

Figure 17A:
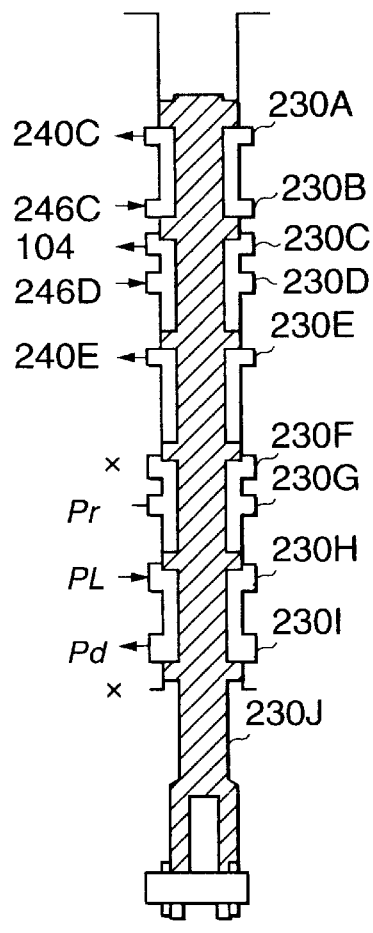
FIGS. 17A–17C are longitudinal sectional views of a manual valve according to the fourth embodiment of this invention.
Figure 17B:
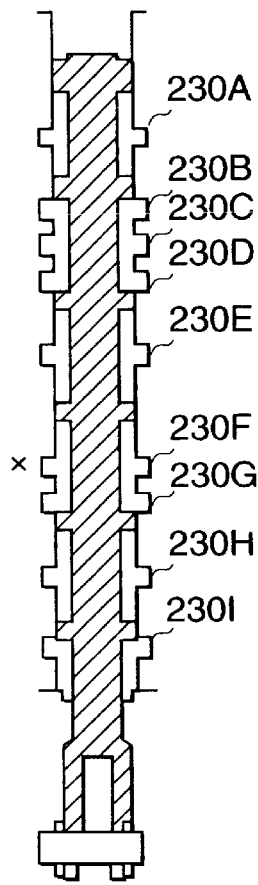
Figure 17C:
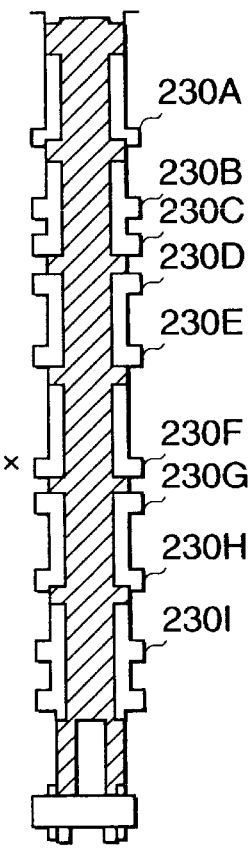

That is, when the D range is selected by the selector lever 86, the spool 230J displaces to the position shown in FIG. 17A, when the N/P range is selected, it displaces to the position shown in FIG. 17B, and when the R range is selected, it displaces to the position shown in FIG. 17C.

In the D range position, the line pressure port 230H communicating with the line pressure circuit 101 is connected to a D range pressure port 230I, and the line pressure PL is supplied to a D range pressure circuit 107 from the D range pressure port 230I.

The R range pressure port 230G communicating with a shuttle valve 270 is connected to the drain port 230F. The shuttle valve 270 supplies the oil pressure of the R range port 230G or D range pressure circuit 107 to the R range pressure circuit 108, whichever is the higher.

When the D range is selected, the valve body of the shuttle valve 270 moves to the right in FIG. 14C, and the line pressure PL is supplied to the R range pressure circuit 108 from the D range pressure circuit 107.

That is, the line pressure PL is supplied to both a direct clutch control valve 180 and power recirculation clutch control valve 200.

The direct clutch 10 and power recirculation clutch 9 are engaged by operation of these valves using the line pressure PL.

In the D range position, the manual valve 230 also connects the port 230D to the pump suction passage 104. Further, the port 230A communicating with a port 240C of the counter torque cutoff valve 240, and the port 230B communicating with a port 160J of the mode fixing valve 160, connect with each other. Thereby, the drain port 246C of the shift control valve 246 is connected to the port 240C of the counter torque cutoff valve 240 via the oil passage 105 and the mode fixing valve 160. The port 230E of the manual valve 230 communicating with a port 240E of the counter torque cutoff valve 240, is closed in the D range position.

In the N/P range position, the spool 230J closes the line pressure port 230H. Also, the D range pressure port 230I is released to a drain.

The R range pressure port 230G is connected to the drain port 230F, and both pressures of both the D range pressure circuit 107 and R range pressure circuit 108 are released to the drain. Thereby, supply of the line pressure PL to the direct clutch control valve 180 and the power recirculation clutch control valve 200 is cut off, and the power recirculation clutch 9 and direct clutch 10 are released.

The port 230B communicating with the drain port 246C of the shift control valve 246 via the oil passage 105 and the mode fixing valve 160, and the port 230D communicating with the drain port 246C of the shift control valve 246 via the oil passage 106, are both connected to the pump suction passage 104 via the port 230C.

Also, the port 230A communicating with the port 240C of the counter torque cutoff valve 240, and the port 240E of the counter torque cutoff valve 240, are both closed.

In the R range position shown in FIG. 17C, the spool 230J connects the R range pressure port 230G with the line pressure port 230H, and releases the D range pressure port 230I to the drain.

As a result, the oil pressure of the D range pressure circuit 107 falls, and the line pressure PL is supplied to the R range pressure port 230G.

The valve body of the shuttle valve 270 moves to the left in FIG. 14C, and the line pressure PL is supplied only to the R range pressure circuit 108. Due to this line pressure PL supplied to a pressure port 200G, the power recirculation clutch control valve 200 can cause the power recirculation clutch 9 to engage. On the other hand, as oil pressure is not supplied to a pressure port 180G of the direct clutch control valve 180, the direct clutch 10 is released.

The port 230D communicating with the drain port 246D of the shift control valve 246, connects with the port 240E of the counter torque cutoff valve 240 via the port 230E. As a result, the oil chamber 30B of the oil pressure cylinder 30 and the port 240E of the counter torque cutoff valve 240 are connected according to the operation of the shift control valve 246.

Likewise, the port 230B communicating with the drain port 246C of the shift control valve 246 via the oil passage 105 and the mode fixing valve 160, is connected to the pump suction passage 104 via the port 230C.

The port 230A communicating with the port 240C of the counter torque cutoff valve 240 is closed.

1-4. Clutch Control Valve

Referring to FIGS. 13 and 14C, the direct clutch control valve 180 is provided with a spool 180A supported by a spring 180B, and an output port 180C, a drain port 180D, a signal pressure port 180E and a pressure port 180G facing the spool 180A. The power recirculation clutch control valve 200A is provided with a spool 200A supported by a spring 200B, and an output port 200C, a drain port 200D, a signal pressure port 200E and a pressure port 200G facing the spool 200A.

The pilot pressure Pp generated by the pilot valve 103 is supplied to the solenoid valve 190 which controls the direct clutch control valve 180, and a solenoid valve 210 which controls the power recirculation clutch control valve 200 via a pilot pressure circuit 102.

The solenoid valve 190 and the solenoid valve 210 are duty controlled by output signals of the control unit 80, and generate signal pressures PsolH/C and PsolL/C from the pilot pressure Pp, which are output, as shown in FIG. 16. The signal pressure PsolH/C is supplied to the port 180E of the direct clutch control valve 180, and a signal port 160C of the mode fixing valve 160. The signal pressure PsolL/C is supplied to the port 200E of the power recirculation clutch control valve 200.

The D range pressure Pd from the D range pressure circuit 107 is supplied to the pressure port 180G of the direct clutch control valve 180. Here, the D range pressure Pd is equal to the line pressure PL.

Also, the drain port 180D of the direct clutch control valve 180 is connected to the pump suction passage 104.

Figure 18:
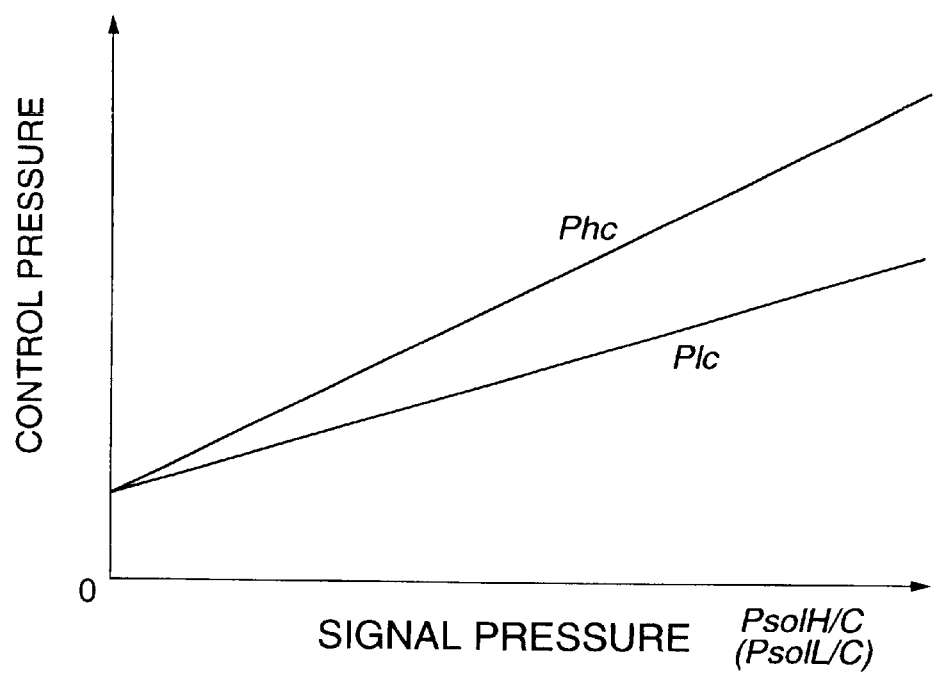
FIG. 18 is a diagram describing a relation between signal pressures Psol/H/C, PsolL/C of solenoid valves, a control pressure Phc of a direct clutch and a control pressure Plc of a power recirculation clutch, according to the fourth embodiment of this invention.
Figure 19:
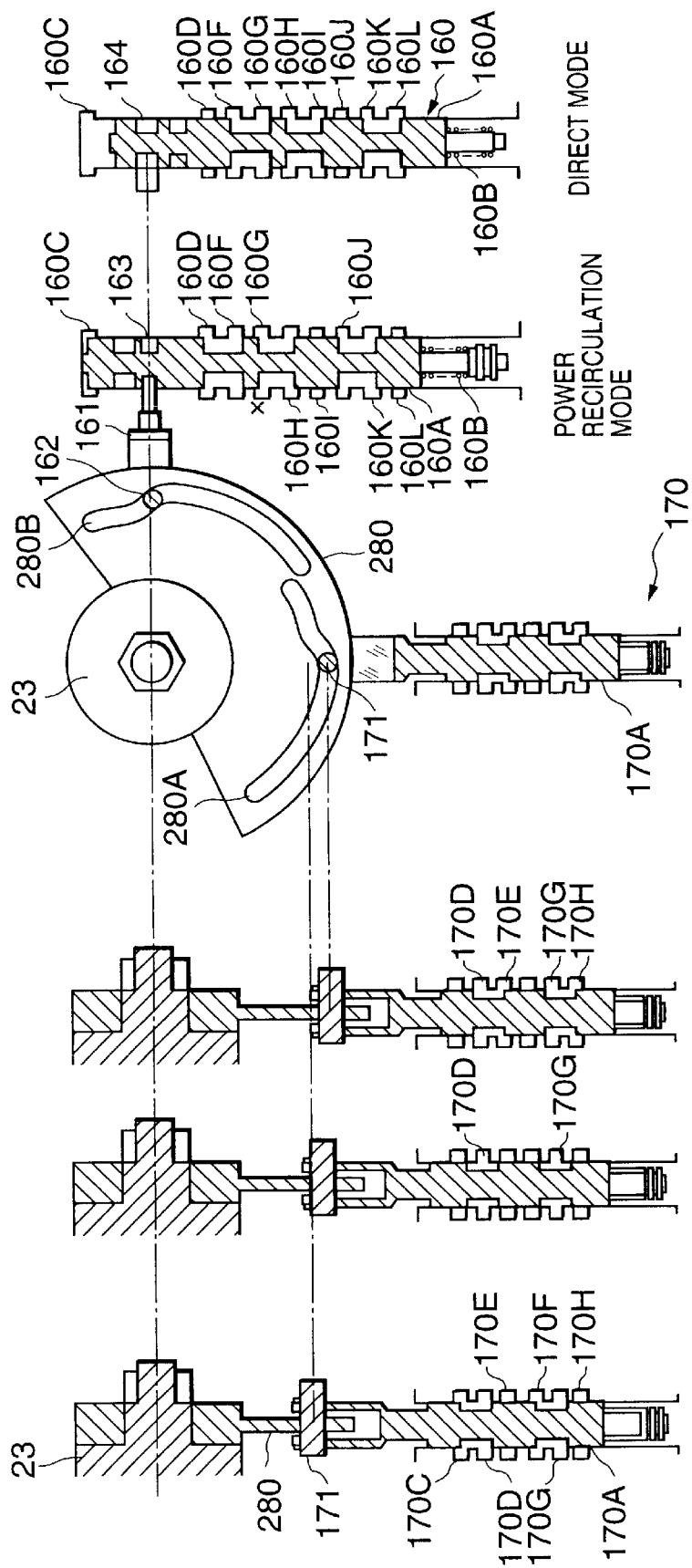
FIGS. 19A–19F are diagrams describing a relation between a cam rotation position, and operation positions of an inhibitor valve and a mode fixing valve, according to the fourth embodiment of this invention.

The direct clutch control valve 180 connects the pressure port 180G and drain port 180D to the output port 180C in a proportion according to the displacement of the spool 180A. As a result, the D range pressure Pd of the pressure port 180G is reduced, and the reduced pressure is supplied to the output port 180C as a control pressure Phc. The signal pressure PsolH/C of the signal pressure port 180E pushes the spool 180A against the D range pressure Pd of the pressure port 180G together with the spring 180B. Therefore, the control pressure Phc of the output port 180C varies according to the signal pressure PsolH/C, and the control pressure Phc also increases according to increase of the signal pressure PsolH/C, as shown in FIG. 18.

When the signal pressure PsolH/C is zero, the direct clutch control valve 180 generates the control pressure Phc equivalent to the elastic supporting force of the spring 180B. This control pressure Phc causes the direct clutch 10 to perform a stroke by the amount of an ineffectual stroke, and the engaging force of the clutch is set to a pressure which is almost non-existent.

Likewise, the R range pressure Pr from the R range pressure circuit 108 is supplied to the pressure port 200G of the power recirculation clutch control valve 200. Here, the R range pressure Pr is equal to the line pressure PL. Also, the drain port 200D of the power recirculation clutch control valve 200 is connected to the pump suction passage 104.

The power recirculation clutch control valve 200 connects the pressure port 200G and drain port 200D to the output port 200C in a proportion according to the displacement of the spool 200A. Consequently, the R range pressure Pr of the pressure port 200G is reduced, and the reduced pressure is supplied to the output port 200C as a control pressure Plc. The signal pressure PsolL/C of the signal pressure port 200E pushes the spool 200A against the R range pressure Pr of the pressure port 200G together with the spring 200B. Therefore, the control pressure of the output port 200C varies according to the signal pressure PsolL/C, and the control pressure Plc also increases according to the increase of signal pressure PsolL/C, as shown in FIG. 18.

When the signal pressure PsolL/C is zero, the power recirculation clutch control valve 200 generates the control pressure Plc equivalent to the pressing force of the spring 200B. This control pressure Plc causes the power recirculation clutch 9 to perform a stroke by the amount of an ineffectual stroke, and the engaging force of the clutch is set to a pressure which is almost non-existent.

Moreover, the control valves 180 and 200 adjust the control pressures Phc and Plc so that the shock is small when there is a running mode change-over.

1-5. Inhibitor Valve

The control pressures Plc, Phc supplied from the direct clutch control valve 180 and the power recirculation clutch control valve 200 are supplied respectively to the power recirculation clutch 9 and the direct clutch 10 via an inhibitor valve 170.

Referring to FIG. 14 and FIGS. 19A–19C, the inhibitor valve 170 is provided with a spool 170A which responds to the gyration angle φ of the power roller 20. A pin 171 is fixed to the edge of the spool 170A. The pin 171 is engaged with a cam groove 280A of a cam 280. The cam 280 is fixed to the trunnion 23, which is provided with the precess cam 135, and the rotational displacement of the cam 280 is performed according to the gyration angle variation of the power roller 20 so as to displace the spool 170A. The inhibitor valve 170 is provided with a port 170C connected to the output port 180C of the direct clutch control valve 180, and a port 170F connected to the output port 200C of the power recirculation clutch control valve 200. It is further provided with a port 170E connected to an output port 160H of the mode fixing valve 160, and a port 170H connected to an output port 160F of the mode fixing valve 160. It is still further provided with an output port 170D connected to the direct clutch 10 and an output port 170G connected to the power recirculation clutch 9.

The output port 170D is selectively connected to the port 170C and port 170E according to the displacement of the spool 170A. The output port 170G is selectively connected to the port 170F and port 170H according to the displacement of the spool 170A.

Figure 20:
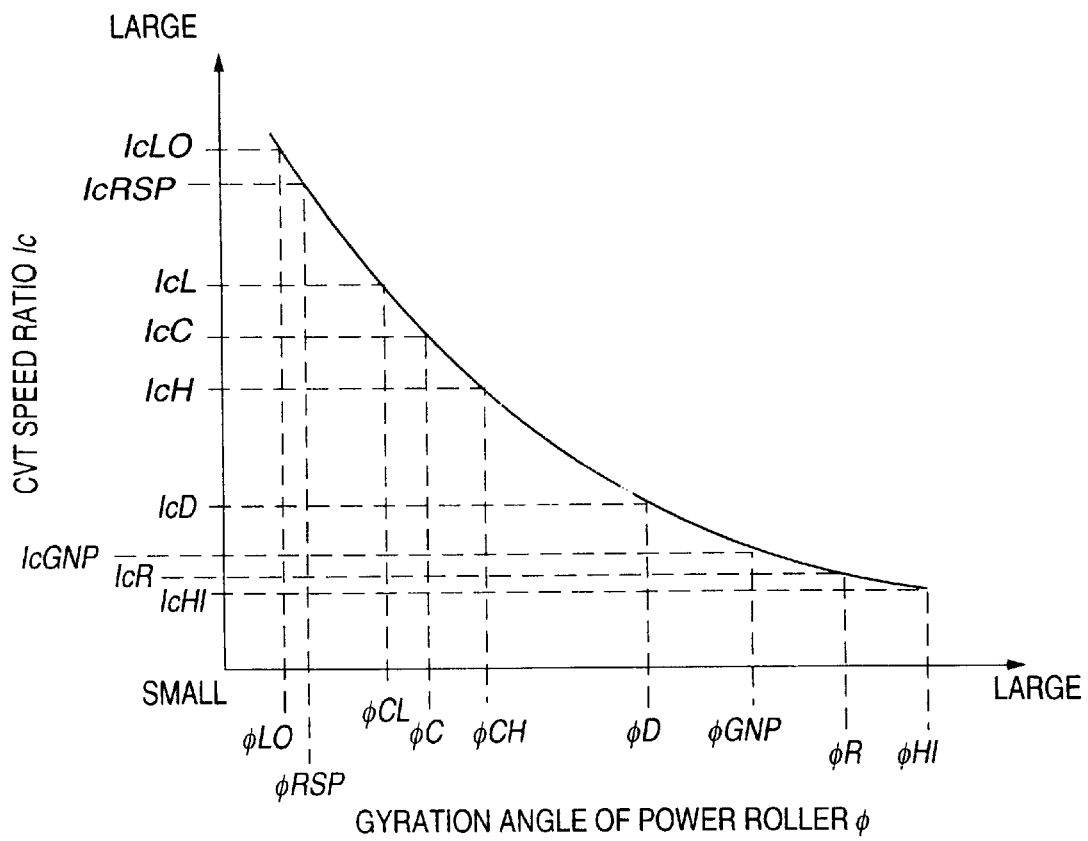
FIG. 20 is a diagram describing a relation between a power roller gyration angle φ and a CVT speed ratio lc according to the fourth embodiment of this invention.

In FIG. 14B, when the speed ratio lc of the CVT 2 increases, the cam 280 undergoes a rotational displacement in the clockwise direction of the figure, and if the speed ratio lc of the CVT 2 decreases, it undergoes a rotational displacement in the counterclockwise direction The relation of the speed ratio lc of the CVT 2 and the gyration angle φ of the power roller 20 is such that the gyration angle φ decreases when the speed ratio lc increases, and the gyration angle φ increases when the speed ratio lc of the CVT 2 decreases, as shown in FIG. 20. The range of gyration angle φ used for control of the speed ratio lc of the CVT 2 is set from a gyration angle φLO corresponding to the maximum value of the speed ratio lc of the CVT 2 to a gyration angle φHl corresponding minimum value of the speed ratio lc of the CVT 2. φHl is larger than φLO.

When the gyration angle φ of the power roller 20 changes in the direction which increases the speed ratio lc of the CVT 2, the cam groove 280A of the cam 280 displaces clockwise in FIG. 14B, and the spool 170A is made to displace upward in the figure. The cam groove 280A is formed corresponding to the gyration angle variation from φLO to φHl, but the spool 170A displaces only when the cam 280 undergoes a rotational displacement between φCL and φCH. The shape of the cam groove 280A is such that a displacement is not performed in a region where the speed ratio lc is larger than φCL, or in a region where the speed ratio lc is smaller than φCH.

When the pin 171 is in the range of φLO to φCL in FIG. 14B, the spool 170A connects the port 170C to the port 170D, and connects the port 170F to the output port 170G, as shown in FIG. 19A. As a result, the control pressure Phc is supplied to the direct clutch 10 from the direct clutch control valve 180. The control pressure Plc from the power recirculation clutch control valve 200 is supplied to the power recirculation clutch 9.

When the pin 171 is in the region from φCH to φHl in FIG. 14B, the port 170E connects with the output port 170D, and the port 170F connects with the output port 170G, as shown in FIG. 19C. As a result, the direct clutch 10 connects with the output port 160H of the mode fixing valve 160. The power recirculation clutch 9 connects with the output port 160F of the mode fixing valve 160.

When the pin 171 is in the region from φC of FIG. 14B, the output ports 170D, 170G are closed, and the direct clutch 10 and power recirculation clutch 9 both maintain the engaged state or disengaged state as shown in FIG. 19B. The gyration angle φC corresponds to the speed ratio lc=lcC of the CVT 2, as shown in FIG. 20. Let this speed ratio lcC be a first speed ratio.

When the gyration angle is smaller than φC, i.e., when the speed ratio lc of the CVT 2 is larger than lcC, the inhibitor 170 therefore supplies the control pressures Phc, Plc to the power recirculation clutch 9 and direct clutch 10.

When the gyration angle is larger than φC, i.e., when the speed ratio lc of the CVT 2 is smaller than lcC, the line pressure PL is supplied to the power recirculation clutch 9 or the direct clutch 10 and the pressure in the other clutch is released to the drain according to the position of the spool 160A of the mode fixing valve 160.

Consequently, when the gyration angle of the power roller 20 is smaller than φC, engagement and disengagement of the power recirculation clutch 9 and the direct clutch 10 can be performed as desired.

On the other hand, when the gyration angle of the power roller 20 is larger than φC, only one of the power recirculation clutch 9 and direct clutch 10 can be engaged and the other clutch is disengaged. That is, the when the gyration angle of the power roller 20 is larger than φC, the operating mode is determined by the position of the spool 160A of the mode fixing valve 160.

Figure 21:
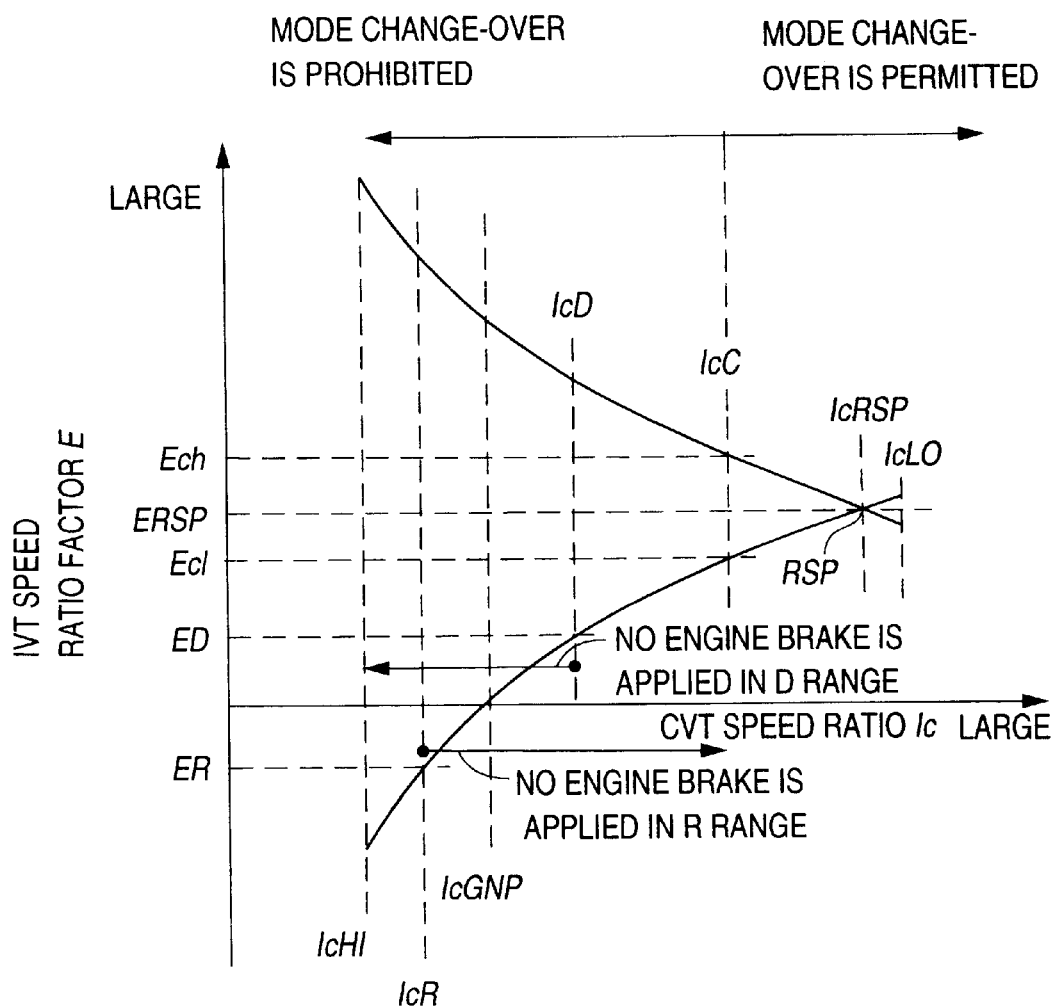
FIG. 21 is a diagram describing a relation between the CVT speed ratio lc and an IVT speed ratio factor E according to the fourth embodiment of this invention.

Now, the relation between the operating mode and the IVT speed ratio factor E will be considered. The relation between the speed ratio lc of the CVT 2 and the IVT speed ratio factor E is shown in FIG. 21.

In the power recirculation mode, the IVT speed ratio factor Ec1 corresponds to the first speed ratio lcC of the CVT 2, and in the direct mode, the speed ratio Ech corresponds to the first speed ratio lcC of the CVT 2. As shown in this figure, when the speed ratio lc of the CVT 2 is larger than the first speed ratio lcC, the running mode can be changed over by operating the power recirculation clutch 9 and the direct clutch 10, and when the speed ratio lc of the CVT 2 is smaller than the first speed ratio lcC, engaging of only one of the power recirculation clutch 9 and the direct clutch 10 is permitted while change-over of running mode is prohibited.

Supply of the control pressure Plc by the inhibitor valve 170 to the power recirculation clutch 9 via the power recirculation clutch control valve 200 is limited to the case when the speed ratio lc of the CVT 2 is larger than lcC. In other words, it is restricted to the case when the IVT speed ratio factor E is larger than Ec1. Therefore, control of the control pressure Plc is required of the power recirculation clutch control valve 200 only when the IVT speed ratio factor E is larger than Ec1.

Figure 26:
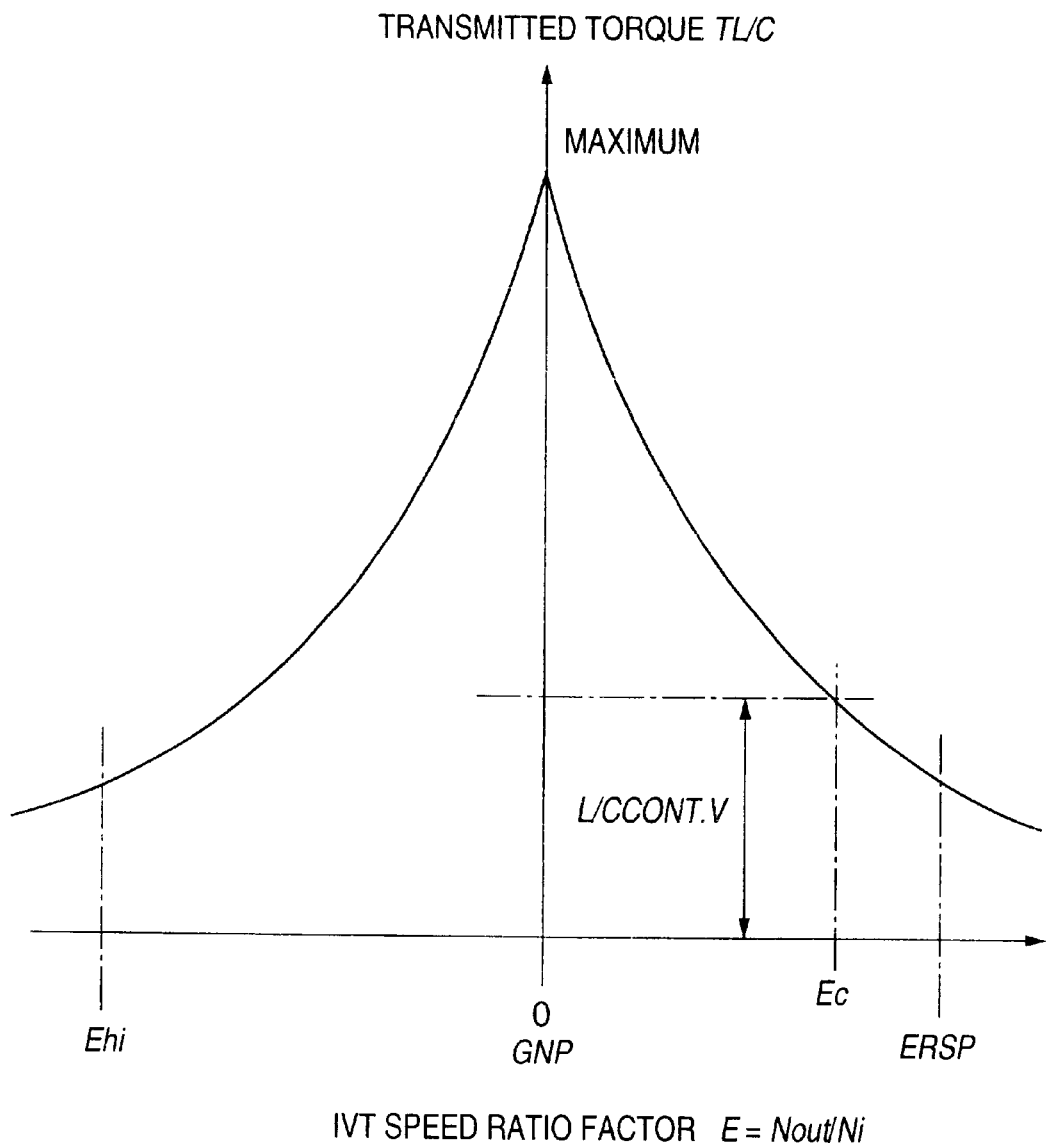
FIG. 26 is a diagram describing a relation between the IVT speed ratio factor E and a transmission torque TL/C of a power recirculation clutch, according to the fourth embodiment of this invention.

FIG. 26 shows the relation of the IVT speed ratio factor E and the transmitted torque TL/C of the IVT in the power recirculation mode, and the power recirculation clutch 9. As seen from this diagram, the transmitted torque TL/C of the power recirculation clutch 9 is a maximum at the geared neutral point GNP. The left side of the GNP in the diagram shows the characteristics when reversing and the right side shows the characteristics when moving forward. Therefore, the transmitted torque TL/C when the vehicle is moving forward decreases as the IVT speed ratio factor E increases.

If the IVT speed ratio factor E is larger than Ec1, it means that the transmitted torque TL/C is less than the required transmitted torque L/CCONT.V shown in the diagram. Therefore, the oil pressure control range of the power recirculation clutch control valve 200 is smaller than L/CCONT.V. This contributes to decreasing the scatter in the control pressure Plc and increasing control precision, and it improves the precision of change-over control of the running mode. It is also useful also for reducing shock when the running mode is changed over.

1-6. Mode Fixing Valve

Referring to FIG. 14B, the change-over valve 160 permits change-over of the running mode by controlling the oil pressure supplied to the ports 170E, 170H of the inhibitor valve 170.

The mode fixing valve 160 comprises the spool 160A which responds to a signal pressure PsolH/C from the solenoid valve 190.

Along with the signal port 160C, the ports 160J and 160K, and the output ports 160F and 160H, the valve is further provided with ports 160D, 160L, 160I and a drain port 160G facing the spool 160A.

The signal pressure PsolH/C from the solenoid valve 190 is led to the signal port 160C. The spool 160A is held in a position where the signal pressure PsolH/C and the elastic supporting force of the spring 160B balance.

In the state where the signal pressure PsolH/C is low, the spool 160A is pushed up by the spring 160B. In this state, the output port 160D connects with the output port 160F, the output port 160H connects with the drain port 160G, and the port 160K connects with the output port 160J, as shown in FIG. 19E.

As a result, the output port 160D communicating with the R range pressure circuit 108 is connected to the line circuit 101 via the manual valve 230 when the manual valve 230 is in either the R range position or D range position.

The output port 160F communicating with the port 170H of the inhibitor valve 170 is connected to the power recirculation clutch 9 according to the operation of the inhibitor valve 170.

The output port 160H communicating with the port 170E of the inhibitor valve 170 is connected to the direct clutch 10 according to the operation of the inhibitor valve 170. Also, the port 160K is connected with the drain port 246C of the shift control valve via the oil passage 105.

Also, the port 160J communicating with the port 230B of the manual valve 230 is connected to the 240C of a counter torque cutoff valve 240 according to the operation of the manual valve 230.

On the other hand, when the spool 160A is moved down to the lower part of the diagram by the signal pressure PsolH/C, the port 160I connects with the output port 160H, the output port 160F connects with the drain port 160G, and the port 160K connects with a port 160L, as shown in FIG. 19F. The port 160I connects with the D range pressure circuit 107, and the port 160L connects with the pump suction passage 104.

As mentioned above, the spool 160A displaces between two displacement positions, i.e., a raised position and a lowered position.

The IVT comprises a lock mechanism driven by a cam 280 to fix the spool 160A in one of these positions.

The lock mechanism is provided with a slider 161 shown in FIGS. 13, 14B and 19E, and FIGS. 22A–22D. A pin 162 is implanted at one end of the slider 161. The pin 162 engages with a cam groove 280B formed in the cam 280.

Grooves 163, 164 which receive the other end of the slider 161 are formed in the spool 160A.

The cam groove 280B adjoins the cam groove 280A formed in the same cam 280. As shown in FIGS. 22A–22D, the cam 280 displaces the slider 161 via the pin 162 according to the gyration angle φ of the power roller 20. Hence, when the slider engages with the slot 163 or the slot 164 according to the position of the spool 160A, the axial displacement of the spool 160A is stopped. The groove 164 is formed above the groove 163 as shown in FIG. 14B.

In the power recirculation mode, as it is not necessary to engage the direct clutch 10, the solenoid valve 190 does not generate the signal pressure PsolH/C, and oil pressure is not supplied to the signal port 160C. Therefore, the spool 160A will be in the state where it is pushed up by the spring 160B shown in FIG. 19E.

In this state, the R range pressure Pr, i.e., the line pressure PL, is led to the port 170H of the inhibitor valve 170 via the output port 160F, port 160D, and R range pressure circuit 108. Also, the output port 170E is released to the drain via the output port 160H and the drain port 160G.

The drain port 246C of the shift control valve 246 connects with the port 230B of the manual valve 230 via the oil passage 105 and the ports 160K, 160J of the mode fixing valve 160. In the D range, the port 230B also connects with the port 240C of the counter torque cutoff valve 240 via the port 230A. In the R range, the port 230B connects with the pump suction passage 104.

In the direct mode, in order to engage the direct clutch 10, the signal pressure PsolH/C is generated by the solenoid valve 190, and the signal pressure PsolH/C is supplied to the signal port 160C.

Due to the signal pressure PsolH/C, the spool 160A of the mode fixing valve 160 is moved down to the lower part of FIG. 19F against the spring 160B.

In this position, the D range pressure Pd is led to the port 170E of the inhibitor valve 170 via the output port 160H, port 160I, and D range pressure circuit 107, and the port 170H is released to the drain via the output port 160F and the drain port 160G.

The drain port 246C of the shift control valve 246 connects with the pump suction passage 104 via the oil passage 105, and the ports 160K, 160L of the mode fixing valve 160.

Next, the gyration angle φ of the power roller 20 and the lock mechanism of the mode fixing valve 160 will be described.

In FIG. 14B, when the gyration angle φ of the power roller 20 increases, i.e., when the speed ratio lc of the CVT 2 decreases, the cam groove 280B drives the slider 161 to the right of the figure during the period when the gyration angle φ varies from the predetermined gyration angle φCL to the predetermined gyration angle φCH.

As a result, the slider 161 slides into the groove 163 or the groove 164 of the spool 160A. When the gyration angle is larger than φCH, the slider 161 is held in the state where it has entered the groove 163 or the groove 164. When the gyration angle is smaller than φCL, the slider 161 is held in the retracted position wherein it does not slide into the groove 163 or the groove 164.

In the state where the slider 161 has slid into the groove 163 or the groove 164, displacement of the spool 161 is prevented and change-over of the operating mode due to operation of the mode fixing valve 160 is prohibited.

On the other hand, when the slider 161 is in the retracted position where it does not slide into the groove 163 or the groove 164, the spool 160A can be displaced according to the signal pressure PsolH/C. That is, a change-over of operating mode is permitted.

The shape and dimension of the groove 280A is determined such that the gyration angle φC at which the slider 161 starts sliding into the groove 163 or the groove 164 corresponds to the above-mentioned first speed ratio lcC. When the gyration angle of the power roller 20 is larger than this gyration angle φC, i. e., when the speed ratio lc of the CVT 2 is smaller than the first speed ratio lcC, the displacement of the spool 160A is stopped. When, on the other hand, the gyration angle is smaller than φC, i. e., when the speed ratio lc of the CVT 2 is larger than the first speed ratio lcC, the slider 161 is out of the groove 163 or the groove 164, so the spool 160A can be displaced according to the signal pressure PsolH/C.

This lock mechanism drives the slider 161 only in the region between φCL and φCH, and the slider 161 is simply held where it is in the other regions.

Due to this setting, the stroke of the slider 161 can be reduced and the lock mechanism can be made more compact.

1-7. Reverse Torque Cutoff Valve

Referring to FIG. 14C, the counter torque cutoff valve 240 comprises the spool 240A and the aforementioned ports 240C and 240E, a line pressure port 240D, a port 240B and a port 240F facing the spool 240A.

A pin 241 is implanted at one end of the spool 240A. The pin 241 engages with the cam groove 290A of the cam 290 fixed to the same trunnion 23 that is provided with the cam 280.

When the trunnion 23 rotates in the direction in which the speed ratio lc of the CVT 2 increases, the cam groove 290A lifts the spool 240A in the upper direction of the figure via the pin 241, and when the trunnion 23 rotates in the reverse direction, the spool 240A is pushed in the downward direction of the figure.

The spool 240A is driven when the gyration angle of the power roller 20 is between φD and φR. The angles φD and φR are set on both sides and in the vicinity of the gyration angle φGNP corresponding to the geared neutral point GNP.

The relation between the gyration angle φGNP, φD and φR is φLO<φD<φGNP<φR<φHl, as shown in FIG. 20. φGNP corresponds to the speed ratio lcGNP of the CVT 2, φD corresponds to the speed ratio lcD of the CVT 2, φR corresponds to the speed ratio lcR of CVT 2, φLO corresponds to the speed ratio lcLO of the CVT 2, and φHl corresponds to the speed ratio lcHl of the CVT 2 respectively.

Figures 23A, 23B, 23C, 23D, 23E, 23F:
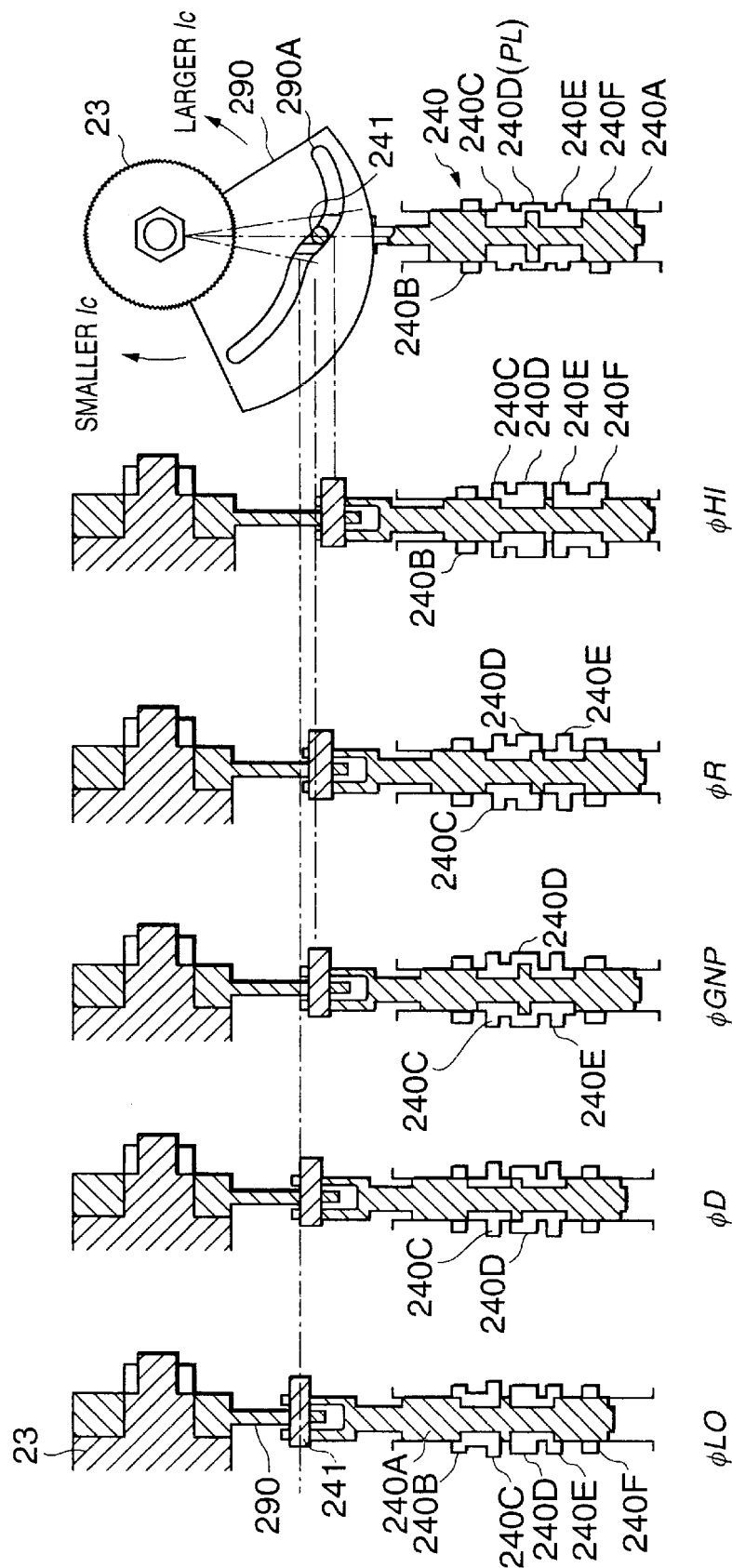
FIGS. 23A–23F are diagrams describing a relation between a cam rotation position and an operation position of a counter torque cutoff valve.

Referring to FIGS. 23A–23F, when the gyration angle is equal to or greater than φLO and less than φD, the spool 240A is held in the topmost position shown in FIG. 23A. In this position of the spool 240A, the line pressure port 240D connects with the port 240E, and the line pressure PL is supplied to the port 230E of the manual valve 230. The port 240C connects with the port 240B, and the port 230A of the manual valve 230 is connected to the pump suction passage 104.

The overall length of the valves can be shortened by not displacing the spool 240A when the gyration angle φ of the power roller 20 is less than the gyration angle φD.

If the gyration angle becomes equal to or greater than φD, the spool 240A displaced to the lower part of the figure will close the port 240C, as shown in FIG. 23B.

When the gyration angle reaches φGNP, the spool 240A is situated effectively in the middle of the overall displacement range as shown in FIG. 23C, the line pressure port 240D is connected with the ports 240C, 240E, and the line pressure PL is supplied to the ports 230A, 230E of the manual valve 230.

When the gyration angle reaches φR, the port 240E is closed while the line pressure port 240D and port 240C remain connected, as shown in FIG. 23D.

When the gyration angle exceeds φR and varies towards φHl, the port 240E is connected with the port 240F while the line pressure port 240D and the port 240C remain connected, and the port 230E of the manual valve 230 is connected to the pump suction passage 104, as shown in FIG. 23E.

The speed ratio lcD of the CVT 2 corresponding to the predetermined gyration angle φD is set to a value at least smaller than the maximum value lcLO in the control range of the speed ratio lc of the CVT 2.

It is also set to a value smaller than a speed ratio lcRSP of the CVT 2 corresponding to a gyration angle φRSP of the rotation synchronization point RSP in the power recirculation mode and direct mode.

The control unit 80 controls the step motor 136, the solenoid valve 190 and the solenoid valve 210 in the above-mentioned oil pressure circuit of the IVT via a control circuit shown in FIG. 16.

For this purpose, signals are input to the control unit 80 respectively from a rotation speed sensor 81 which detects a rotation speed Nin of the input shaft 1, rotation speed sensor 82 which detects the rotation speed No of the CVT output shaft 4, vehicle speed sensor 83 which detects the vehicle speed VSP, accelerator pedal depression sensor 85 which detects the depression amount of an accelerator pedal of the vehicle, and inhibitor switch 84 which detects a selection range of the selector lever 86. A vehicle speed sensor 83 detects the vehicle speed VSP from a rotation speed Nout of the final output shaft 6. Therefore, the detection result of the vehicle speed sensor 83 is used not only as the vehicle speed VSP, but also as the rotation speed Nout of the final output shaft 6. The control unit 80 determines the target value of the speed ratio lc of the CVT 2 based on these signals.

The control unit 80 controls the speed ratio lc of the CVT 2 to the target value by a signal output to the step motor 136. The control unit 80 also selects the running mode of the IVT and generates the control pressures Plc, Phc by outputting signals corresponding to the selection result to the solenoid valve 190 and the solenoid valve 210. The controller comprises a microcomputer provided with a central computing unit (CPU), read-only memory (ROM), random access memory (RAM), and an input/output interface (I/O interface).

1-8. Operation of IVT 1-8-1 N Range or P Range

In the N range or P range which are mainly selected when the vehicle is at rest, the line pressure port 230H of the manual valve 230 is closed, and the port 230I connected to the D range pressure circuit 107 and the port 230G connected to the R range pressure circuit 108 are respectively released to the drain, as shown in FIG. 17B. Therefore, oil pressure is not supplied to the power recirculation clutch 9 or the direct clutch 10, and the CVT 2 does not transmit torque. Consequently, the IVT does not transmit drive power, and a neutral state is produced. The drain port 246C used for the oil chamber 30A of the CVT 2 is connected to the pump suction passage 104 via the port 230B of the manual valve 230, and the drain port 246D used for the oil chamber 30B is connected to the pump suction passage 104 via a port 230D. Therefore, if the oil chamber 30A or 30B is connected to the supply port. 246P, the speed ratio lc of the CVT 2 can be freely varied in both an acceleration direction and a deceleration direction by operating the shift control valve 246.

When the vehicle is at rest, i. e., the vehicle speed is zero, the speed ratio lc and IVT speed ratio factor E of the CVT 2 are usually controlled to the geared neutral point GNP.

1-8-2 Operation From N Range to D Range

If the driver selects the D range by the selector lever 86 when the vehicle is at rest, the spool 230J of the manual valve 230 will descend to the position shown in FIG. 17A from the position of FIG. 17B. In this position, the manual valve 230 connects the line pressure port 230H to the port 230I.

Consequently, the line pressure PL is supplied to the D range pressure circuit 107 as a D range pressure Pd.

When the vehicle is in a stopped state, the power recirculation mode is applied and the speed ratio lc of the CVT 2 is held at lcGNP of the geared neutral point GNP. In this state, as shown in FIG. 20, the gyration angle φ=φGNP>φC. Therefore, the spool 160A of the mode fixing valve 160 is locked in a position where it is pulled up to the upper part of the figure as shown in FIG. 19E.

The D range pressure Pd of the D range pressure circuit 107 is supplied to the port 160D of the mode fixing valve 160 via the shuttle valve 270 and R range pressure circuit 108. The D range pressure Pd is further supplied to the power recirculation clutch 9 via the output port 160, port 170H of the inhibitor valve, and output port 170G. As a result, the power recirculation clutch 9 released in the N range or the P range is engaged.

1-8-3 Startup and Running in Power Recirculation Mode

When the accelerator pedal is not depressed in the D range or Ds range, the step motor 136 is driven in the forward direction, i.e., the direction which increases the CVT speed ratio lc to obtain a predetermined creep torque. The occurrence of such a creep torque is disclosed in Tokkai Hei 10-267117 published by the Japanese Patent Office in 1998.

When the accelerator pedal is depressed, the speed ratio lc of the CVT 2 is controlled relative to the vehicle speed VSP so that a predetermined input shaft rotation speed is attained. For example, the control unit 80 determines a target value of the input shaft rotation speed Nin according to the accelerator pedal depression amount APS and the vehicle speed VSP by looking up a speed change map shown in FIG. 24.

Figure 24:
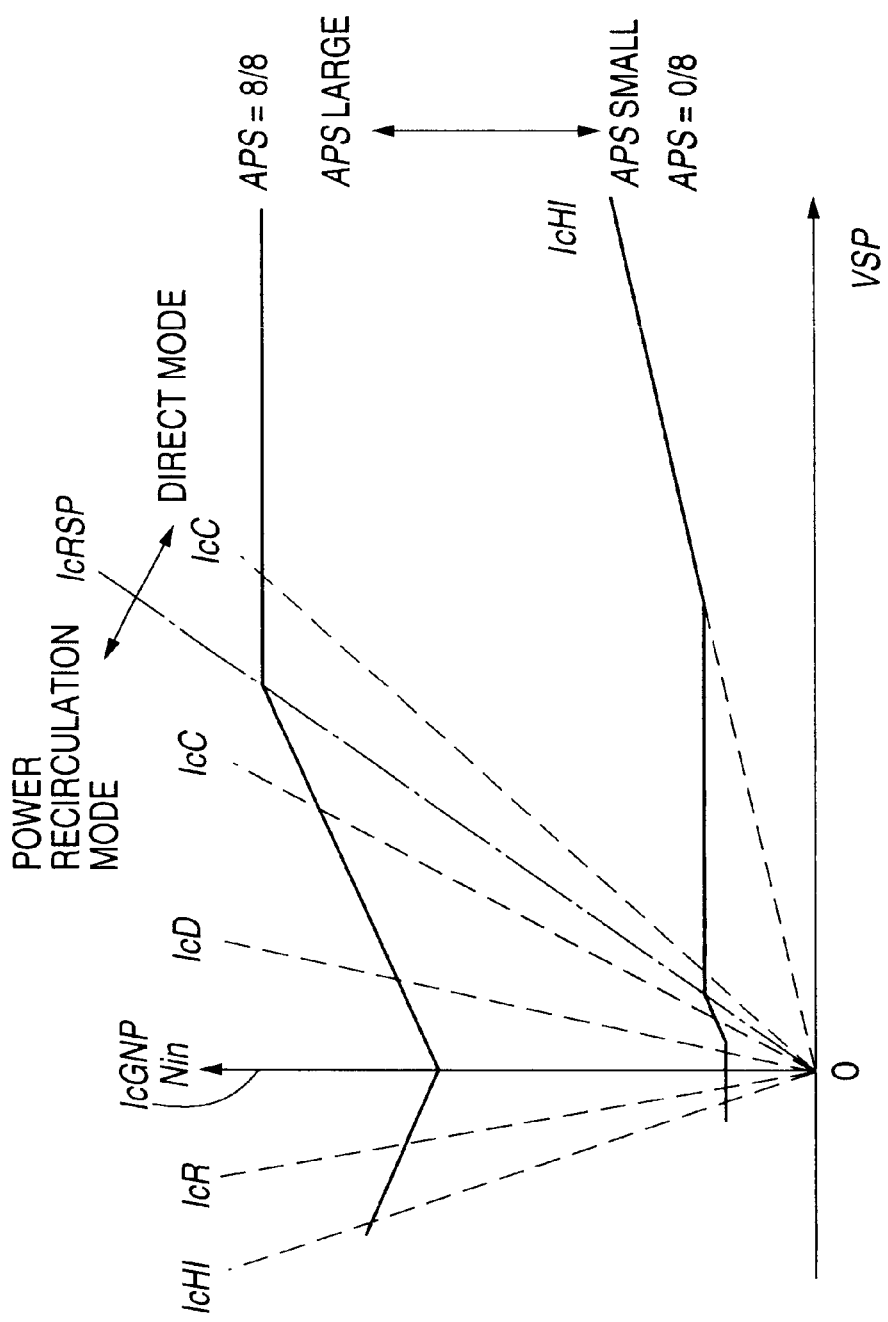
FIG. 24 is a diagram showing the contents of a map specifying an input shaft rotation speed Nin relative to a vehicle speed VSP and an accelerator pedal depression amount APS stored in a control unit according to the fourth embodiment of this invention.

In the speed change map of FIG. 24, $$\frac{Nin}{No}$$

shows the target value of the speed ratio lc of the CVT 2. The running mode is also determined based on the speed ratio lcRSP of the CVT 2 corresponding to the rotation synchronization point RSP, the target speed ratio of the CVT 2 and the vehicle speed VSP. In this map, change-over of running mode is performed at a speed ratio lcRSP of the CVT 2 corresponding to the rotation synchronization point RSP.

Figure 25:
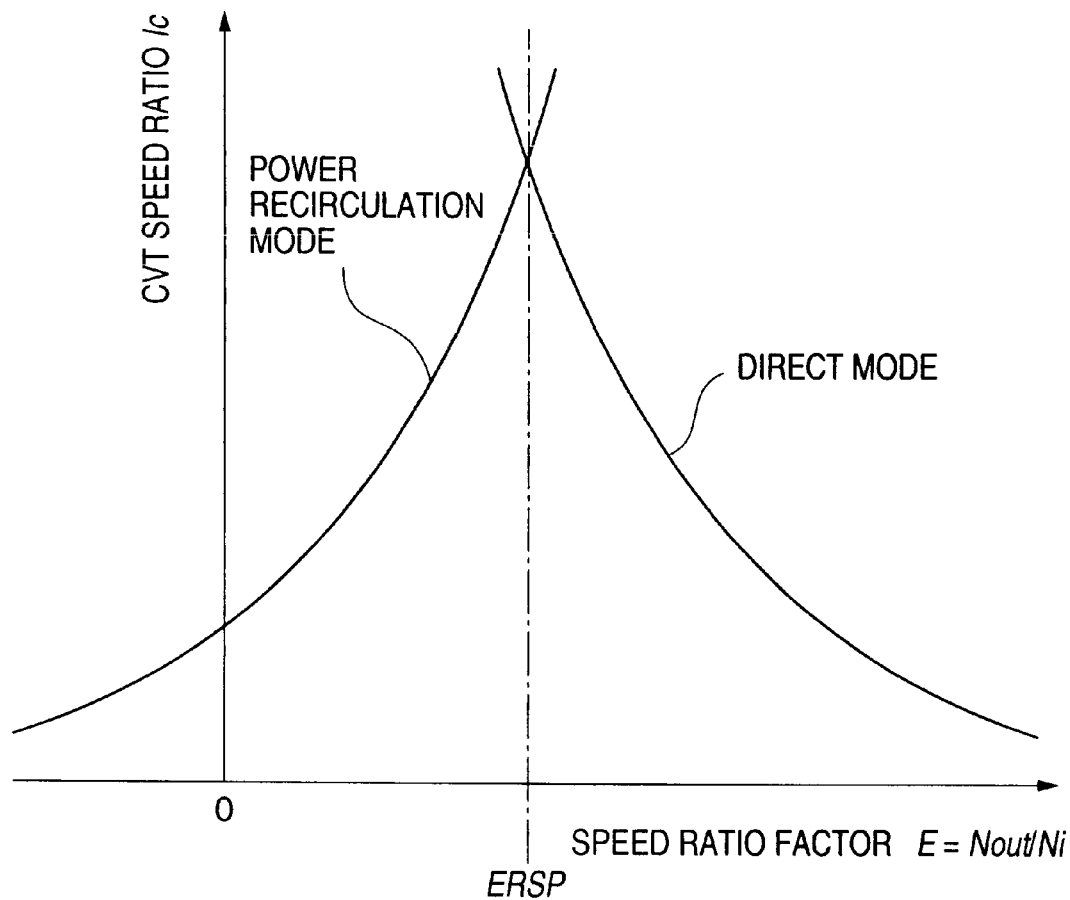
FIG. 25 is a diagram describing a relation between a running mode, the IVT speed ratio factor E, and the CVT speed ratio, according to the fourth embodiment of this invention.

The control unit 80 computes the IVT speed ratio factor $$E = \frac{Nout}{Nin}$$

by dividing the final output shaft rotation speed Nout by the target input shaft rotation speed Nin, taking account of the running mode by looking up a map shown in FIG. 25. The control unit 80 then computes the target gyration angle φ from the target speed ratio lc of the CVT 2 by performing an inverse computation on the map of FIG. 20, and feedback controls the position of the step motor 136 so that the target gyration angle of the power rollers 20 is obtained.

The operation of the oil pressure circuit in this power recirculation mode is as follows.

The spool 230J of the manual valve 230 is in the position shown in FIG. 17A, and the mode fixing valve 160 is held in the position shown in FIG. 19E. Therefore, the drain port 246C for the oil chamber 30A of the shift control valve 246 is connected to the port 240C of the counter torque cutoff valve 240 via the ports 160K, 160J and the ports 230B, 230A, as shown in FIG. 13 and FIGS. 14A–14C.

On the other hand, the drain port 246D for the oil chamber 30B of the shift control valve 246 is connected to the pump suction passage 104 via the ports 230D, 230C.

The line pressure PL is supplied to the port 240D of the counter torque cutoff valve 240, and the spool 240A is in the position of the geared neutral point GNP shown in FIG. 14C due to the groove 290A of the cam 290. At the gyration angle φGNP corresponding to the geared neutral point GNP, the port 240C of the counter torque cutoff valve 240 connects with the line pressure port 240D, and is cut off from the port 240B. The port 240C is connected to the drain port 246C of the shift control valve 246.

Therefore, as the drain port 246C for the oil chamber 30A of the shift control valve 246 is at the line pressure PL at the geared neutral point GNP, the oil pressure Plo of the oil chamber 30A will be the line pressure PL regardless of the spool position of the shift control valve 246.

On the other hand, the drain port 246D for the oil chamber 30B of the shift control valve 246 is connected to the pump suction passage 104.

Consequently, although the oil pressure Phi of the oil chamber 30B varies effectively from around zero to the line pressure PL according to the position of the spool 246S, the oil pressure Phi does not exceed the oil pressure Plo.

Therefore, at the geared neutral point GNP in the power recirculation mode of the D range, Plo≧Phi always holds.

The position and shape of the cam groove 290A of the cam 290 are previously set so that this differential pressure relation holds when the gyration angle of the power roller 20 is equal to or greater than the gyration angle φD shown in FIG. 20.

Due to this setting, in the D range of the power recirculation mode where the IVT speed ratio factor E≧0, and in a region nearer the geared neutral point GNP than a predetermined value ED corresponding to the speed ratio lcD of the CVT 2, a torque in the reverse direction causing engine braking can be prevented from acting.

Next, the control when the IVT speed ratio factor E changes from the geared neutral point GNP in the forward direction, i.e., the direction which increases the speed ratio lc of the CVT 2, will be described.

In this case, the spool 240A of the counter torque cutoff valve 240 is pulled up to the upper part of FIG. 14C by the rotational displacement of the cam 290.

When the gyration angle of the power roller 20 changes from φGNP to φD, the port 240C of the counter torque cutoff valve 240 communicating with the drain port 246C for the oil chamber 30A is cut off from the line pressure port 240D, as shown in FIG. 23B.

When the gyration angle of the power roller 20 further changes to φLO, the spool 240A is pulled up further, and the port 240C connects with the port 240B as shown in FIG. 23A. As a result, the port 240C connects with the pump suction passage 104, and the pressure is reduced until the oil pressure Plo of the oil chamber 30A becomes almost equal to atmospheric pressure.

Consequently, the relation between the oil pressure Plo of the oil chamber 30A and the oil pressure Phi of the oil chamber 30B can be inverted according to the position of the spool 246S of the shift control valve 246.

In this way, in the D range of the power recirculation mode, when the IVT speed ratio factor E is larger than the predetermined value ED shown in FIG. 21, torque in the reverse direction which causes engine braking can be generated.

Therefore, in the D range of the power recirculation mode, in a low-speed region for which the IVT speed ratio factor E shown in FIG. 21 is less than the predetermined value ED where engine braking is not necessary, generation of torque in the reverse direction causing engine braking is prevented even if the step motor 136 drives the power roller 20 of the CVT 2 in the speed ratio increase direction due for example to a malfunction or incorrect operation of the control unit 80. The predetermined value ED corresponds to the predetermined speed ratio lcD before the speed ratio lc of the CVT 2 reaches the geared neutral point GNP.

1-8-4 Change-over From Power Recirculation Mode to Direct Mode

If the target IVT speed ratio factor E exceeds a rotation synchronization point speed ratio factor ERSP, a change-over is performed from the power recirculation mode to the direct mode. This can be determined from whether the target value of the speed ratio lc of the CVT 2 determined from the vehicle speed VSP and accelerator pedal depression amount APS exceeds the speed ratio lcRSP of the CVT 2 corresponding to the rotation synchronization point RSP in the map of FIG. 24.

In the power recirculation mode, in the region where the speed ratio of the CVT 2 is larger than the first speed ratio lcC, i.e., when the gyration angle φ of the power roller exceeds a predetermined value φC, the spool 170A connects the ports 170C, 170D, and connects the ports 170F, 170G as shown in FIG. 19A. Due to this, the control pressure Plc can be supplied to the power recirculation clutch 9, and the control pressure Phc can be supplied to the direct clutch 10, respectively.

If the running mode change-over region is expressed in terms of the IVT speed ratio factor E, this is the region from Ecl to Ech, as shown in FIG. 21. Ecl is the IVT speed ratio factor E corresponding to the first speed ratio lcC as mentioned above.

In a running mode change-over prohibition region where the speed ratio of the CVT 2 is below the first speed ratio lcC, the mode fixing valve 160 cannot perform change-over of running mode as displacement of the spool 160A is stopped by the lock mechanism, as shown in FIG. 19E.

Therefore, change-over of running mode is limited to the region where the speed ratio lc of the CVT 2 exceeds the first speed ratio lcC, as shown in FIG. 21. In this region, a smooth change-over is performed by simultaneously operating the power recirculation clutch control valve 200 and the direct clutch control valve 180.

When the accelerator pedal depression amount APS is fixed, and when the vehicle speed VSP increases, the target value of the IVT speed ratio factor E varies continuously. In this case, while performing the speed change control of the power recirculation mode, a clutch change-over start determination is performed at the time when the speed ratio lc of the CVT 2 becomes larger than the first speed ratio lcC in FIG. 21. After performing clutch change-over at the rotation synchronization point RSP, the speed change control is performed with the target speed ratio of the CVT 2 in the direct mode.

At the rotation synchronization point RSP, as the rotation speed of the CVT output shaft 4 and the final output shaft 6 are equal and the rotation speeds of the reduction gear output shaft 3C and planet carrier 5B are identical, the shock due to engagement and disengagement of the clutches can be prevented, and a smooth change-over can be performed.

When the accelerator pedal which was depressed while running in the power recirculation mode is released, the target value of the IVT speed ratio factor E may change suddenly from a value corresponding to the power recirculation mode to a value corresponding to the direct mode. In this case, in FIG. 21, the CVT 2 is first controlled so that the speed ratio lc of the CVT 2 becomes larger than the first speed ratio lcC, and when the speed ratio lc enters the change-over permission region shown in FIG. 21, the power recirculation clutch control valve 200 and the direct clutch control valve 180 are operated simultaneously to produce a partially engaged state. After performing clutch change-over in this partially engaged state, direct mode speed change control is performed to make the speed ratio lc of the CVT 2 approach the target value. When the target value of the IVT speed ratio factor E varies sharply beyond the rotation synchronous point RSP, the response of the transmission is maintained by producing the partially engaged state and starting mode change-over before the IVT speed ratio factor E reaches the rotation synchronous point RSP.

In the mode change over permission region where the speed ratio lc of the CVT 2 is larger than the first speed ratio lcC, the lock of the mode fixing valve 160 is released as shown in FIG. 22D. In this state, the spool 160A displaces due to the signal pressure PsolH/C from the solenoid valve 190. However, in this region, the inhibitor valve 170 supplies the control pressure Plc of the power recirculation clutch control valve 200 to the power recirculation clutch 9 via the ports 170F, 170G, and supplies the control pressure Phc of the direct clutch control valve 180 to the direct clutch 10 via the ports 170C, 170D. As the ports 170E, 170H communicating with the mode fixing valve 160 are closed, running mode change-over is performed via the partially engaged state by controlling the power recirculation clutch control valve 200 and the direct clutch control valve 180 regardless of the mode fixing valve 160. Due to this control characteristic, the running mode is gradually changed over smoothly rather than one clutch being switched on and the other clutch being switched off abruptly.

The first speed ratio lcC of the CVT 2 above which the power recirculation clutch control valve 200 and the direct clutch control valve 180 can be operated simultaneously, is set nearer the rotation synchronous point RSP than the speed ratio lcD of the CVT 2.

The speed ratio lcD is defined to permit/prohibit transmission of torque which causes engine braking. In the mode change-over permission region shown in FIG. 21, the CVT 2 can transmit torque in both the acceleration direction and the deceleration direction, and the torque transmission direction of the CVT 2 reverses when there is a mode change-over. The reason why the first speed ratio lcC is set nearer the rotation synchronous point RSP than the speed ratio lcD is to prevent worsening of speed ratio control characteristics of the CVT 2 due to the mode change-over.

In this IVT, the direction of the transmitted torque which passes through the CVT 2 is different as follows when the vehicle is moving forward in the direct mode and power recirculation mode.

In FIG. 1, let torque transmission from the input disk 21 to the output disk 22 be the positive torque transmission direction, and torque transmission from the output disk 22 to the input disk 21 be the negative torque transmission direction. In the direct mode, as the output torque of the CVT 2 is transmitted to the final output shaft 6, the vehicle is driven with a positive transmitted torque, and a negative transmitted torque acts as an engine brake.

Therefore, in the direct mode, the transmitted torque of the vehicle is controlled by controlling the positive transmitted torque of the CVT 2.

In the power recirculation mode, the power recirculation clutch 9 is engaged and the direct clutch 10 is disengaged, so in FIG. 1, forward/reverse motion of the vehicle is determined by the difference between the rotation speed of the planet carrier 5 which rotates due to the output of the reduction gear 3, and the rotation speed of the sun gear 5 which depends on the speed ratio lc of the CVT 2. In the power recirculation mode, therefore, the direction of the torque passing through the CVT 2 varies according to the motion direction of the vehicle.

When the vehicle is moving forward in the power recirculation mode, it corresponds to the case where the rotation speed of the planet carrier 5B is greater than the rotation speed of the sun gear 5A, i.e., to the case where the speed ratio lc of the CVT 2 is greater than the geared neutral point GNP shown in FIG. 21. In this case, the torque transmitted by the planet gear 5B is transmitted by the ring gear 5C and sun gear 5A. In other words, torque is input to the CVT 2 from the output disk 22 via the chain 4B, and it is a negative transmission torque. The torque transmitted from the output disk 22 to the input disk 21 is transmitted from the unit input shaft 1 to the reduction gear 3, and the drive force is recirculated.

When the vehicle is reversing in the power recirculation mode, it corresponds to the case when the rotation speed of the sun gear 5A is much larger than the rotation speed of the planet carrier 5B, i.e., to the case when the speed ratio of the CVT 2 is smaller than the geared neutral point GNP shown in FIG. 21. In this case, the torque transmitted by the sun gear 5A is transmitted to the planet carrier 5B and ring gear 5C. In other words, the torque transmitted in the CVT 2 is a positive torque, The torque transmitted from the sun gear 5A to the planet carrier 5B is again recirculated to the input disk 21 via the reduction gear 3.

Therefore, when the vehicle is moving forward in the power recirculation mode, the drive torque of the vehicle can be controlled by controlling the negative torque passing through the CVT 2, and when the vehicle is reversing in the power recirculation mode, the drive torque of the vehicle can be controlled by controlling the positive torque passing through the CVT 2.

1-8-5 Direct Mode Running

After a change-over of running mode is performed from the power recirculation mode to the direct mode, the vehicle runs in the direct mode with the direct clutch 10 engaged until there is another change-over from the direct mode to the power recirculation mode.

In the direct mode, even if the control pressure Plc dropped sharply due to a malfunction of the power recirculation clutch control valve 200 or error in the control unit 80, in the mode change-over prohibition region when the speed ratio lc of the CVT 2 is equal to or less than the first speed ratio lcC, the spool 170A of the inhibitor valve 170 is pushed down as shown in FIG. 19C, and the spool 160A of the mode fixing valve 160 is also pushed down as shown in FIG. 19F.

As a result, the output port 170G connecting with the power recirculation clutch 9 is connected to the drain via the ports 170H, 160F, and the oil pressure of the power recirculation clutch 9 is equal to atmospheric pressure regardless of the state of the power recirculation clutch control valve 200. It may be noted that, in terms of the IVT speed ratio factor E, the mode change-over prohibition region corresponds to the region from Ecl to Ech as shown in FIG. 21.

Due to the above reason, the power recirculation clutch 9 is not engaged even if the control pressure Plc drops due to a malfunction or incorrect operation of the power recirculation clutch control valve 200, and therefore a speed change operation unintended by the driver does not occur.

On the other hand, as shown in FIG. 21, when the speed ratio lc of the CVT 2 is larger than lcC, the power recirculation clutch 9 and direct clutch 10 can be engaged simultaneously, but the variation of the IVT speed ratio factor E is limited to the region from the Ech to Ecl in FIG. 21 even if both clutches are engaged simultaneously, so a large variation of speed ratio does not occur.

Hence, by setting the mode change-over permission region which permits the clutches 9 and 10 to be engaged simultaneously, to near the rotation synchronous point RSP, the difference of the IVT speed ratio factor E in the direct mode and that of the power recirculation mode at an identical speed ratio lc of the CVT 2 is maintained small, and even when the power recirculation clutch control valve 200 has a malfunction or incorrect operation while the vehicle is running in the direct mode, an unintended downshift is prevented.

1-8-6 Change-over from direct mode to power Recirculation Mode

Change-over of running mode from the direct mode to the power recirculation mode is the reverse of change-over of running mode from the power recirculation mode to the direct mode.

When there is a drop of the vehicle speed VSP or the accelerator pedal is depressed while the vehicle is running in the direct mode, and the target value of the speed ratio lc of the CVT 2 crosses the speed ratio lcRSP corresponding to the rotation synchronous point RSP in the speed change map shown in FIG. 24, change-over control from direct mode running to power recirculation mode running is started.

When the vehicle is coasting due to release of the accelerator, the target value of the IVT speed ratio factor E varies continuously. Hence, when the speed ratio lc of the CVT 2 has increased more than lcC, a running mode change-over determination is performed, and after the engaged state of the clutches 9 and 10 have been changed over at the rotation synchronous point RSP, the speed ratio lc of the CVT 2 is made to vary in the decreasing direction.

On the other hand, when the target value of the IVT speed ratio factor E sharply decreases due to depression of the accelerator pedal, the IVT speed ratio factor E is decreased until the speed ratio lc of the CVT 2 is greater than the first speed ratio lcC, and a change-over is then performed by operating the power recirculation clutch control valve 200 and direct clutch control valve 180. After the shift to the power recirculation mode, the speed ratio lc of the CVT 2 is controlled to the target value in the power recirculation mode.

In the mode change-over permission region where the speed ratio lc of the CVT 2 is larger than the first speed ratio lcC, the lock of the mode fixing valve 160 is released as shown in FIG. 22D. In this state, the spool 160A displaces due to the signal pressure PsolH/C from the solenoid valve 190. However, in this region, the inhibitor valve 170 supplies the control pressure Plo of the power recirculation clutch control valve 200 to a power recirculation clutch 9 via the ports 170F, 170G, and supplies the control pressure Phc of the direct clutch control valve 180 to the direct clutch 10 via the ports 170C, 170D. As the ports 170E, 170H connecting with the mode fixing valve 160 are closed, the running mode change-over is performed via the partially engaged state due to control of the power recirculation clutch control valve 200 and the direct clutch control valve 180 regardless of the mode fixing valve 160. Due to this control characteristic, the mode is gradually changed over smoothly rather than one clutch being switched on and the other clutch being switched off abruptly.

1-8-7 R Range

When the driver sets the selector lever 86 from the N/P range to the R range, the manual valve 230 displaces the spool 230J as shown in FIG. 17C. As a result, the R range pressure port 230G connects with the line pressure port 230H, and the line pressure PL is supplied to the R range pressure circuit 108.

When the vehicle is in a stopped state, the running mode is the power recirculation mode, and the speed ratio lc of the CVT 2 is controlled to lcGNP corresponding to the geared neutral point GNP, so the spool 160A of the mode fixing valve 160 is locked by the slider 161 in a position where it is pulled up to the upper part of the figure as shown in FIG. 19E.

When the R range is selected in this state, the R range pressure Pr is supplied to the power recirculation clutch 9 via the port 160D and output port 160F of the mode fixing valve 160, and the port 170H and output port 170G of the inhibitor valve 170, and the power recirculation clutch 9 engages.

In the state where the accelerator pedal is not depressed in the R range, the step motor 136 is driven in the reverse direction, i.e., the speed ratio lc of the CVT 2 is decreased from lcGNP so as to obtain a predetermined creep torque.

The control of the speed ratio lc of the CVT 2 in the R range is performed in the same way as when the D range or Ds range is selected in the power recirculation mode.

The control unit 80 calculates the target input rotation speed Nin from the speed change map of FIG. 24 based on the vehicle speed VSP and accelerator pedal depression amount APS. The target value of the speed ratio lc of the CVT 2 is then calculated and the step motor 136 is driven.

In the F range, the manual valve 230 is fixed at the position in FIG. 17C, the mode fixing valve 160 is fixed at the position in FIG. 19E, and the drain port 246C for the oil chamber 30A of the shift control valve 246 connects with the pump suction passage 104 via the ports 160K, 160J of the mode fixing valve 160 and the ports 230B, 230C of the manual valve 230. The drain port 246D for the oil chamber 30B of the shift control valve 246 is connected to the port 240E of the counter torque cutoff valve 240 via the ports 230D, 230E of the manual valve 230.

Immediately after a change-over from N or P range to the R range, the spool 240A of the counter torque cutoff valve 240 is in a position corresponding to the geared neutral point GNP shown in FIG. 14C. At the gyration angle φGNP of the power roller 20 corresponding to the geared neutral point GNP, the drain port 246D for the oil chamber 30B of the shift control valve 246 connects with the port 240E of the counter torque cutoff valve 240 via the ports 230D, 230E of the manual valve 230 which are in the positions shown in FIG. 17C. In the counter torque cutoff valve 240, the port 240E is connected to the line pressure port 240D, and is cut off from the port 240F communicating with the pump suction passage 104.

Therefore, at the geared neutral point GNP, the line pressure PL acts on the drain port 246D for the oil chamber 230B of the shift control valve 246, and the oil pressure Phi of the oil chamber 30B is equal to the line pressure PL regardless of the spool position of the shift control valve 246.

The drain port 246C for the oil chamber 30A is connected to the pump suction passage 104 via the ports 160K, 160J of the mode fixing valve 160 shown in FIG. 19E, and the ports 230B, 230C of the manual valve 230 shown in FIG. 17C. Therefore, the oil pressure Plo of the oil chamber 30A varies from around zero to the line pressure PL according to the position of the shift control valve 246, but Plo cannot exceed Phi.

Therefore, at the geared neutral point GNP of the R range, the relation Phi≧Plo always holds.

The groove 290A of the cam 290 is set so that this relation holds when the gyration angle φ is equal to or greater than φR, i.e., when the speed ratio lc of the CVT 2 is equal to or less than lcR, as shown in FIGS. 20, 21 and FIGS. 23A–23F. Hence, in the R range, in the region where the IVT speed ratio factor E is negative and the gyration angle φ is nearer φGNP than the predetermined value φR, a forward direction torque which would cause engine braking is not produced.

When the IVT speed ratio factor E changes in the reverse direction from the geared neutral point GNP, the speed ratio lc of the CVT 2 varies in the decreasing direction. As a result, the spool 240A of the reverse torque cutoff valve 240A moves downward as shown in FIGS. 23C, 23D.

At the gyration angle φR, the port 240E communicating with the drain port 246D for the oil chamber 30B is cut off from the line pressure port 240D as shown in FIG. 23D. When the gyration angle φ further increases to the gyration angle φHl, the spool 240A of the counter torque cutoff valve 240 is connected to the pump suction passage 104 via the ports 240E, 240F, as shown in FIG. 23E. As a result, the oil pressure Phi of the oil chamber 30B becomes effectively the same as atmospheric pressure.

As a result, the oil pressure Plo of the oil chamber 30A and the oil pressure Phi of the oil chamber 30B can be inverted according to the displacement of the spool 246S of the shift control valve 246.

Therefore, in the R range, when the IVT speed ratio factor E exceeds a predetermined value ER and varies in the increasing direction of the vehicle speed, a transmitted torque which causes engine braking can be generated.

On the other hand, in the low speed region where engine braking is not required in the reverse range, a forward direction torque which would cause engine braking is not produced from when the speed ratio lc of the CVT 2 is the predetermined speed ratio lcR to when it is the geared neutral point GNP even if the step motor 136 performs an incorrect operation which causes the speed ratio lc of the CVT 2 to vary in the increasing direction.

Therefore, in the IVT according to this invention, by providing the inhibitor valve which responds to the gyration angle φ of the power roller 20, the counter torque cutoff valve 240, and the mode fixing valve 160 which responds to the gyration angle φ and signal pressure PsolH/C, the power recirculation clutch 9 and direct clutch 10 are definitively prevented from engaging simultaneously until the speed ratio lc of the CVT 2 increases to larger than the predetermined value lcD. Further, by setting the first speed ratio lcC of the CVT 2, which is the boundary between the mode change-over prohibition region wherein the power recirculation clutch 9 and direct clutch 10 are prohibited from engaging simultaneously, and the mode change-over permission region wherein they are permitted to engage simultaneously, to be between the geared neutral point GNP and the rotation synchronous point RSP, variation of the IVT speed ratio factor E due to simultaneous engaging is suppressed small even if such an operation does occur, as compared to the infinite variable speed ratio transmission of the prior art where the power recirculation clutch 9 and direct clutch 10 are permitted to engage simultaneously in all running regions.

Further, the counter torque cutoff valve 240 cuts off torque transmission which leads to engine braking in the low speed region where the speed ratio lc of the CVT 2 is smaller than lcD when the vehicle is moving forward, and the low speed region where the speed ratio of the CVT 2 is larger than the lcR when the vehicle is reversing. Consequently, engine braking does not occur in the low speed region even if the step motor 136 performs a speed change of the CVT 2 which would lead to engine braking due to a malfunction or incorrect operation.

In this embodiment, the spool 160A of the mode fixing valve 160 is made to displace according to the signal pressure PsolH/C of the solenoid valve 190, but it may also be made to displace according to the signal pressure PsolL/C of the solenoid valve 210.

Next, a fifth embodiment of this invention will be described referring to FIGS. 27–31.

According to this embodiment, the construction of the IVT differs from that of the first-fourth embodiments. In the oil pressure circuit which controls the IVT, a solenoid valve 260 is used instead of the cam 280 of the fourth embodiment. Also, an inhibitor valve 175 which responds to a signal pressure PsolNH of the solenoid valve 260 is used instead of the inhibitor valve 170 of the fourth embodiment. Each of these items will now be discussed.

2-1 IVT

Figure 27:
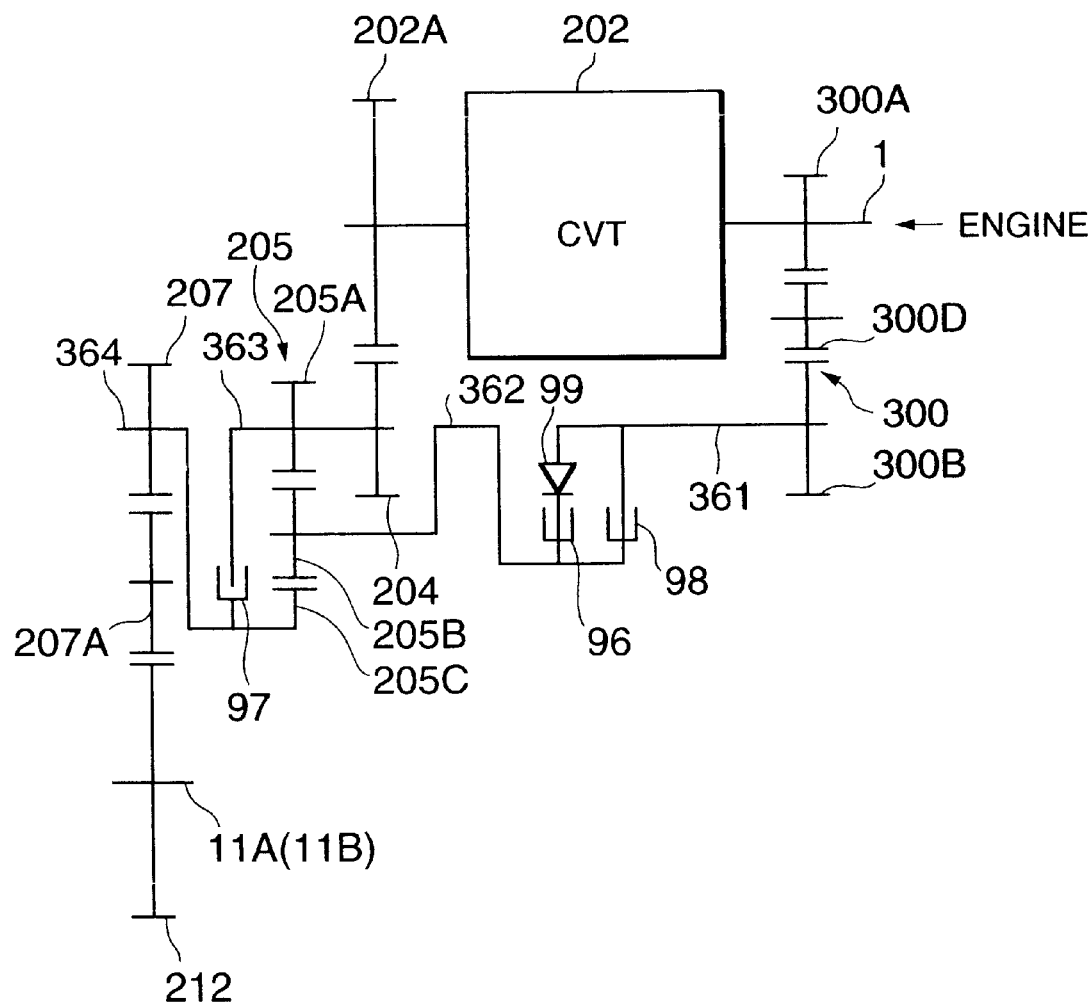
FIG. 27 is a schematic diagram of an IVT to which a fifth embodiment of this invention is applied.

Referring to FIG. 27, the IVT comprises a CVT 202, a reduction gear 300, a planetary gear set 205, and a final output shaft 364. The reduction gear 300 comprises a gear 300A fixed to the input shaft 1, a gear 300B meshed with the gear 300A via a counter gear 300D, and a reduction gear output shaft 361 fixed to the gear 300B.

The planetary gear set 205 comprises a sun gear 205A, planet gears 205B, a planet carrier 362 and a ring gear 205C.

The reduction gear output shaft 361 and planet carrier 362 are joined via an overrun and reverse clutch 98. They are also joined via a forward clutch 96 and forward one-way clutch 99 disposed in series. The forward clutch 96 and forward one-way clutch 99 are disposed in parallel with the overrun and reverse clutch 98.

The forward clutch 96 is a clutch which, when it is engaged, transmits torque in two directions between the reduction gear output shaft 361 and the planet carrier 362.

The forward one-way clutch 96 is a clutch which transmits torque from the reduction gear output shaft 361 to the planet carrier 362, and does not transmit torque in the reverse direction. The forward clutch 96 is equivalent to the power recirculation clutch 9 of the first-fourth embodiments. The planet carrier 362 supports plural planet gears 205B disposed between the sun gear 205A and ring gear 205C.

The CVT 202 comprises an output gear. 202A which rotates together with an output disk, not shown, on the input shaft 1, a gear 204 meshed with the output gear 202A, and a CVT output shaft 363 fixed to the gear 204. The CVT output shaft 363 is joined to the sun gear 205A of the planetary gear set 205.

The final output shaft 364 and CVT output shaft 363 are joined via a direct clutch 97.

A transmission output gear 207 is fixed to the final output shaft 364. The rotation torque of the final output shaft 364 is transmitted to the drive wheels 11A, 11B from the transmission output gear 207 via a counter gear 207A and final gear 212.

In this IVT, the direct clutch 97, forward clutch 96, overrun and reverse clutch 98, are operated as shown in the following Table 1 according to the range selected by the selector lever 86. According to this embodiment, apart from the D range, a DS range (sports range), M range (manual mode) or L range (low speed range) may be set as ranges for forward travel.

TABLE 1

| | Range | | | |
| --- | --- | --- | --- | --- |
| | | | Forward travel | |
| Clutch | R | N/P | Power recirculation | Direct |
| Forward clutch | Disengaged | Disengaged | Engaged | Engaged |
| Overrun and reverse clutch | Engaged | Disengaged | Engaged*[1] | Disengaged |
| Direct clutch | Disengaged | Disengaged | Disengaged | Engaged |

*[1]Engages only when the vehicle speed VSP is equal to or greater than a predetermined vehicle speed, and a forward travel range other than the D range is selected In the N/P range, the direct clutch 97, forward clutch 96, and overrun and reverse clutch 28 are all disengaged so the planet carrier 362 rotates free according to the rotation of the sun gear 205A, and torque is not transmitted to the ring gear 205C.

In the R range, only the overrun and reverse clutch 28 is engaged, so the planet carrier 362 and reduction gear output shaft 361 are connected. As a result, torque transmitted from the CVT 2 to the sun gear 205A is transmitted partly to the planet carrier 362 and partly to the ring gear 205C. The IVT speed ratio factor E is a negative value as shown in FIGS. 21 and 32. At this time, part of the torque transmitted from the CVT 2 to the planet carrier 362 is recirculated to the CVT 2 via the reduction gear output shaft 361, reduction gear 300 and input shaft 1.

In the forward travel ranges, clutch operations are different in the power recirculation mode and the direct mode.

In the power recirculation mode, the forward clutch 96 is engaged, and the torque is transmitted from the reduction gear 300 to the planet carrier 362 via the forward one-way clutch 99 and forward clutch 96. The IVT speed ratio factor E is a positive value as shown in FIGS. 21 and 32. In this state, by varying the CVT speed ratio lc, the IVT speed ratio factor E is controlled in a range from the geared neutral point GNP to the rotation synchronous point RSP. The torque transmitted from the reduction gear 300 to the planet carrier 362 is partly transmitted to the ring gear 205C and partly transmitted to the sun gear 205A meshed with the planet gears 205B. The torque transmitted to the ring gear 205C drives the drive wheels 11A, 11B. The torque transmitted to the sun gear 205A is transmitted to the input disk from the output disk of the CVT 2, and is recirculated to the reduction gear 300 via the input shaft 1.

In this state, the forward one-way clutch 99 shuts off torque transmission to the reduction gear 300 from the planet carrier 362, so the engine brake does not operate.

On the other hand, when a forward travel range other than the D range is selected, i.e., the DS range, M range or L range, and when the vehicle speed VSP is equal to or greater than a predetermined vehicle speed, the overrun and reverse clutch 98 is engaged. The predetermined vehicle speed may for example be 10 km/hr. As a result, torque is transmitted from the planet carrier 362 to the reduction gear 300, and the engine brake operates. When the vehicle is traveling in the power recirculation mode at or above the predetermined vehicle speed, an identical operation is performed when a range change-over occurs from the D range to any of these ranges due to operation of the selector lever 86. The detection of selection of the DS range, M range and L range is performed by the inhibitor switch 84 shown in FIG. 31 as in the detection of selection of the D range, N range, P range and R range.

In the direct mode of the range for forward travel, the direct clutch 97 is engaged in addition to the forward clutch 96. As a result, the CVT output shaft 363 and final output shaft 364 engage, and a torque according to the CVT speed ratio lc is transmitted from the CVT output shaft 363 to the final output shaft 364. In this state, due to the variation of the CVT speed ratio lc, the IVT speed ratio factor E is controlled in a region beyond the rotation synchronous point RSP as shown in FIGS. 21 and 32.

In the direct mode, the planet carrier 362 rotates together with the sun gear 205A of the planetary gear set 205. In the direct mode when the IVT speed ratio factor E is greater than an IVT speed ratio coefficient ESRP corresponding to the rotation synchronous point RSP, the rotation speed of the planet carrier 362 exceeds the rotation speed of the reduction gear 361. However, as the forward one-way clutch 99 which is disengaged, cuts off torque transmission from the planet carrier 362 to the reduction gear output shaft 361, the planet carrier 362 merely rotates without resistance together with the sun gear 205A and ring gear 205C, and it does not transmit torque.

Next, the oil pressure circuit of this IVT will be described referring to FIGS. 28A, 28B, FIGS. 29A–29C, and FIGS. 30A–30D.

The supply system for line pressure and lubricating pressure is identical to that of the fourth embodiment.

2-2 Shift Control Valve

Figure 28A:
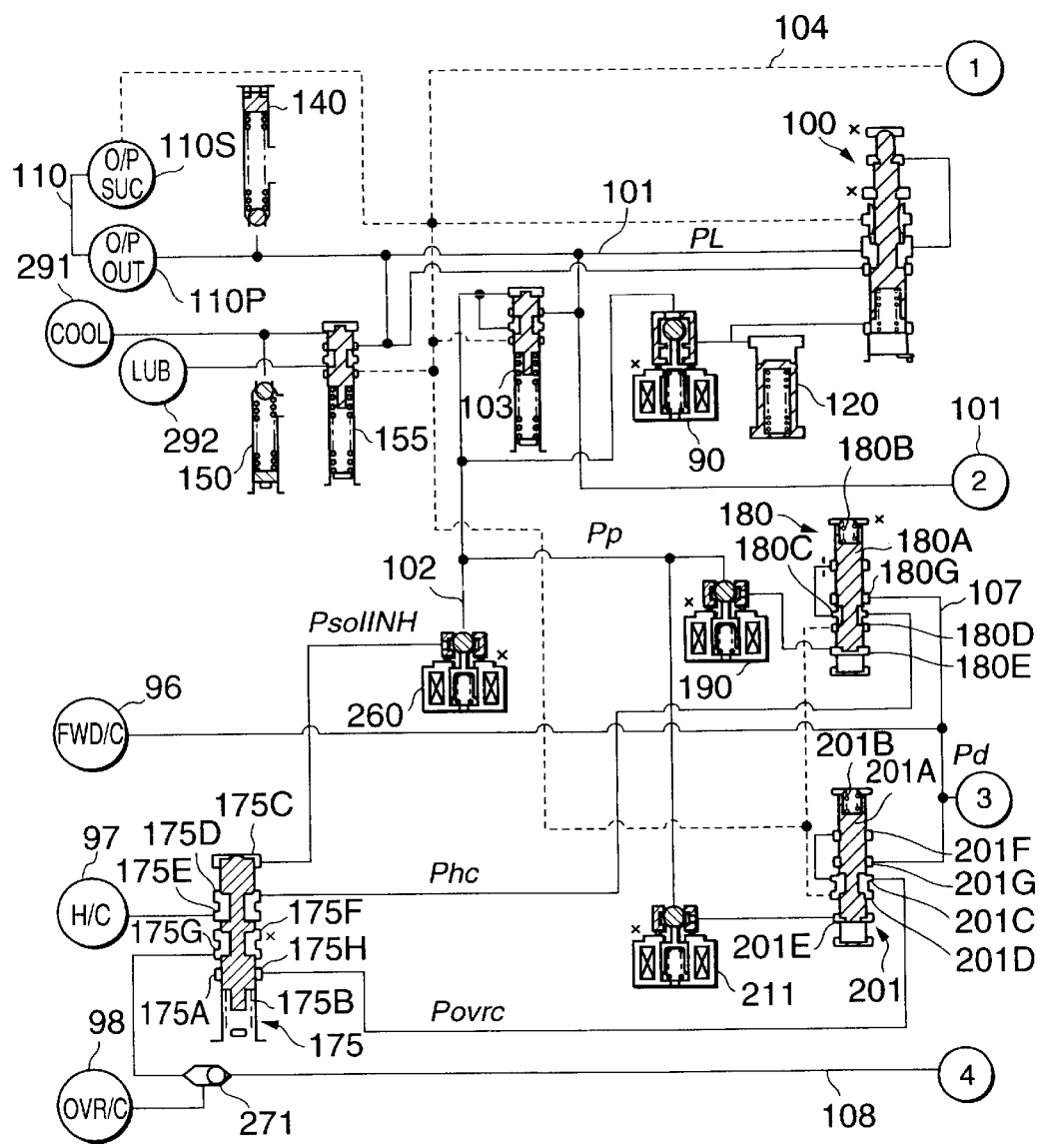
FIGS. 28A and 28B are an oil pressure circuit diagram of a speed ratio control device according to the fifth embodiment of this invention.
Figure 28B:
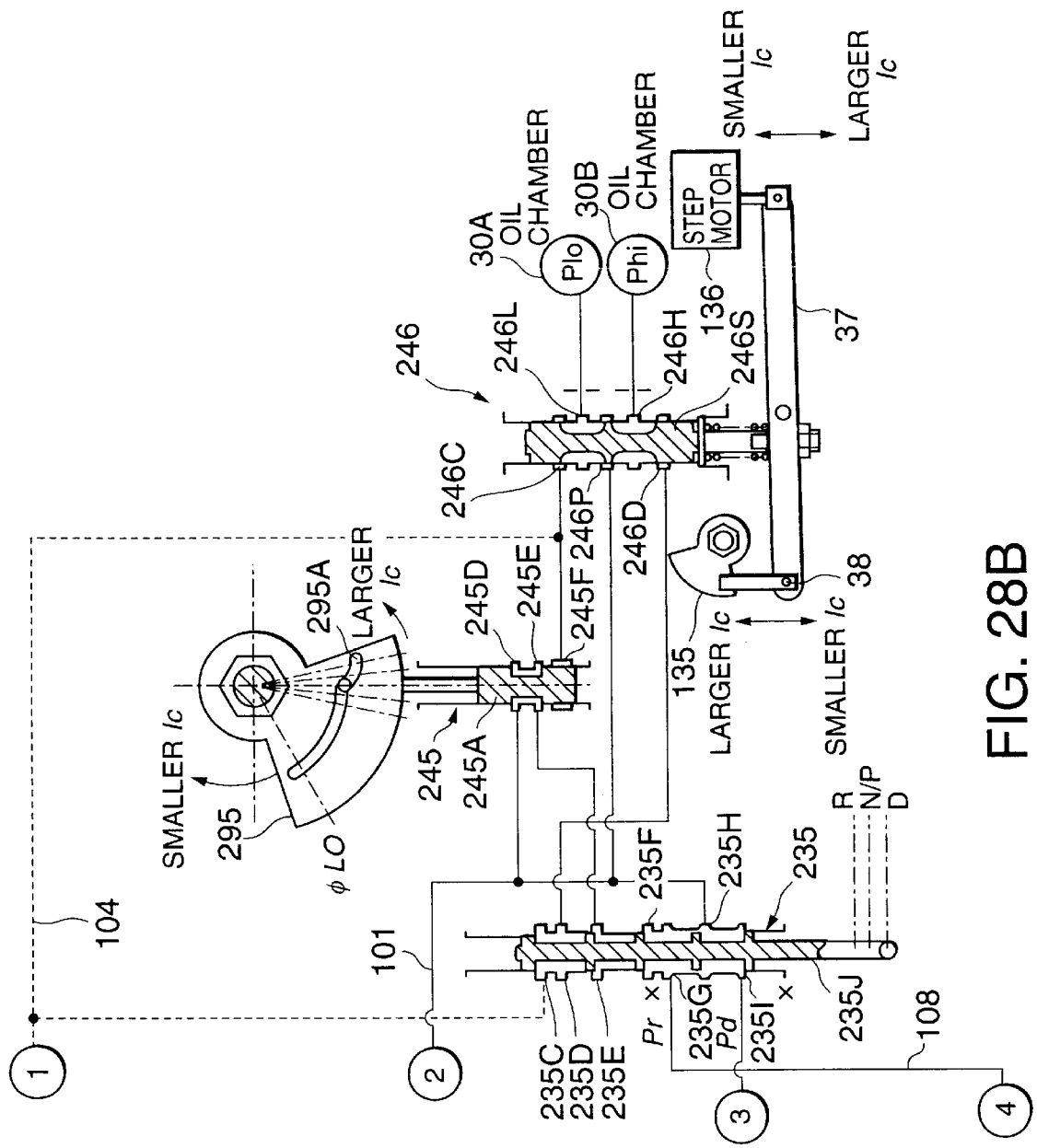

The construction of the shift control valve 246 shown in FIG. 28B is identical to that of the shift control valve 246 of the fourth embodiment.

The second port 246L of the shift control valve 246 communicates with the drain port 246C according to the displacement of the spool 246S to the upper part of FIG. 28B. The drain port 246C communicates with the pump suction passage 104 and a drain port 245F of a counter torque cutoff valve 245. The first port 246H of the shift control valve 246 communicates with the drain port 246D according to the displacement of the spool 246S to the lower part of FIG. 28B. The drain port 246D is connected to a port 235D of a manual valve 235.

2-3 Manual Valve

The manual valve 235 comprises a spool 235J, a port 235C facing the spool 235J, the port 235D, a port 235E, a drain port 235F, an R range pressure port 235G, a line pressure port 235H and a D range pressure port 235I.

Figure 29A:
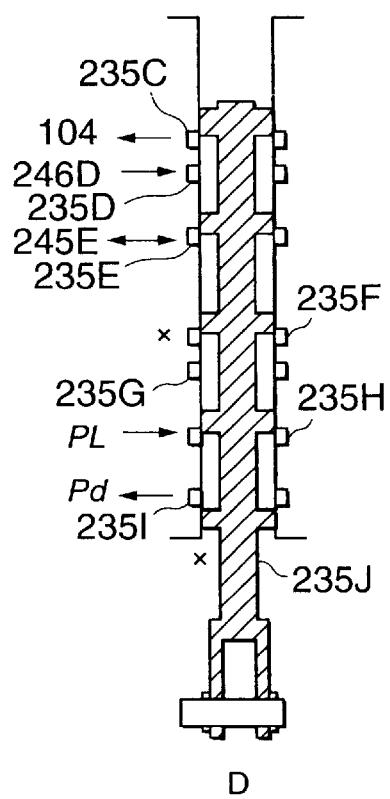
FIGS. 29A–29C are longitudinal sectional views of a manual valve according to the fifth embodiment of this invention.
Figure 29B:
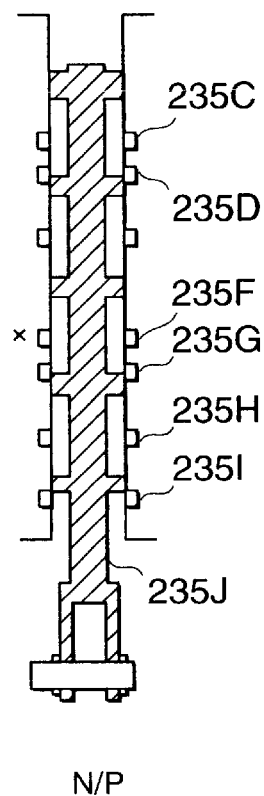
Figure 29C:
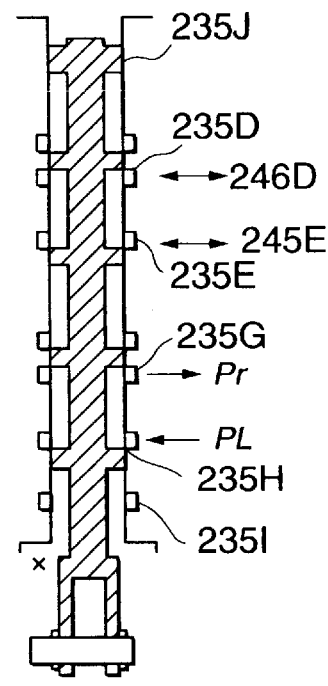

The spool 235J of the manual valve 235 displaces to a position in any of the D range, N/P range or R range shown in FIGS. 29A–29C in response to the operation of the selector lever 86. Selection of the aforesaid DS range, M range or L range displaces the spool 235J to the same position as the selection of the D range.

When the D range is selected, the spool 235J displaces to its lowest position as shown in FIG. 29A. When the R range is selected, the spool 235J displaces to its uppermost position as shown in FIG. 29C. When the N/P range is selected, the spool 235J is held in a position intermediate between the D range and R range, as shown in FIG. 29B.

The line pressure port 235H communicates with the line pressure circuit 101. When the D range is selected, the line pressure port 235H is connected with the D range pressure port 235I as shown in FIG. 28B and 29A, and the line pressure PL is supplied to the D range pressure circuit 107.

The line pressure PL is supplied from the D range pressure circuit 107 to a direct clutch control valve 180, overrun and reverse clutch control valve 201, and the forward clutch 96. The R range pressure port 235G communicates with an R range pressure circuit 108. When the D range is selected, the R range pressure port 235G is connected to the drain port 235F. The R range pressure circuit 108 connects with the overrun and reverse clutch 98 via a shuttle valve 271. When the D range is selected, as the oil pressure of the R range pressure circuit 108 is released to the drain, supply of oil pressure from the R range pressure circuit 108 to the overrun and reverse clutch 98 is not performed. The port 235D communicates with the drain port 246D of the shift control valve 246. When the D range is selected, the port 235D is connected to the pump suction passage 104 via the port 235C. The port 235E communicates with an output port 245E of the counter torque cutoff valve 245. When the D range is selected, this port 235E is closed.

On the other hand, when the N/P range is selected, the line pressure port 235H is closed, the D range pressure port 235I is connected to the drain, and the R range pressure port 235G is connected to the drain port 235F, as shown in FIG. 29B. As a result, both the D range pressure circuit 107 and the R range pressure circuit 108 are released to the drain, and the line pressure PL is not supplied to the direct clutch control valve 180, overrun and reverse clutch control valve 201, and forward clutch 96. Therefore, the forward clutch 96, direct clutch 27, and overrun and reverse clutch 98, are all disengaged.

When the R range is selected, the R range pressure port 235G communicates with the line pressure port 235H, and the D range pressure port 235I is released to the drain, as shown in FIG. 29C.

As a result, the line pressure PL is supplied to the R range pressure port 235G, the valve body of the shuttle valve 271 moves to the left of FIG. 28A, and the overrun and reverse clutch 98 is engaged due to supply of the line pressure PL from the R range pressure circuit 108. On the other hand, the oil pressure of the D range pressure circuit 107 is released via the port 235I. Consequently, the forward clutch 96 is disengaged, and as supply of oil pressure to the direct clutch control valve 180 and the overrun and reverse clutch control valve 201 is interrupted, the direct clutch 97 is also disengaged.

The port 235D communicates with the output port 245E of the counter torque cutoff valve 245 via the port 235E. As a result, the oil chamber 30B of the oil pressure cylinder 30 and the output port 245E of the counter torque cutoff valve 245 are connected according to the operation of the shift control valve 246.

2-4 Clutch Control Valves

The pilot pressure circuit 102 whereof the pressure is regulated by the pilot valve 103, supplies the pilot pressure Pp to a solenoid valve 190 and a solenoid valve 211.

Figure 31:
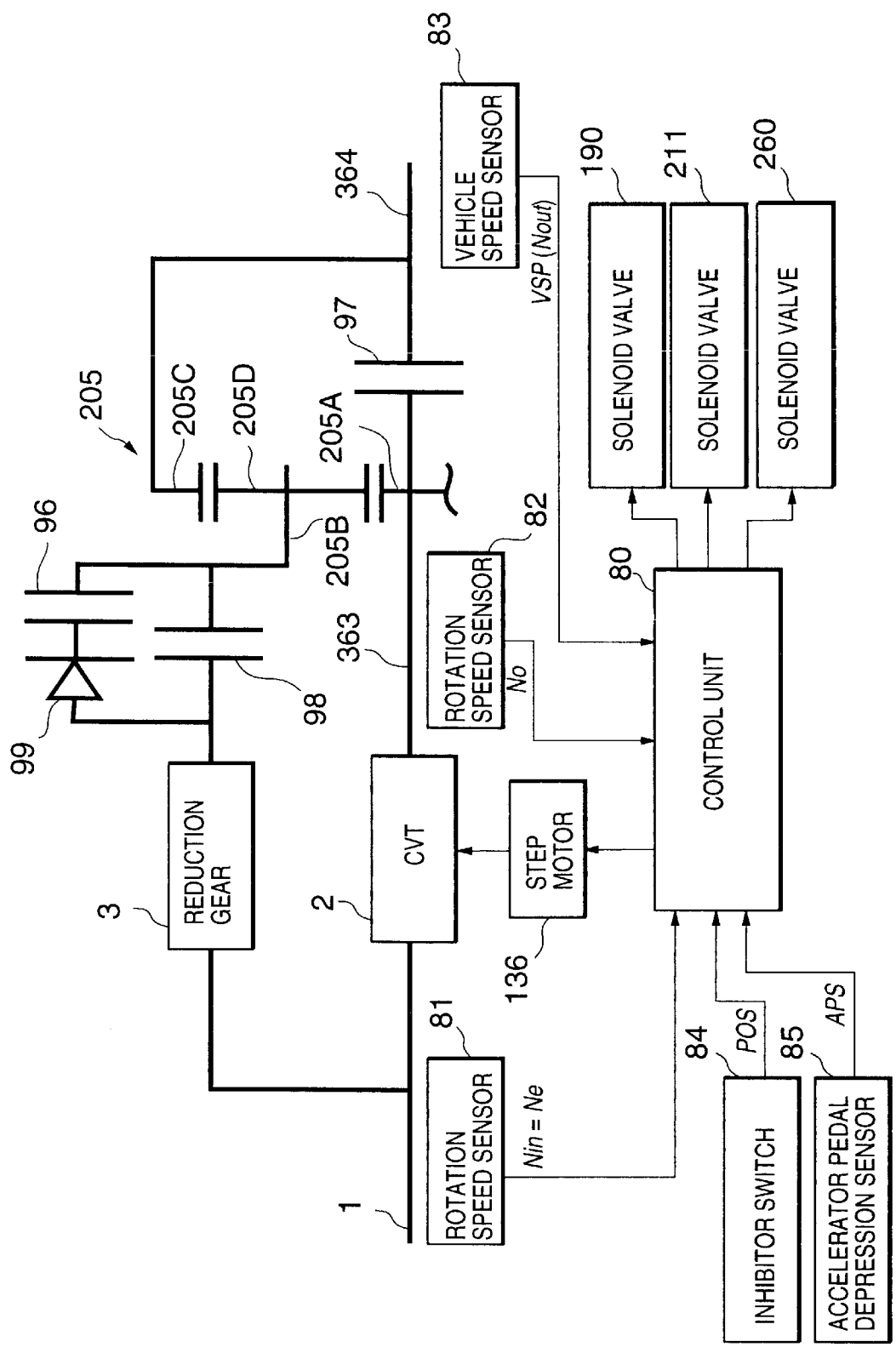
FIG. 31 is a schematic diagram of a speed ratio control device according to the fifth embodiment of this invention.

The solenoid valve 190 and solenoid valve 211 are duty controlled by the control unit 80, as shown in FIG. 31.

A signal pressure PsolH/C output by the solenoid valve 190 is supplied to a port 180E of the direct clutch control valve 180. The solenoid valve 21 generates a signal pressure PsolOVR/C from the pilot pressure Pp according to an output signal of the control unit 80, and supplies this to a port 201E of the overrun and reverse clutch control valve 201.

The direct clutch control valve 180 has an identical construction to that of the direct clutch control valve 180 of the fourth embodiment, and supplies a control pressure Phc from the output port 180C to the inhibitor valve 175 according to the signal pressure PsolH/C supplied to the port 180E.

The overrun and reverse clutch control valve 201 comprises a spool 201A supported by a spring 201B, an output port 201C facing the spool 201A, a port 201D, a port 201E, a feedback port 201F and a port 201G. The overrun and reverse clutch control valve 201 drives the spool 201A according to the signal pressure PsolOVR/C supplied to the port 201E. An R range pressure Pr equal to the line pressure PL is supplied to the port 201G from the R range pressure circuit 108. The port 201D is connected to the pump intake oil passage 104. The overrun and reverse clutch control valve 201 reduces the pressure Pr to a control pressure Povrc according to the displacement of the spool 201A, and supplies this to the inhibitor valve 175 from the output port 201C.

The signal pressure PsolOVR/C of the port 201E pushes the spool 201A upwards in FIG. 28A against the spring 201B and the R range pressure Pr of the feedback port 201F. The overrun and reverse clutch control valve 201 increases the control pressure Povrc according to the increase of the signal pressure PsolOVR/C.

When the signal pressure PsolOVR/C is zero, the overrun and reverse clutch control valve 201 connects the output port 201C to the port 201D due to the pushing force of the spring 201B, and the control pressure Povrc is released to the pump intake oil passage 104.

2-5 Inhibitor Valve

The inhibitor valve 175 comprises a spool 175A supported by a spring 175B, a port 175C facing the spool 175A, a port 175D, an output port 175E, a drain port 175F, an output port 175G and a port 175H.

The output port 175E communicates with the direct clutch 97. The control pressure Phc is supplied to the port 175D from the direct clutch control valve 180. The control pressure Povrc is supplied to the port 175H from the overrun and reverse clutch control valve 201. The output port 175G communicates with the overrun and reverse clutch 98 via the shuttle valve 271. The signal pressure PsolINH is supplied to the port 175C from the solenoid valve 260. The spool 175A displaces according to the supporting force of the spring 175B and this signal pressure PsolINH.

When the signal pressure PsolINH is zero, the spool 175A is pushed upwards in the figure due to the spring 175B, the port 175D is connected to the output port 175E, and the control pressure Phc is supplied to the direct clutch 97, as shown in FIG. 28A. Also, the output port 175G is connected to the drain port 175F, and the oil pressure acting on the shuttle valve 271 is released.

When the signal pressure PsolINH increases, the spool 175A displaces downwards in FIG. 28A against the spring 175B, the output port 175G is connected to the port 175H, and the control pressure Povrc is supplied to the overrun and reverse clutch 98 from the shuttle valve 271. Also, the output port 175E is connected to the drain port 175F, and the direct clutch 97 is released.

2-6 Counter Torque Cutoff Valve

Referring to FIG. 28B and FIGS. 30A–30D, the counter torque cutoff valve 245 comprises a spool 245A, a line pressure port 245D facing the spool 245A, the aforesaid output port 245E and the aforesaid drain port 245F.

A pin 241 identical to that of the fourth embodiment is fixed to the end of the spool 245A. The pin 241 engages with a cam groove 295A of a cam 295 fixed to one of the trunnions 23. When the trunnion. 23 rotates in a direction to increase the speed ratio Ic of the CVT 2, the cam groove 295A drives the spool 245A to the left of FIGS. 30A–30D via the pin 241, and when the trunnion 23 rotates in the reverse direction, it drives the spool 245A to the right of FIGS. 30A–30D.

This displacement of the spool 245A to the left and right occurs when the gyration angle φ of the power 20 varies between a gyration angle φGNP corresponding to the geared neutral point GNP and a larger gyration angle φHl. This region of the gyration angle φ corresponds to reverse motion of the vehicle in the power recirculation mode. FIG. 30D shows a position of the spool 245A corresponding to the gyration angle φGNP. Due to the shape of the cam groove 295A, even when the gyration angle φ is less than φGNP, the spool 245A is held in this position. As a result of this setting, the total length of the counter torque cutoff valve 245 can be made short. In this position, the output port 245E communicates with the intake passage 104 via the drain port 245F, and the port 235E of the manual valve 235 communicating with the output port 245E is maintained at low pressure.

FIG. 30B shows the position of the spool 245A corresponding to the gyration angle φHl. Due to the shape of the cam groove 295A, even when the gyration angle φ is larger than φHl, the spool 245A is held in this position. In this position, the drain port 245D communicates with the output port 245E, and the line pressure PL of the line pressure circuit 101 is supplied to the port 235E of the manual valve 235.

FIG. 30C shows a position of the spool 245A when the gyration angle φ is at a position φR between φGNP and φHl. In this position, the output port 245E, port 245D and port 245F are all closed.

2-7 Operation 2-7-1 Change-over From the N/P Range to the D range, and Forward Travel in the Power Recirculation Mode When the selector lever 86 is changed over from the N/P range to the D range, firstly, a D range pressure equal to the line pressure PL is supplied from the manual valve 235 to the D range pressure circuit 107, and the forward clutch 96 is engaged to establish the power recirculation mode.

When the forward clutch 96 is engaged, due to the action of the forward one-way clutch 99, torque is transmitted in the forward motion direction of the power recirculation mode, and a torque corresponding to engine braking is not transmitted. In the power recirculation mode of the D range, even if the CVT speed ratio lc changes to a speed ratio corresponding to reverse motion due to a fault, etc., of the control unit 80, the IVT does not exert a torque in the reverse direction on the drive wheels 11A (11B).

Even when the vehicle moves forward in the power recirculation mode, a range other than the D range, i.e., the DS range, M range or L range, may be selected, and in this case, when the vehicle speed VSP is equal to or greater than a predetermined vehicle speed, energization of the solenoid valve 211 and solenoid valve 260 is performed. The energized solenoid valve 211 generates the control pressure Povrc, and supplies it to the port 175H of the inhibitor valve 175. The energized solenoid valve 260 supplies the signal pressure PsolINH to the port 175C of the inhibitor valve 175, and pushes the spool 175A downwards in FIG. 28A. As a result, the control pressure Povrc is supplied from the port 175H to the overrun and reverse clutch 98 via the output port 175G and shuttle valve 271, and the overrun and reverse clutch 98 engages. When the overrun and reverse clutch 98 engages, the reduction gear output shaft 361 and planet carrier 362 always rotate together, and torque transmission in the reverse direction corresponding to the engine braking also takes place.

However, in any running state, if the vehicle speed VSP is less than the predetermined vehicle speed, the overrun and reverse clutch 98 is disengaged, and transmission of torque corresponding to engine braking does not take place.

The disengaging of the overrun and reverse clutch 98 may be performed only when energizing of the solenoid valve 260 is stopped. When the signal pressure PsolINH is zero, the spool 175A pushed by the spring 175B displaces upwards in FIG. 8A, the output port 175G is connected with the drain port 175F, and the oil pressure of the overrun and reverse clutch 98 is drained.

To determine engaging and disengaging of the overrun and reverse clutch 98, instead of comparing the vehicle speed VSP with a predetermined vehicle speed, the IVT speed ratio factor E may be compared with a predetermined factor. This predetermined factor is set to a value corresponding to first gear in a planetary gear type automatic transmission, or to a value corresponding to the maximum speed ratio of a CVT having a torque converter.

Due to the disengaging of the overrun and reverse clutch 98, torque transmission corresponding to the engine braking is cutoff in the low vehicle speed region, so even if the control unit 80 has a fault or performs an incorrect operation, the IVT does not exert a torque in the opposite direction on the drive wheels 11A (11B).

2-7-2 Change-over From Power Recirculation Mode to Direct Mode

Prior to performing a change-over from the power recirculation mode to the direct mode, if the overrun and reverse clutch 98 is engaged, energizing of the solenoid valves to 211, 260 is stopped, and the overrun and reverse clutch 98 is disengaged.

Simultaneously with or slightly later than the disengaging of the overrun and reverse clutch 98, the solenoid valve 190 is energized, and the control pressure Phc is supplied from the direct clutch control valve 180 to the port 175D of the inhibitor valve 175. When energizing of the solenoid valve 260 stops, the spool 175A of the inhibitor valve 175 moves upwards in FIG. 28A. Therefore, the port 175D is connected with the output port 175E, and the direct clutch 97 is engaged by the control pressure Phc supplied from the output port 175E.

The forward clutch 96 is always engaged when the vehicle is moving forwards, as shown in Table 1. Therefore, when there is a change-over of running mode from the power recirculation mode to the direct mode, torque transmission by the forward clutch 96 is performed without interruption.

When a permanently open valve is used for the solenoid valve 190, the control pressure Phc supplied by the direct clutch control valve 180 is gradually increased by gradually increasing the ON duty ratio of the solenoid valve 190. When the control pressure Phc increases to a pressure required to engage the direct clutch 97, the mode changes over to the direct mode.

In the direct mode, the engine output torque is transmitted from the CVT output shaft 363 to the final output shaft 364. Also, a torque corresponding to engine braking is transmitted from the final output shaft 364 to the CVT output shaft 363. On the other hand, as described above, the forward one-way clutch 99 cuts off torque transmission from the planet carrier 362 to the reduction gear output shaft 361, the planet carrier 362 merely rotates together with the sun gear 205A and ring gear 205C without resistance, so the planet carrier 362 does not transmit torque in the direct mode. As a result, in the direct mode, torque is transmitted only via the direct clutch 97.

In the direct mode, the IVT speed ratio is controlled using the entire speed ratio range shown in FIG. 21 which can be set by the CVT 2 from a CVT speed ratio lcRSP corresponding to the rotation synchronous point RSP to the CVT speed ratio lcHl which is the minimum value.

2-7-3 Change-over From the Direct Mode to the Power Recirculation Mode

When the vehicle is traveling in the direct mode, when the ON duty ratio of the solenoid valve 190 is decreased and the control pressure Phc generated by the direct clutch control valve 180 is decreased, the direct clutch 97 is gradually disengaged. When the direct clutch 97 is disengaged, the only clutch which is engaged is the forward clutch 96. Due to the disengaging of the direct clutch 97, the running mode changes over smoothly from the direct mode to the power recirculation mode.

When the solenoid valve 260 is energized, the spool 175A is pushed downwards in FIG. 28A due to the signal pressure PsollNH, the output port 175E connects with the drain port 175F, and the output port 175G connects with the port 175H. The direct clutch 97 can therefore disengage by energizing the solenoid valve 260. In this case, shocks due to change-over of running mode are suppressed by giving priority to the decrease of the ON duty ratio of the solenoid valve 190 over the energizing of the solenoid valve 260.

When the vehicle is travelling forward in the power recirculation mode of the D range, if engine braking is necessary, the solenoid valve 211 may be energized to engage the overrun and reverse clutch 98 by changing over the selector lever 86 to the DS range, M range or L range.

2-7-4 R Range

When the vehicle is traveling in the R range, the line pressure PL is supplied to the overrun and reverse clutch 98 via the manual valve 235 and shuttle valve 271, and the overrun and reverse clutch 98 becomes permanently engaged. The manual valve 235 displaces upwards in FIG. 28B to connect the ports 235D and 235E.

The drain port 246D of the shift control valve 246 therefore connects to the output port 245E of the counter torque cutoff valve 245 via the manual valve 235, as shown in FIG. 29C.

In the R range, when the gyration angle $\phi$ of the power rollers 20 lies between $\phi$GNP and a gyration angle $\phi$R, the counter torque cutoff valve 245 connects the output port 245E to the line pressure port 245D as shown in FIG. 30D.

Therefore, the oil pressure supplied to the oil chamber 30B is equal to the line pressure PL irrespective of whether or not the shift control valve 246 connects the first port 246H to the line pressure port 246P or the drain port 246D.

On the other hand, as the drain port 246C is connected to the pump suction passage 104, the oil pressure of the oil chamber 30A varies between the line pressure PL and zero according to displacement of the spool 246S.

Therefore, when the gyration angle $\phi$ of the power roller lies between $\phi$GNP and $\phi$R in the R range, i.e., when the IVT speed ratio factor E lies between ER and zero in FIG. 21, the relation Phi$\geq$Plo always holds.

In the R range, the positive torque transmitted from the input disk 21 to the output disk 22 of the CVT 2 is a torque in the reverse motion direction, and the negative torque transmitted from the output disk 22 to the input disk 21 is a torque in the forward motion direction corresponding to engine braking.

Hence, when the oil pressure Phi of the oil chamber 30B shown in FIG. 15 exceeds the oil pressure Plo of the oil chamber 30A, the CVT 2 transmits a positive torque, and when the oil pressure Plo of the oil chamber 30A exceeds the oil pressure Phi of the oil chamber 30B, the CVT 2 transmits a negative torque.

Therefore, when Phi$\geq$Plo, a negative torque transmission corresponding to engine braking does not take place, and even if the control unit 80 has a fault or malfunction, a torque in the forward motion direction does not act on the drive wheels 11A (11B).

On the other hand, when the gyration angle φ of the power roller lies between φR and φHI in the R range, the counter torque cutoff valve 245 connects the output port 245E to the drain port 245F, as shown in FIG. 30B.

As a result, the pressures of the drain ports 246C and 246D of the shift control valve 246 are both zero, and transmission of torque in the forward motion direction and reverse motion direction may be controlled as desired according to the displacement of the spool 246S of the shift control valve 246.

As described above, also in this embodiment where the IVT uses the forward clutch 96, direct clutch 97, and overrun and reverse clutch 98, and the forward one-way clutch 99, by providing the counter torque cutoff valve 245 and inhibitor valve 175 which respond to the gyration angle φ, a torque corresponding to engine braking can be prevented from acting on the drive wheels 11A (11B) in the vicinity of the geared neutral point GNP.

Therefore, even if, due to a fault or malfunction of the control unit 80, a step motor 136 displaces the spool 246S beyond the geared neutral point GNP towards a CVT speed ratio lc corresponding to the direction opposite to the vehicle motion, excessive engine braking is definitively prevented from acting on the drive wheels 11A(11B). Also, in the direct mode, IVT speed ratio control may be performed in a region where the CVT speed ratio lc is less than the CVT speed ratio lcGNP corresponding to the geared neutral point GNP.

The contents of Tokugan Hei 11-211926 with a filing date of Jul. 27, 1999 in Japan, and Tokugan 2000-94707 with a filing date of Mar. 30, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A speed change controller for an infinite speed ratio transmission for a vehicle, the infinite speed ratio transmission comprising an input shaft, a continuously variable transmission which comprises a first output shaft and transmits a rotation of the input shaft at an arbitrary speed ratio to the first output shaft, a fixed speed ratio transmission which comprises a second output shaft and transmits the rotation of the input shaft at a fixed speed ratio to the second output shaft, a planetary gear set comprising a first rotation element joined to the first output shaft, a second rotation element joined to the second output shaft, and a third rotation element which varies a rotation direction and a rotation speed according to a difference between a rotation speed of the first rotation element and a rotation speed of the second rotation element, the vehicle running according to the rotation of the third rotation element, and a selector lever which selects an operating range of the infinite speed ratio transmission, the operating range comprising a forward motion range and a reverse motion range, the controller comprising:

an actuator which varies an amount of torque transmitted between the input shaft and the first output shaft;
a sensor which detects the operating range selected by the selector lever; and
means for controlling the actuator according to the operating range so that a rotation torque in an opposite direction to a vehicle travel direction represented by the operating range is not transmitted between the input shaft and the first output shaft.

2. A speed change controller as defined in claim 1, wherein the continuously variable transmission comprises an input disk joined to the input shaft, an output disk joined to the first output shaft, a power roller gripped by the input disk and output disk, and a trunnion supporting the power roller, the actuator comprises a piston fixed to the trunnion, a first oil chamber which exerts an oil pressure on the piston, and a second oil chamber which exerts an oil pressure on the piston in the reverse direction to the oil pressure of the first oil chamber, and the control means is functioning to control the difference between the oil pressure of the first oil chamber and the oil pressure of the second oil chamber so that a torque in the opposite direction to the vehicle travel direction is not transmitted between the input disk and the output disk.

3. A speed change controller as defined in claim 2, wherein the control means comprises a shift control valve which supplies an oil pressure to the first oil chamber and the second oil chamber, a first torque control valve which sets an upper limit of the oil pressure supplied from the shift control valve to the first oil chamber, a second torque control valve which sets an upper limit of the oil pressure supplied from the shift control valve to the second oil chamber, and a microprocessor programmed to control the first torque control valve and the second torque control valve so that the upper limit of the pressure of one of the first oil chamber and second oil chamber is lower than the upper limit of the pressure of the other oil chamber, and control the shift control valve so that the oil chamber of which the upper limit is set higher is always provided with an oil pressure equal to the upper limit which is set higher.

4. A speed change controller as defined in claim 3, wherein the shift control valve comprises a first port communicating with a first oil chamber, second port communicating with the second oil chamber, supply port communicating with an oil pressure supply source, first drain port, second drain port, and a spool which displaces between a position in which the first port is connected to the supply port and the second port is connected to the second drain port, and a position in which the first port is connected to the first drain port and the second port is connected to the supply port, the first torque control valve comprises a valve which set an upper limit of the pressure of the first drain port, second torque control valve comprises a valve which sets an upper limit of the pressure of the second drain port, and the microprocessor is further programmed to:

control the first torque control valve and the second torque control valve so that one of the upper limits of the pressure of the first drain port and the pressure of the second drain port is equal to the pressure of the supply port.

5. A speed change controller as defined in claim 4, wherein the microprocessor is further programmed to control the shift control valve so that the first port is connected to the first drain port and the second port is connected to the supply port, or the second port is connected to the second drain port and the first port is connected to the supply port, according to the operating range, so that a pressure difference between the first oil chamber and the second oil chamber necessary to transmit torque in the opposite direction to the vehicle travel direction is not transmitted between the input disk and the output disk.

6. A speed change controller as defined in claim 2, wherein the speed change controller further comprises a sensor which detects a vehicle running state, and the control means comprises means for controlling the actuator so that a torque in the opposite direction to the vehicle travel direction is not transmitted between the input shaft and the first output shaft only when the vehicle running state corresponds to a predetermined region including a state where the vehicle is stationary.

7. A speed change controller as defined in claim 6, wherein the running state detecting sensor comprises a sensor which detects a vehicle speed, and the predetermined region is set to a region wherein the vehicle speed is equal to or less than a predetermined vehicle speed.

8. A speed change controller as defined in claim 6, wherein the running state detecting sensor comprises a sensor which detects a rotation speed of the input shaft, and a sensor which detects a rotation speed of the first output shaft, and the predetermined region is set to a region wherein a ratio of the rotation speed of the input shaft and the rotation speed of the first output shaft lies within a predetermined range.

9. A speed change controller as defined in claim 6, wherein the running state detecting sensor comprises a sensor which detects a rotation speed of the input shaft, and a sensor which detects a rotation speed of the third rotation element, and the predetermined region is set to a region wherein a ratio of the rotation speed of the third rotation element and the rotation speed of the input shaft lies within a predetermined range including zero.

10. A speed change controller as defined in claim 6, wherein the infinite speed ratio transmission comprises a power recirculation clutch which joins the second output shaft and the second rotation element, and a direct clutch which joins the first output shaft and the third rotation element, the infinite speed ratio transmission can operate in either of a power recirculation mode wherein the power recirculation clutch is engaged and the direct clutch is disengaged, and a direct mode wherein the direct clutch is engaged and the power recirculation clutch is disengaged, the continuously variable transmission comprises a continuously variable transmission which varies a speed ratio of the input shaft and the first output shaft according to a variation of a gyration angle of the power roller, the predetermined region corresponds to a predetermined first gyration angle range of the power roller, and the change-over between the power recirculation mode and the direct mode is performed in a predetermined second gyration angle range consisting of gyration angles smaller than a gyration angle in the first gyration angle range.

11. A speed change controller as defined in claim 2, wherein the power roller is functioning to vary a speed ratio of the input shaft and the first output shaft according to a variation of a gyration angle, and the control means comprises a shift control valve which controls an oil pressure supplied to the first oil chamber and an oil pressure supplied to the second oil chamber, a counter torque cutoff valve which prevents decrease of the oil pressure supplied to one of the first oil chamber and the second oil chamber from the shift control valve so that the oil pressure of one of the first oil chamber and the second oil chamber is always greater than the pressure of the other oil chamber in a predetermined gyration angle range of the power roller, and a manual valve which changes over the oil chamber whereof decrease of oil pressure is prevented by the counter torque cutoff valve according to the operating range selected by the selector lever.

12. A speed change controller as defined in claim 11, wherein the power roller varies the gyration angle according to a displacement of the trunnion, and the counter torque cutoff valve operates according to the displacement of the trunnion.

13. A speed change controller as defined in claim 12, wherein the speed change controller comprises a cam driven by the trunnion, and the counter torque cutoff valve comprises a valve body which is driven by the cam to displace between a position wherein decrease of one of the oil pressures supplied to the first oil chamber and the second oil chamber from the shift control valve is prevented, and a position wherein decrease of one of the oil pressures supplied to the first oil chamber and the second oil chamber from the shift control valve is not prevented.

14. A speed change controller as defined in claim 11, wherein the predetermined gyration angle range includes a region wherein a rotation speed of the third rotation element becomes zero.

15. A speed change controller as defined in claim 11, wherein the shift control valve comprises a first port communicating with the first oil chamber, a second port communicating with the second oil chamber, a supply port communicating with an oil pressure supply source, a spool, a first drain port communicating with the first port according to a displacement of the spool, and a second drain port communicating with the second port according to a displacement of the spool, and the counter torque cutoff valve is functioning to prevent decrease of one of the oil pressures supplied to the first oil chamber and the second oil chamber by connecting one of the first drain port and the second drain port to the oil pressure supply source.

16. A speed change controller for an infinite speed ratio transmission for a vehicle, the infinite speed ratio transmission comprising an input shaft, a continuously variable transmission which comprises a first output shaft and transmits a rotation of the input shaft at an arbitrary speed ratio to the first output shaft, a fixed speed ratio transmission which comprises a second output shaft and transmits the rotation of the input shaft at a fixed speed ratio to the second output shaft, a planetary gear set comprising a first rotation element joined to the first output shaft, a second rotation element joined to the second output shaft, and a third rotation element which varies a rotation direction and a rotation speed according to a difference between a rotation speed of the first rotation element and a rotation speed of the second rotation element, the vehicle running according to the rotation of the third rotation element, and a selector lever which selects an operating range of the infinite speed ratio transmission, the operating range comprising a forward motion range and a reverse motion range, the controller comprising:

an actuator which varies an amount of torque transmitted between the input shaft and the first output shaft;

a sensor which detects the operating range selected by the selector lever; and a controller which controls the actuator according to the operating range so that a rotation torque in an opposite direction to a vehicle travel direction represented by the operating range is not transmitted between the input shaft and the first output shaft.

* * * * *